(12) United States Patent
Rolicki et al.

(10) Patent No.: US 11,584,421 B2
(45) Date of Patent: Feb. 21, 2023

(54) FOLDABLE STROLLERS WITH REMOVEABLE SEATS AND RELATED METHODS

(71) Applicant: Kolcraft Enterprises, Inc., Chicago, IL (US)

(72) Inventors: Peter Rolicki, Wheeling, IL (US); Mark Eyman, Chicago, IL (US); Wes Thomas, Racine, WI (US); Kenneth J. Bargo, Chicago, IL (US)

(73) Assignee: KOLCRAFT ENTERPRISES, INC., Chicago, IL (US)

( * ) Notice: Subject to any disclaimer, the term of this patent is extended or adjusted under 35 U.S.C. 154(b) by 0 days.

(21) Appl. No.: 17/306,190

(22) Filed: May 3, 2021

(65) Prior Publication Data

US 2021/0339785 A1    Nov. 4, 2021

Related U.S. Application Data

(63) Continuation of application No. 16/320,913, filed as application No. PCT/US2017/044183 on Jul. 27, 2017, now Pat. No. 10,994,763.
(Continued)

(51) Int. Cl.
  *B62B 7/08* (2006.01)
  *B62B 7/14* (2006.01)
  (Continued)

(52) U.S. Cl.
  CPC ............... *B62B 7/08* (2013.01); *B62B 7/008* (2013.01); *B62B 7/142* (2013.01); *B62B 9/00* (2013.01);
  (Continued)

(58) Field of Classification Search
  CPC ........... B62B 7/008; B62B 7/14; B62B 7/142; B62B 7/145; B62B 9/12; B62B 9/28; B62B 9/104
  See application file for complete search history.

(56) References Cited

U.S. PATENT DOCUMENTS 2,907,372 A    10/1959   Leger
3,084,949 A    4/1963    Forster
(Continued)

FOREIGN PATENT DOCUMENTS

BE    1014755    3/2004
CN    2853548    1/2007
(Continued)

OTHER PUBLICATIONS

International Searching Authority, "International Search Report," issued in connection with International Patent Application No. PCT/US2017/044190, dated Sep. 27, 2017, 3 pages.
(Continued)

*Primary Examiner* — Jeffrey J Restifo
(74) *Attorney, Agent, or Firm* — Hanley, Flight & Zimmerman, LLC

(57) ABSTRACT

Foldable strollers with removable seats and related methods are disclosed herein. An example stroller disclosed herein a wheeled frame, a receiver coupled to the frame, and a seat. The seat includes a mount, a lock disposed in the mount; and a handle having an extended positon and a retracted position relative to the seat. The lock is to move from a first position to a second position when the mount is disposed in the receiver to removably couple the seat to the frame, and the lock to move from the second position to the first position to release the seat from the receiver when the handle moves from the retracted position to the extended position.

18 Claims, 28 Drawing Sheets

Related U.S. Application Data

(60) Provisional application No. 62/367,421, filed on Jul. 27, 2016.

(51) Int. Cl.

| | | |
|---|---|---|
| *B62B 9/10* | (2006.01) | |
| *B62B 9/28* | (2006.01) | |
| *B62B 7/00* | (2006.01) | |
| *B62B 9/12* | (2006.01) | |
| *B62B 9/00* | (2006.01) | |
| *B62B 9/20* | (2006.01) | |

(52) U.S. Cl.
CPC .............. *B62B 9/102* (2013.01); *B62B 9/104* (2013.01); *B62B 9/12* (2013.01); *B62B 9/20* (2013.01); *B62B 9/28* (2013.01)

(56) References Cited

U.S. PATENT DOCUMENTS

| | | | |
|---|---|---|---|
| 4,142,027 A | | 2/1979 | Tsygankov et al. |
| 4,191,397 A | | 3/1980 | Kassai |
| 4,354,689 A | | 10/1982 | Perego |
| 4,786,064 A | | 11/1988 | Baghdasarian |
| 4,834,403 A | | 5/1989 | Yanns et al. |
| 4,953,880 A | | 9/1990 | Sudakoff et al. |
| 5,197,753 A | | 3/1993 | Liu |
| 5,201,535 A | * | 4/1993 | Kato ...................... B62B 7/123 297/229 |
| 5,203,577 A | | 4/1993 | Kato et al. |
| 5,215,320 A | | 6/1993 | Chen |
| 5,230,523 A | | 7/1993 | Wilhelm |
| 5,240,265 A | | 8/1993 | Huang |
| 5,265,931 A | | 11/1993 | Ryan |
| 5,364,137 A | | 11/1994 | Shimer |
| 5,499,831 A | * | 3/1996 | Worth ...................... B62B 7/08 280/30 |
| 5,516,142 A | | 5/1996 | Hartan |
| 5,517,718 A | | 5/1996 | Eichhorn |
| 5,562,300 A | | 10/1996 | Nelson |
| 5,596,910 A | | 1/1997 | Bauer et al. |
| 5,601,297 A | | 2/1997 | Stein |
| 5,625,923 A | | 5/1997 | Huang |
| 5,634,537 A | | 6/1997 | Thorn |
| 5,660,430 A | | 8/1997 | Clarke |
| 5,676,386 A | * | 10/1997 | Huang ...................... B62B 7/142 280/47.38 |
| 5,718,439 A | | 2/1998 | Wang |
| 5,765,665 A | | 6/1998 | Cheng et al. |
| 5,794,951 A | * | 8/1998 | Corley ...................... B62B 7/145 280/30 |
| 5,845,917 A | | 12/1998 | Huang |
| 5,845,924 A | | 12/1998 | Huang |
| 5,893,606 A | * | 4/1999 | Chiang ................... A47D 1/004 280/30 |
| 5,935,010 A | | 8/1999 | Clarke |
| 5,975,545 A | | 11/1999 | Hu |
| 5,988,670 A | | 11/1999 | Song et al. |
| 6,022,042 A | | 2/2000 | Hartenstine |
| 6,045,145 A | | 4/2000 | Lan |
| 6,062,577 A | | 5/2000 | Tan |
| 6,070,890 A | * | 6/2000 | Haut ...................... B60N 2/2821 280/30 |
| 6,086,086 A | | 7/2000 | Hanson et al. |
| 6,086,087 A | | 7/2000 | Yang |
| 6,102,167 A | | 8/2000 | Chiu |
| 6,102,431 A | | 8/2000 | Sutherland et al. |
| 6,120,041 A | | 9/2000 | Gehr, Jr. et al. |
| 6,120,054 A | | 9/2000 | Hu |
| 6,155,592 A | | 12/2000 | Hsia |
| 6,163,924 A | | 12/2000 | Ward, Jr. et al. |
| 6,176,459 B1 | | 1/2001 | Wilcox et al. |
| 6,176,507 B1 | | 1/2001 | Bigo et al. |
| 6,193,263 B1 | * | 2/2001 | Lin ...................... B62B 7/145 280/30 |
| 6,238,125 B1 | | 5/2001 | Lin |
| 6,241,274 B1 | | 6/2001 | Huang |
| 6,250,652 B1 | | 6/2001 | Nelson |
| 6,264,007 B1 | | 7/2001 | Norton et al. |
| 6,270,111 B1 | * | 8/2001 | Hanson ............... A61G 5/1089 280/30 |
| 6,286,844 B1 | * | 9/2001 | Cone, II ............... B62B 9/28 280/658 |
| 6,308,805 B1 | | 10/2001 | Lan |
| 6,318,807 B1 | | 11/2001 | Perego |
| 6,341,672 B1 | | 1/2002 | Yang et al. |
| 6,347,777 B1 | | 2/2002 | Webber et al. |
| 6,375,213 B1 | | 4/2002 | Suzuki |
| 6,375,260 B1 | | 4/2002 | Hiramatsu et al. |
| 6,398,233 B1 | * | 6/2002 | Liang ...................... B62B 7/14 280/30 |
| 6,402,114 B1 | | 6/2002 | Carnahan et al. |
| 6,412,809 B1 | | 7/2002 | Bigo et al. |
| 6,439,521 B1 | | 8/2002 | Wilson et al. |
| 6,443,468 B1 | | 9/2002 | Eros |
| 6,446,990 B1 | * | 9/2002 | Nania ...................... B62B 7/145 280/47.38 |
| 6,478,327 B1 | | 11/2002 | Hartenstine et al. |
| 6,478,328 B1 | | 11/2002 | Yeh et al. |
| 6,478,376 B2 | | 11/2002 | Hayashi et al. |
| 6,499,786 B2 | | 12/2002 | Takahashi |
| 6,502,669 B1 | | 1/2003 | Harris |
| 6,513,827 B1 | * | 2/2003 | Barenbrug ............ B62B 7/145 280/643 |
| 6,554,298 B1 | | 4/2003 | Bidwell |
| 6,557,870 B2 | | 5/2003 | Cheng |
| 6,557,885 B1 | | 5/2003 | Kakuda |
| 6,572,134 B2 | | 6/2003 | Barrett et al. |
| 6,592,132 B2 | | 7/2003 | Bidwell |
| 6,595,583 B2 | | 7/2003 | Hou |
| 6,598,712 B1 | | 7/2003 | Sun |
| 6,626,452 B2 | | 9/2003 | Yang et al. |
| 6,666,473 B2 | | 12/2003 | Hartenstine et al. |
| 6,692,015 B2 | | 2/2004 | Perego |
| 6,715,783 B1 | | 4/2004 | Hanson et al. |
| 6,736,451 B1 | | 5/2004 | Chen |
| 6,742,791 B2 | | 6/2004 | Lan |
| 6,793,283 B1 | | 9/2004 | Sipos |
| 6,793,292 B2 | | 9/2004 | Lan |
| 6,830,260 B2 | | 12/2004 | Everett |
| 6,851,700 B2 | | 2/2005 | Yoshie et al. |
| 6,863,286 B2 | * | 3/2005 | Eros ...................... B60N 2/2848 280/47.38 |
| 6,869,096 B2 | | 3/2005 | Allen et al. |
| 6,896,286 B2 | | 5/2005 | Lin |
| 6,908,087 B2 | | 6/2005 | Wintersgill et al. |
| 6,983,986 B2 | | 1/2006 | Jane Santamaria |
| 6,991,248 B2 | | 1/2006 | Valdez et al. |
| 7,017,937 B2 | | 3/2006 | Williams |
| 7,032,922 B1 | * | 4/2006 | Lan ...................... B62B 7/08 280/643 |
| 7,044,497 B2 | | 5/2006 | Hartenstine et al. |
| 7,059,452 B2 | | 6/2006 | Chen |
| 7,070,197 B2 | * | 7/2006 | Chen ...................... B62B 7/145 297/256.16 |
| 7,083,175 B1 | | 8/2006 | Liu |
| 7,118,121 B2 | | 10/2006 | Cheng et al. |
| 7,188,858 B2 | | 3/2007 | Hartenstine et al. |
| 7,210,699 B2 | | 5/2007 | Lan |
| 7,213,818 B2 | | 5/2007 | Chang |
| 7,232,019 B2 | | 6/2007 | Chang et al. |
| 7,267,359 B1 | * | 9/2007 | Yang ...................... B62B 7/142 280/47.38 |
| 7,278,652 B2 | | 10/2007 | Riedl et al. |
| 7,281,732 B2 | | 10/2007 | Fox et al. |
| 7,338,122 B2 | | 3/2008 | Hei et al. |
| 7,367,581 B2 | | 5/2008 | Yang |
| 7,370,913 B2 | | 5/2008 | Takamizu et al. |
| 7,377,537 B2 | | 5/2008 | Li |
| 7,383,925 B2 | | 6/2008 | Chen |
| 7,396,039 B2 | | 7/2008 | Valdez et al. |
| 7,401,803 B1 | * | 7/2008 | Lai ...................... B62B 9/245 280/47.38 |

(56) References Cited

U.S. PATENT DOCUMENTS

| | | | |
|---|---|---|---|
| 7,404,569 B2 | 7/2008 | Hartenstine et al. | |
| 7,410,186 B2 | 8/2008 | Hartenstine et al. | |
| D576,084 S | 9/2008 | Dotsey et al. | |
| 7,445,228 B2 | 11/2008 | Henry | |
| 7,455,336 B2 | 11/2008 | Baumchen et al. | |
| 7,475,900 B2 * | 1/2009 | Cheng | B62B 7/08 280/47.38 |
| 7,497,449 B2 | 3/2009 | Logger | |
| 7,497,461 B2 | 3/2009 | Emerson | |
| 7,500,692 B2 | 3/2009 | Espenshade | |
| 7,537,093 B2 | 5/2009 | Chen | |
| 7,550,692 B2 | 6/2009 | Bong | |
| 7,566,068 B2 | 7/2009 | Santamaria | |
| 7,597,396 B2 | 10/2009 | Longenecker et al. | |
| 7,600,775 B2 | 10/2009 | Chen et al. | |
| 7,614,641 B2 | 11/2009 | Hartenstine et al. | |
| 7,618,093 B2 | 11/2009 | Hung-Chung | |
| 7,632,035 B2 | 12/2009 | Cheng | |
| 7,658,399 B2 | 2/2010 | Van Dijk | |
| 7,677,590 B2 | 3/2010 | Dotsey et al. | |
| 7,681,894 B2 * | 3/2010 | Santamaria | B62B 7/142 280/47.38 |
| 7,686,322 B2 | 3/2010 | Longenecker et al. | |
| 7,686,323 B2 * | 3/2010 | Chen | B62B 7/142 280/47.38 |
| 7,694,980 B2 | 4/2010 | Dotsey et al. | |
| 7,694,995 B2 | 4/2010 | Dotsey et al. | |
| 7,712,765 B2 | 5/2010 | Chen et al. | |
| 7,753,398 B2 | 7/2010 | Yang | |
| 7,766,366 B2 | 8/2010 | Li | |
| 7,766,367 B2 | 8/2010 | Dotsey et al. | |
| 7,780,183 B2 | 8/2010 | Chen et al. | |
| 7,784,801 B2 | 8/2010 | Yeh | |
| 7,798,500 B2 * | 9/2010 | Den Boer | B62B 7/142 280/47.38 |
| 7,798,515 B2 | 9/2010 | Valdez et al. | |
| 7,832,755 B2 | 11/2010 | Nolan et al. | |
| 7,871,099 B2 | 1/2011 | Gilbertson et al. | |
| 7,871,100 B2 | 1/2011 | Chen et al. | |
| 7,900,952 B2 | 3/2011 | Cone, II | |
| 7,909,353 B2 | 3/2011 | Nolan et al. | |
| 7,918,001 B2 | 4/2011 | Buckingham | |
| 7,922,182 B2 | 4/2011 | Van der Vegt | |
| 7,946,650 B2 | 5/2011 | Gillett | |
| 7,971,884 B2 | 7/2011 | Lundh | |
| 7,971,897 B2 | 7/2011 | Pike et al. | |
| 7,971,933 B2 | 7/2011 | Tuckey et al. | |
| D643,344 S | 8/2011 | Barenbrug | |
| D643,345 S | 8/2011 | Barenbrug | |
| D643,346 S | 8/2011 | Barenbrug | |
| D643,786 S | 8/2011 | Barenbrug | |
| 8,033,555 B2 * | 10/2011 | Mostert | B60N 2/2848 280/47.38 |
| 8,056,975 B2 | 11/2011 | Longenecker et al. | |
| 8,061,732 B2 | 11/2011 | Song et al. | |
| 8,087,680 B2 | 1/2012 | Dotsey et al. | |
| 8,087,688 B2 | 1/2012 | Gilbertson et al. | |
| 8,092,111 B2 | 1/2012 | Wu | |
| 8,100,429 B2 | 1/2012 | Longenecker et al. | |
| 8,157,273 B2 | 4/2012 | Bar-Lev | |
| 8,162,025 B2 | 4/2012 | Motosko et al. | |
| 8,172,243 B2 | 5/2012 | Dresher | |
| 8,172,253 B2 | 5/2012 | Song | |
| 8,186,705 B2 | 5/2012 | Greger et al. | |
| 8,205,906 B2 * | 6/2012 | Kretschmer | B62B 7/123 280/47.38 |
| 8,205,907 B2 | 6/2012 | Chicca | |
| 8,220,118 B2 | 7/2012 | Buckingham et al. | |
| 8,226,110 B2 | 7/2012 | Liao | |
| 8,226,111 B2 | 7/2012 | Valdez et al. | |
| 8,231,136 B2 | 7/2012 | Fiore, Jr. | |
| 8,240,700 B2 | 8/2012 | Greger et al. | |
| 8,251,382 B2 * | 8/2012 | Chen | B62B 7/142 280/47.38 |
| 8,262,103 B2 | 9/2012 | Enserink et al. | |
| 8,276,935 B2 | 10/2012 | Minato et al. | |
| 8,282,120 B2 | 10/2012 | Minato et al. | |
| 8,291,555 B2 | 10/2012 | Buckingham et al. | |
| 8,313,115 B2 | 11/2012 | Cheng | |
| 8,316,999 B2 | 11/2012 | Solinski et al. | |
| 8,322,744 B2 | 12/2012 | Ahnert et al. | |
| 8,366,127 B2 | 2/2013 | Zhong et al. | |
| 8,371,606 B2 | 2/2013 | Gower et al. | |
| 8,376,375 B2 * | 2/2013 | Mival | B62B 7/08 280/47.38 |
| 8,382,127 B2 * | 2/2013 | Longenecker | B62B 9/104 280/47.38 |
| 8,382,150 B2 | 2/2013 | Williams et al. | |
| 8,388,254 B2 | 3/2013 | Huang | |
| 8,393,679 B2 | 3/2013 | Longenecker et al. | |
| 8,398,096 B2 | 3/2013 | Gower et al. | |
| 8,398,111 B2 | 3/2013 | Mival et al. | |
| 8,398,143 B1 | 3/2013 | Haley | |
| 8,414,012 B2 * | 4/2013 | Chen | B62B 7/08 280/658 |
| 8,418,816 B2 | 4/2013 | Chen | |
| 8,444,170 B2 | 5/2013 | Chen et al. | |
| 8,448,977 B2 | 5/2013 | Grintz et al. | |
| D683,974 S | 6/2013 | Leys et al. | |
| 8,458,880 B2 | 6/2013 | Fiore, Jr. | |
| 8,459,665 B2 | 6/2013 | Sellers et al. | |
| 8,474,836 B2 | 7/2013 | Yang et al. | |
| 8,474,854 B2 | 7/2013 | Dean et al. | |
| 8,485,546 B2 | 7/2013 | Li et al. | |
| 8,490,757 B2 | 7/2013 | Chen et al. | |
| 8,491,000 B2 * | 7/2013 | Yeh | B62B 7/142 280/647 |
| 8,505,956 B2 | 8/2013 | Hartenstine et al. | |
| 8,517,412 B2 | 8/2013 | Tsai et al. | |
| 8,550,489 B2 | 10/2013 | Valdez et al. | |
| 8,556,780 B2 | 10/2013 | Chen | |
| 8,567,311 B2 | 10/2013 | Kraus | |
| 8,567,866 B2 * | 10/2013 | Carimati Di Carimate | B62B 7/14 297/487 |
| 8,585,063 B2 | 11/2013 | Chen | |
| 8,585,075 B2 * | 11/2013 | Zhong | B62B 7/142 280/47.38 |
| 8,590,919 B2 | 11/2013 | Yi | |
| 8,596,669 B2 | 12/2013 | Liao | |
| 8,596,670 B2 | 12/2013 | di Carimate et al. | |
| 8,602,442 B2 | 12/2013 | Li | |
| 8,608,190 B2 | 12/2013 | Mountz | |
| 8,616,638 B2 | 12/2013 | Zeng et al. | |
| 8,635,743 B2 | 1/2014 | Smith et al. | |
| D699,633 S | 2/2014 | Kobayashi et al. | |
| 8,646,158 B2 | 2/2014 | Buckingham et al. | |
| 8,651,502 B2 * | 2/2014 | Winterhalter | B60N 2/2848 280/643 |
| 8,657,308 B2 | 2/2014 | Gower et al. | |
| 8,657,311 B2 | 2/2014 | Li | |
| 8,662,516 B1 | 3/2014 | Slagerman | |
| 8,672,341 B2 * | 3/2014 | Offord | B62B 7/062 280/47.38 |
| 8,678,498 B2 | 3/2014 | Heisey | |
| 8,696,015 B2 | 4/2014 | Karremans et al. | |
| 8,702,118 B2 | 4/2014 | Gower et al. | |
| 8,708,364 B2 | 4/2014 | Gower et al. | |
| 8,713,765 B2 | 5/2014 | Buckingham et al. | |
| 8,714,581 B2 * | 5/2014 | Fritz | B62B 7/062 280/643 |
| 8,720,936 B1 * | 5/2014 | Lai | B62B 7/008 280/647 |
| 8,764,048 B1 | 7/2014 | Ahnert et al. | |
| 8,777,253 B2 | 7/2014 | Minato et al. | |
| 8,789,662 B2 | 7/2014 | Childs et al. | |
| 8,827,283 B2 | 9/2014 | Homan et al. | |
| 8,840,132 B2 | 9/2014 | Gower et al. | |
| 8,844,964 B2 * | 9/2014 | Chiang | B62B 7/14 280/658 |
| 8,851,505 B2 * | 10/2014 | Van Gelderen | B62B 7/145 280/658 |

(56) References Cited

U.S. PATENT DOCUMENTS

| | | |
|---|---|---|
| 8,864,166 B2 | 10/2014 | Longenecker et al. |
| D716,705 S | 11/2014 | Holefleisch |
| 8,876,147 B2 | 11/2014 | Chicca |
| 8,882,134 B2 | 11/2014 | Rolicki et al. |
| 8,899,614 B2 | 12/2014 | Smith |
| 8,899,615 B2* | 12/2014 | Dijkstra ............... B62B 7/14 280/42 |
| 8,905,427 B2 | 12/2014 | Katz et al. |
| 8,905,428 B2 | 12/2014 | Schroeder et al. |
| 8,919,806 B2 | 12/2014 | Pollack et al. |
| 8,919,807 B2 | 12/2014 | Taylor et al. |
| 8,936,261 B2 | 1/2015 | Yuan |
| 8,955,856 B2* | 2/2015 | Guo ............... B62B 7/145 280/47.38 |
| 8,955,868 B2 | 2/2015 | Haut et al. |
| 8,955,869 B2 | 2/2015 | Zehfuss |
| 8,960,734 B2 | 2/2015 | Camp |
| 8,961,057 B2 | 2/2015 | Schroeder |
| 8,973,217 B2 | 3/2015 | Weichbrodt |
| 8,985,616 B1 | 3/2015 | Chen |
| 8,991,838 B2 | 3/2015 | Li et al. |
| 8,991,853 B2 | 3/2015 | Li et al. |
| 8,991,854 B2 | 3/2015 | Greger et al. |
| 8,997,948 B2 | 4/2015 | Li et al. |
| 9,010,773 B2* | 4/2015 | Horst ............... B62B 7/145 280/47.38 |
| 9,044,104 B2 | 6/2015 | Smith |
| 9,050,993 B2 | 6/2015 | Pollack |
| 9,067,613 B2 | 6/2015 | Yi et al. |
| 9,085,312 B2* | 7/2015 | Liu ............... B62B 7/062 |
| 9,090,125 B2 | 7/2015 | Block et al. |
| 9,108,658 B2 | 8/2015 | Spencer et al. |
| 9,108,659 B2* | 8/2015 | Sparling ............... B62B 7/142 |
| 9,139,044 B1 | 9/2015 | Tsai |
| 9,150,236 B2 | 10/2015 | Zhang |
| 9,174,662 B2 | 11/2015 | Zhang |
| 9,193,370 B2 | 11/2015 | Henry |
| 9,193,373 B2 | 11/2015 | Fjelland et al. |
| 9,205,855 B2 | 12/2015 | Gower et al. |
| 9,216,755 B2 | 12/2015 | Eisinger |
| 9,227,650 B2* | 1/2016 | Gillett ............... B62B 9/28 |
| 9,260,127 B2 | 2/2016 | Rolicki et al. |
| 9,260,128 B2* | 2/2016 | Liu ............... B62B 7/145 |
| D756,852 S | 5/2016 | Barenbrug |
| 9,327,752 B2 | 5/2016 | Jane Santamaria |
| 9,399,477 B2 | 7/2016 | Iftinca et al. |
| 9,403,449 B2 | 8/2016 | Longenecker et al. |
| 9,403,549 B2 | 8/2016 | Driessen |
| 9,403,550 B2 | 8/2016 | Zehfuss |
| 9,415,790 B2 | 8/2016 | Driessen |
| 9,428,208 B1 | 8/2016 | Chen |
| 9,463,822 B2 | 10/2016 | Sundberg et al. |
| 9,481,206 B2 | 11/2016 | Block et al. |
| 9,493,178 B2 | 11/2016 | Smith et al. |
| 9,517,786 B2* | 12/2016 | Chang ............... B62B 7/062 |
| 9,517,787 B2* | 12/2016 | Zehfuss ............... B62B 7/062 |
| 9,517,789 B2* | 12/2016 | Pacella ............... B62B 7/06 |
| 9,522,615 B2 | 12/2016 | Longenecker et al. |
| 9,540,028 B2 | 1/2017 | Taylor et al. |
| 9,545,940 B2* | 1/2017 | Taylor ............... B62B 7/142 |
| 9,545,941 B2 | 1/2017 | Pacella et al. |
| 9,561,816 B2 | 2/2017 | Dowd et al. |
| 9,610,966 B2* | 4/2017 | Zhong ............... B62B 7/142 |
| 9,630,642 B2 | 4/2017 | Zehfuss et al. |
| 9,637,153 B2 | 5/2017 | Sclare |
| 9,643,640 B2 | 5/2017 | Gower et al. |
| 9,701,332 B2 | 7/2017 | Zheng |
| 9,725,107 B2 | 8/2017 | Li |
| 9,776,652 B2* | 10/2017 | Zhong ............... B62B 7/10 |
| 9,796,404 B2 | 10/2017 | Xu |
| 9,815,487 B2 | 11/2017 | Dowd et al. |
| 9,821,831 B2 | 11/2017 | Reaves et al. |
| 9,840,168 B2* | 12/2017 | Yi ............... B62B 7/142 |
| 9,849,903 B1* | 12/2017 | Lai ............... B62B 7/142 |
| 9,862,401 B2 | 1/2018 | Wuerstl |
| 9,884,640 B2* | 2/2018 | Li ............... B62B 7/08 |
| 9,889,872 B2* | 2/2018 | Somerset ............... B62B 9/14 |
| 9,902,417 B2 | 2/2018 | Storm et al. |
| 9,908,551 B2 | 3/2018 | Ransil |
| 9,944,305 B2 | 4/2018 | Lee et al. |
| 9,950,730 B2 | 4/2018 | Gao |
| 9,962,011 B1* | 5/2018 | Eyman ............... B62B 9/12 |
| 10,000,226 B2* | 6/2018 | Yi ............... B62B 9/20 |
| 10,023,218 B2* | 7/2018 | Paxton ............... A47D 1/006 |
| 10,077,063 B2* | 9/2018 | Haut ............... B62B 7/08 |
| 10,144,442 B2 | 12/2018 | Ransil |
| 10,150,496 B2 | 12/2018 | Oakes |
| 10,155,528 B2 | 12/2018 | Zhong et al. |
| 10,239,550 B2* | 3/2019 | Ruggiero ............... B62B 7/105 |
| 10,414,423 B2* | 9/2019 | Zhong ............... B62B 7/08 |
| 10,442,453 B2* | 10/2019 | Haut ............... B62B 7/08 |
| 10,449,987 B2* | 10/2019 | Gibson ............... B62B 9/28 |
| 10,556,610 B2 | 2/2020 | Rolicki et al. |
| 10,960,913 B2* | 3/2021 | Eyman ............... B62B 9/00 |
| 10,994,763 B2* | 5/2021 | Rolicki ............... B62B 9/20 |
| 11,052,934 B2* | 7/2021 | Xu ............... B62B 7/083 |
| 11,059,510 B2* | 7/2021 | Eyman ............... B62B 7/08 |
| 2002/0041082 A1 | 4/2002 | Perego |
| 2003/0094791 A1 | 5/2003 | Hartenstine et al. |
| 2004/0090046 A1 | 5/2004 | Hartenstine et al. |
| 2005/0150053 A1 | 7/2005 | Hartenstine |
| 2005/0167951 A1 | 8/2005 | Zhen |
| 2005/0225056 A1 | 10/2005 | Dotsey et al. |
| 2005/0242548 A1 | 11/2005 | Hutchinson et al. |
| 2005/0264064 A1 | 12/2005 | Hei et al. |
| 2007/0013167 A1 | 1/2007 | Henry |
| 2007/0031224 A1 | 2/2007 | Lutz |
| 2007/0045975 A1* | 3/2007 | Yang ............... B62B 7/14 280/47.38 |
| 2007/0085303 A1 | 4/2007 | Cheng |
| 2007/0108710 A1 | 5/2007 | Pennisi et al. |
| 2007/0126195 A1 | 6/2007 | Dresher |
| 2007/0187914 A1 | 8/2007 | Jane Santamaria |
| 2007/0241524 A1 | 10/2007 | Dotsey et al. |
| 2008/0079240 A1 | 4/2008 | Yeh |
| 2008/0093825 A1 | 4/2008 | Yang |
| 2008/0211206 A1 | 9/2008 | Thome et al. |
| 2008/0224450 A1* | 9/2008 | Van der Vegt ............ B62B 9/14 188/20 |
| 2008/0231023 A1* | 9/2008 | Yang ............... B62B 9/203 280/650 |
| 2009/0194973 A1 | 8/2009 | Wang |
| 2009/0206566 A1 | 8/2009 | Enserink et al. |
| 2009/0295128 A1 | 12/2009 | Nagelski et al. |
| 2009/0315299 A1 | 12/2009 | Barenbrug |
| 2010/0038887 A1* | 2/2010 | Bar-Lev ............... B62B 9/26 280/658 |
| 2010/0052277 A1 | 3/2010 | Zehfuss |
| 2010/0109293 A1 | 5/2010 | Friisdahl et al. |
| 2010/0127480 A1 | 5/2010 | Ahnert et al. |
| 2010/0140902 A1 | 6/2010 | Zehfuss |
| 2010/0230933 A1 | 9/2010 | Dean et al. |
| 2010/0237637 A1 | 9/2010 | Camp |
| 2011/0012324 A1 | 1/2011 | Yeh et al. |
| 2011/0062676 A1 | 3/2011 | Gower et al. |
| 2011/0148076 A1 | 6/2011 | Chen |
| 2011/0163519 A1 | 7/2011 | Van Gelderen et al. |
| 2011/0175330 A1* | 7/2011 | Smith ............... B62B 7/08 280/649 |
| 2011/0181024 A1 | 7/2011 | Chicca |
| 2011/0193325 A1* | 8/2011 | Li ............... B62B 7/14 280/650 |
| 2011/0221169 A1 | 9/2011 | Karremans et al. |
| 2011/0266762 A1* | 11/2011 | Chen ............... B62B 9/104 280/47.38 |
| 2011/0272925 A1* | 11/2011 | Dijkstra ............... B62B 7/14 280/658 |
| 2011/0291388 A1 | 12/2011 | Sellers et al. |
| 2011/0291389 A1 | 12/2011 | Offord |
| 2011/0309658 A1* | 12/2011 | Carimati Di Carimate ............... B60N 2/2821 297/378.12 |
| 2012/0242062 A1 | 9/2012 | Schroeder et al. |

(56) References Cited

U.S. PATENT DOCUMENTS

| | | | |
|---|---|---|---|
| 2012/0326474 A1 | 12/2012 | Williams et al. | |
| 2013/0049331 A1* | 2/2013 | Di Carimate | B62B 7/08 |
| | | | 280/47.4 |
| 2013/0113185 A1 | 5/2013 | Zehfuss | |
| 2013/0153616 A1 | 6/2013 | Geva et al. | |
| 2013/0154215 A1 | 6/2013 | Thomas et al. | |
| 2013/0154322 A1 | 6/2013 | Gower et al. | |
| 2013/0227817 A1 | 9/2013 | Block et al. | |
| 2013/0257002 A1* | 10/2013 | Horst | B62B 7/142 |
| | | | 280/47.38 |
| 2013/0270800 A1* | 10/2013 | Chiang | B62B 7/142 |
| | | | 280/658 |
| 2014/0044472 A1 | 2/2014 | Lin et al. | |
| 2014/0054939 A1 | 2/2014 | Hu | |
| 2014/0056638 A1 | 2/2014 | Wu et al. | |
| 2014/0167393 A1 | 6/2014 | Tsai et al. | |
| 2014/0183843 A1 | 7/2014 | Iftinca et al. | |
| 2014/0191483 A1 | 7/2014 | Rolicki et al. | |
| 2015/0021872 A1 | 1/2015 | Rolicki et al. | |
| 2015/0042075 A1 | 2/2015 | Smith et al. | |
| 2015/0074947 A1 | 3/2015 | Rezaei | |
| 2015/0076774 A1 | 3/2015 | Sclare | |
| 2015/0108738 A1 | 4/2015 | Pollack et al. | |
| 2015/0136553 A1 | 5/2015 | Den Boer et al. | |
| 2015/0152665 A1 | 6/2015 | Camp | |
| 2015/0158334 A1 | 6/2015 | Hartenstine et al. | |
| 2015/0197268 A1 | 7/2015 | Dowd et al. | |
| 2015/0274188 A1 | 10/2015 | Li | |
| 2015/0291200 A1 | 10/2015 | Taylor et al. | |
| 2015/0375766 A1* | 12/2015 | Taylor | B62B 7/142 |
| | | | 280/647 |
| 2016/0001804 A1 | 1/2016 | Pacella et al. | |
| 2016/0046314 A1 | 2/2016 | Zehfuss et al. | |
| 2016/0159385 A1 | 6/2016 | Rolicki et al. | |
| 2016/0288814 A1 | 10/2016 | Li | |
| 2016/0332655 A1 | 11/2016 | Reaves et al. | |
| 2017/0021851 A1 | 1/2017 | Pujol | |
| 2017/0144686 A1 | 5/2017 | Pujol et al. | |
| 2017/0203779 A1 | 7/2017 | Gower et al. | |
| 2017/0217471 A1 | 8/2017 | Haut et al. | |
| 2017/0240197 A1 | 8/2017 | Oakes | |
| 2017/0297600 A1 | 10/2017 | Zhong et al. | |
| 2017/0313337 A1 | 11/2017 | Horst | |
| 2018/0001950 A1 | 1/2018 | Allen | |
| 2018/0029625 A1 | 2/2018 | Ruggiero et al. | |
| 2018/0111636 A1 | 4/2018 | Gower et al. | |
| 2019/0009811 A1 | 1/2019 | Haut et al. | |
| 2019/0168794 A1* | 6/2019 | Eyman | B62B 9/28 |
| 2019/0193769 A1 | 6/2019 | Xu et al. | |
| 2019/0256121 A1* | 8/2019 | Rolicki | B62B 7/08 |
| 2019/0256122 A1* | 8/2019 | Eyman | B62B 7/142 |
| 2020/0172143 A1* | 6/2020 | Zhong | B62B 7/068 |
| 2020/0353966 A1* | 11/2020 | Taylor | B60N 2/28 |
| 2021/0284224 A1 | 9/2021 | Eyman et al. | |
| 2021/0362765 A1* | 11/2021 | Fan | B62B 7/123 |
| 2021/0403070 A1 | 12/2021 | Xu et al. | |
| 2022/0001908 A1 | 1/2022 | Eyman et al. | |

FOREIGN PATENT DOCUMENTS

| | | |
|---|---|---|
| CN | 201161604 | 12/2008 |
| CN | 201530404 | 7/2010 |
| CN | 101837799 | 9/2010 |
| CN | 201792891 | 4/2011 |
| CN | 102848945 | 1/2013 |
| CN | 104354750 | 2/2015 |
| CN | 205022654 | 2/2016 |
| CN | 205186242 | 4/2016 |
| CN | 205345000 | 6/2016 |
| DE | 3130163 | 2/1983 |
| DE | 10011588 | 1/2001 |
| DE | 202007011019 | 12/2007 |
| DE | 202010011566 | 11/2010 |
| EP | 791500 | 2/1997 |
| EP | 1918155 | 5/2008 |
| EP | 1992543 | 11/2008 |
| EP | 2192022 | 6/2010 |
| EP | 2275321 | 1/2011 |
| EP | 2368784 | 9/2011 |
| EP | 2420429 | 2/2012 |
| EP | 2892790 | 7/2015 |
| EP | 2927090 | 10/2015 |
| FR | 2648102 | 12/1990 |
| GB | 2171299 | 8/1986 |
| GB | 2193692 | 2/1988 |
| GB | 2431140 | 4/2007 |
| JP | 2008030741 | 2/2008 |
| TW | M290119 U | 5/2006 |
| TW | M325960 U | 1/2008 |
| WO | 2008033014 | 3/2008 |
| WO | 2010047596 | 4/2010 |
| WO | 2014037177 | 3/2014 |
| WO | 2015109103 | 7/2015 |
| WO | 2018022889 | 2/2018 |
| WO | 2018022893 | 2/2018 |
| WO | 2018022895 | 2/2018 |
| WO | 2019019097 | 1/2019 |

OTHER PUBLICATIONS

International Searching Authority, "Written Opinion of the International Searching Authority," issued in connection with International Patent Application No. PCT/US2017/044190, dated Sep. 27, 2017, 7 pages.

International Search Authority, "International Search Report," issued in connection with International Patent Application No. PCT/US2017/044192, dated Oct. 24, 2017, 3 pages.

International Search Authority, "Written Opinion of the International Searching Authority," issued in connection with International Patent Application No. PCT/US2017/044192, dated Oct. 24, 2017, 11 pages.

International Search Authority, "International Search Report," issued in connection with International Patent Application No. PCT/US2017/044183, dated Oct. 24, 2017, 3 pages.

International Search Authority, "Written Opinion of the International Searching Authority," issued in connection with International Patent Application No. PCT/US2017/044183, dated Oct. 24, 2017, 9 pages.

International Searching Authority, "International Search Report and Written Opinion," issued in connection with International Patent Application No. PCT/CN2017/094679, dated Mar. 27, 2018, 8 pages.

The International Bureau of WIPO, "International Preliminary Report on Patentability," dated Jan. 29, 2019 in connection with International Patent Application No. PCT/US2017/044192, 12 pages.

The International Bureau of WIPO, "International Preliminary Report on Patentability," dated Jan. 29, 2019 in connection with application No. PCT/US2017/044190, 8 pages.

United States Patent and Trademark Office, "Notice of Allowance," issued in connection with U.S. Appl. No. 16/322,350, dated Dec. 12, 2019, 8 pages.

The International Bureau of WIPO, "International Preliminary Report on Patentability," issued in connection with International Patent Application No. PCT/CN2017/094679, dated Jan. 28, 2020, 5 pages.

European Patent Office, "Extended European Search Report," issued in connection with European Patent Application No. 17835273.8, dated Mar. 13, 2020, 9 pages.

The International Bureau of WIPO, "International Preliminary Report on Patentability," issued in connection with International Patent Application No. PCT/US2017/044183, dated Jan. 29, 2019, 10 pages.

European Patent Office, "Extended European Search Report," issued in connection with European Patent Application No. 17835275.3, dated Mar. 13, 2020, 8 pages.

United States Patent and Trademark Office, "Notice of Allowance," issued in connection with U.S. Appl. No. 16/322,350, dated Apr. 20, 2020, 8 pages.

(56) References Cited

OTHER PUBLICATIONS

European Patent Office, "Extended European Search Report," issued in connection with European Patent Application No. 17919214.1, dated Jun. 2, 2020, 8 pages.

United States Patent and Trademark Office, "Office Action," issued in connection with U.S. Appl. No. 16/320,910, dated Jun. 19, 2020, 14 pages.

United States Patent and Trademark Office, "Notice of Allowance," issued in connection with U.S. Appl. No. 16/322,350, dated Aug. 25, 2020, 8 pages.

United States Patent and Trademark Office, "Non-Final Office Action," issued in connection with U.S. Appl. No. 16/320,914, dated Aug. 21, 2020, 5 pages.

United States Patent and Trademark Office, "Non-Final Office Action," issued in connection with U.S. Appl. No. 16/320,913, dated Sep. 4, 2020, 5 pages.

China National Intellectual Property Administration, "Office Action," issued in connection with Chinese Patent Application No. 201780056227, dated Nov. 4, 2020, 19 pages (includes English translation).

China National Intellectual Property Administration, "Office Action," issued in connection with Chinese Patent Application No. 201780056364, dated Nov. 17, 2020, 8 pages.

United States and Patent and Trademark Office, "Notice of Allowance," issued in connection with U.S. Appl. No. 16/320,910, dated Nov. 25, 2020, 8 pages.

United States Patent and Trademark Office, "Notice of Allowance," issued in connection with U.S. Appl. No. 16/320,913, dated Dec. 30, 2020, 5 pages.

Chinese Patent Office, "Office Action," issued in connection with Chinese Patent Application No. 201780056235.4, dated Dec. 30, 2020, 23 pages (includes English translation).

United States Patent and Trademark Office, "Notice of Allowance," issued in connection with U.S. Appl. No. 16/322,350, dated Feb. 11, 2021, 8 pages.

United States Patent and Trademark Office, "Notice of Allowance," issued in connection with U.S. Appl. No. 16/320,914, dated Mar. 10, 2021, 5 pages.

China National Intellectual Property Administration, "2nd Office Action," issued in connection with Chinese Patent Application No. 201780056227.X, dated Jun. 25, 2021, 16 pages (includes English translation).

China National Intellectual Property Administration, "Notice of Allowance," issued in connection with Chinese Patent Application No. 201780056364.3, dated Jul. 13, 2021, 7 pages.

China National Intellectual Property Administration, "Notice of Allowance," issued in connection with Chinese Patent Application No. 201780056227.X, dated Dec. 1, 2021, 5 pages (includes English translation).

China National Intellectual Property Administration, "Second Office Action," issued in connection with Chinese Patent Application No. 201780056235.4, dated Nov. 18, 2021, 21 pages (includes English translation).

European Patent Office, "Communication pursuant to Article 94(3) EPC," issued in connection with European Patent Application No. 17835275.3, dated Mar. 3, 2022, 6 pages.

European Patent Office, "Communication pursuant to Article 94(3) EPC," issued in connection with European Patent Application No. 17835273.8, dated Mar. 3, 2022, 6 pages.

China National Intellectual Property Administration, "Notice of Decision of Granting Patent Right for Invention," issued in connection with Chinese Patent Application No. 201780056235.4, dated May 7, 2022, 5 pages (includes English translation).

United States Patent and Trademark Office, "Non-Final Office Action," issued in connection with U.S. Appl. No. 17/365,569, dated Oct. 14, 2022, 7 pages.

* cited by examiner

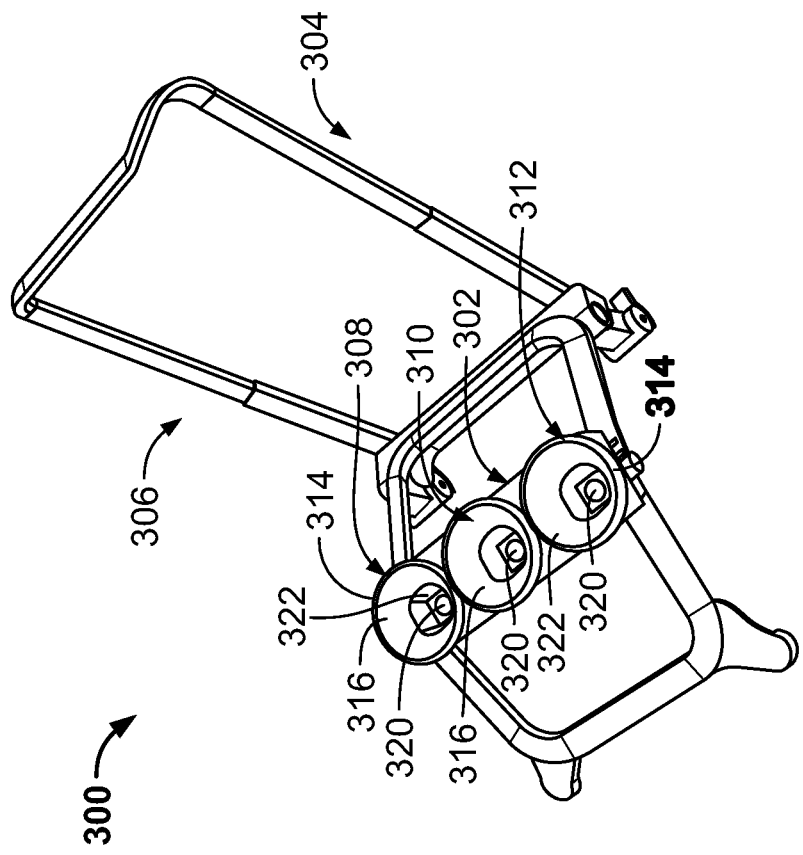
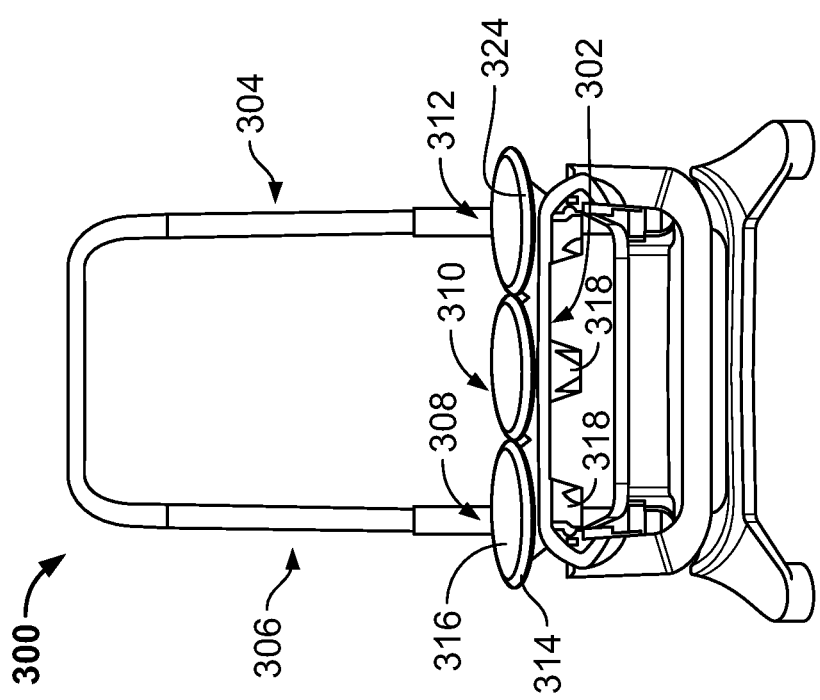

FOLDABLE STROLLERS WITH REMOVEABLE SEATS AND RELATED METHODS

RELATED APPLICATIONS

This patent arises from a continuation of U.S. patent application Ser. No. 16/320,913, now U.S. Pat. No. 10,994,763, which was filed on Jan. 25, 2019. U.S. patent application Ser. No. 16/320,913 is a national stage application under 35 U.S.C. § 371 of International Patent Application No. PCT/US2017/044183, which was filed on Jul. 27, 2017. International Patent Application No. PCT/US2017/044183 claims priority to U.S. Provisional Patent Application Ser. No. 62/367,421, which was filed on Jul. 27, 2016. U.S. patent application Ser. No. 16/320,913, International Patent Application No. PCT/US2017/044183, and U.S. Provisional Patent Application Ser. No. 62/367,421 are hereby incorporated by reference in their entireties. Priority to U.S. patent application Ser. No. 16/320,913, International Patent Application No. PCT/US2017/044183, and U.S. Provisional Patent Application Ser. No. 62/367,421 is hereby claimed.

FIELD OF THE DISCLOSURE

The present disclosure relates generally to strollers and, more particularly, to foldable strollers with removable seats and related methods.

BACKGROUND

Known strollers include a frame to support one or more seats and/or accessories (e.g., a basket).

BRIEF DESCRIPTION OF THE DRAWINGS

FIG. 3A is a front perspective view of a portion of an example stroller frame (wheels removed) for coupling one or more seats thereto.

FIG. 3B is a top, right perspective view of the example stroller frame of FIG. 3A.

Figure 2:
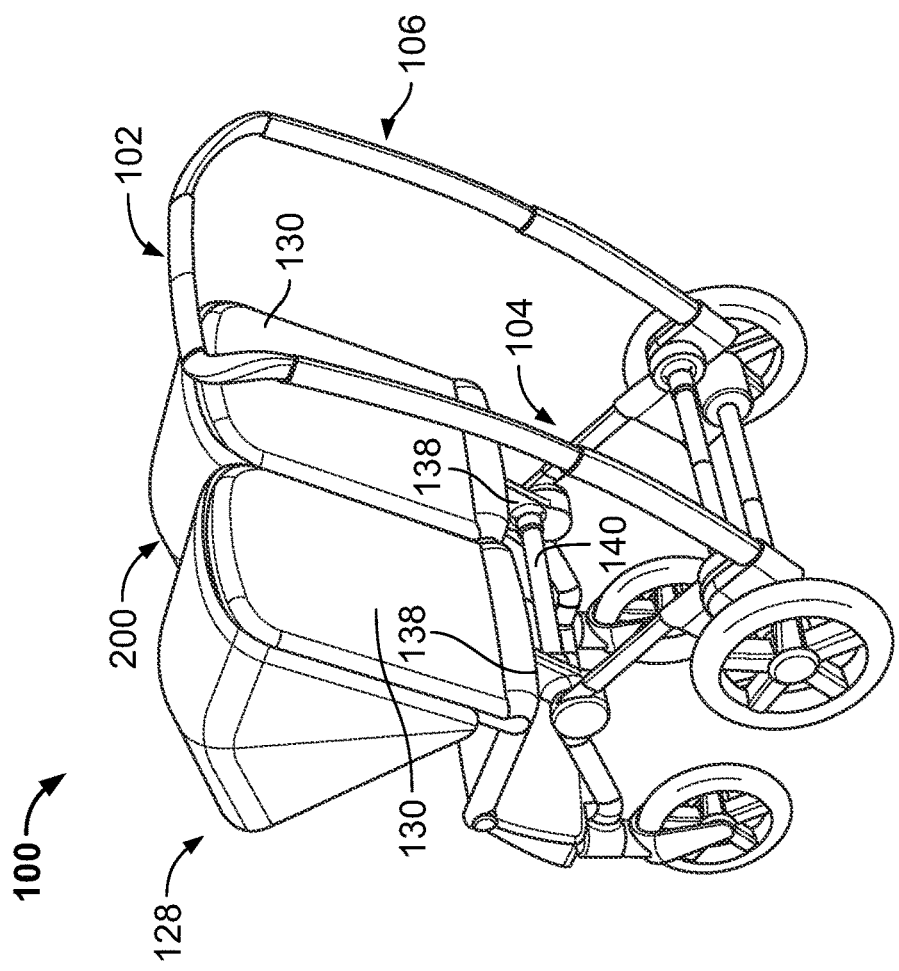
FIG. 2 is a right, rear perspective view of the example stroller of FIG. 1 having two seats attached to the stroller frame in accordance with the teachings of this disclosure.

The figures are not to scale. Wherever possible, the same reference numbers will be used throughout the drawing(s) and accompanying written description to refer to the same or like parts. As used in this patent, stating that any part (e.g., a layer, area, or plate) is in any way positioned on (e.g., located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Strollers typically include a frame and a seat supported by the frame to receive a child occupant. In some examples, an accessory, such as a basket, is also supported by the frame. However, some known strollers are limited with respect to a number of seats provided. For example, some strollers include only one seat for one child. If a user wishes to carry a second child in the stroller, the user has to purchase a different stroller that includes two seats (e.g., a double stroller). However, a double stroller having two identical seats may not be appropriate if, for example, one child is capable of sitting upright but the other child cannot sit upright because of the child's age. Also, a double stroller may be difficult to push if there is only one child in the stroller because of the extra unoccupied seat and/or uneven loading of the stroller. Thus, some known strollers do not provide for flexibility in accommodating different numbers of occupants and/or occupants of different ages.

To provide for flexibility in the number of occupants, some known strollers include an expandable stroller frame which allows a user to move the stroller frame from a first width to a second width greater than the first width. In the non-expanded position having the first width, the stroller may have one seat coupled to the stroller frame. In the expanded position having the second width, two seats may be coupled to the stroller frame. To return the stroller to the non-expanded position, the user compresses the frame. However, such strollers are difficult for the user to manipulate, as these strollers require the user to reconfigure the stroller frame, including expanding the stroller frame before attaching the second seat. If the stroller frame is not properly secured in the expanded position or the non-expanded position, the stability of the stroller frame and, thus, the support provided by the stroller frame for one or more occupants seated in the seat(s) attached to the stroller frame may be compromised.

Disclosed herein are example strollers for removably coupling one or more seats and/or accessories (e.g., baskets) to the stroller frame. In the disclosed examples, the one or more seats and/or accessories are removably coupled to the stroller frame without changing a size of the stroller frame. Rather, one seat, two seats, or one seat and an accessory can be selectively coupled to the stroller frame without any adjustments to the frame itself.

Example strollers frames disclosed herein selectively move between supporting one seat or accessory, one seat and an accessory, or two seats or accessories via a coupling mechanism between the stroller frame and the seat(s) and/or the accessory/accessories. Example stroller frames disclosed herein include a mount bar for supporting one or more seats and/or accessories coupled to the stroller frame. The mount bar includes a plurality of receivers. Each receiver receives a corresponding part of a seat or an accessory to removably secure the seat or the accessory to the stroller frame at one or more positions relative to the stroller frame (e.g., left, right, or middle).

Further, a position of the one or more seats or accessories coupled to the example stroller frames can be varied with respect to (1) placement relative to a left side, a center, and/or a right side of the stroller and/or (2) orientation including forward- or rearward-facing or sideways relative to a direction of travel of the stroller. The placement and/or orientation of the one or more seats or accessories can be varied without modification to the stroller frame or the coupling mechanism between the seats or accessories and the stroller frame. Additionally, the disclosed example strollers can receive different types of seats, such as an upright seat, a car seat, and/or a bassinet. In some disclosed examples, an upright seat and a bassinet can each be coupled to the stroller frame to accommodate differently aged children. One of the seats can be removed from the frame to reduce the occupancy of the stroller. The stroller can be used as a single-seat stroller. In other examples, a basket accessory can be coupled to the stroller frame in place of the second seat to provide storage space. Also, in some examples, the seat(s) may be removed and only an accessory may be coupled to the frame such as, for example, one or more basket(s), and the frame may be used to transport items (e.g., groceries). In disclosed examples, the coupling mechanism between the stroller frame and the seat(s) and accessories are same for each seat or accessory to provide for easy installation and removal of the seat or accessory by the user.

Example strollers disclosed herein also include a foldable frame that can be moved from a collapsed position to a stored position when the seat(s) and/or accessories have been uncoupled from the stroller frame. Thus, the disclosed example strollers can be easily stored when not in use.

An example stroller disclosed herein includes a wheeled frame and a receiver coupled to the frame. The example stroller includes a seat. The seat includes a mount and a lock disposed in the mount. The seat also includes a handle having an extended positon and a retracted position relative to the seat. In the example stroller, the lock is to move from a first position to a second position when the mount is disposed in the receiver to removably couple the seat to the frame, and the lock is to move from the second position to the first position to release the seat from the receiver when the handle moves from the retracted position to the extended position.

In some examples, the stroller includes a plunger disposed in the mount. The plunger is to cause the lock to move from the first position to the second position when a surface of the plunger engages a surface of the receiver. In some such examples, the stroller includes a table rotatably coupled to the plunger. In such examples, the lock is pivotably coupled to the table.

In some examples, in the second position, the lock is disposed in an opening defined by the receiver.

In some examples, the receiver is a first receiver and the seat is a first seat. In some such examples, the stroller includes a second receiver coupled to the frame and a second seat couplable to the second receiver.

In some examples, the handle includes a first handle and a second handle opposite the first handle. In some such examples, the lock is to move from the second position to the first position when each of the first handle and the second handle moves from a respective retracted position to a respective extended position.

In some examples, the stroller includes a second lock disposed in the mount. The second lock is to lock the first handle and the second handle in the respective retracted positions when the lock is in the second position.

In some examples, the handle includes a first handle and a second handle opposite the first handle. In some such examples, the lock is to move from the second position to the first position when the second handle is unlocked from the first handle via pivoting of the first handle.

In some examples, the receiver includes a substantially frustoconical portion and the mount includes a substantially complementary frustoconical portion.

In some examples, the stroller includes a plunger disposed in the mount and a support disposed in the mount. The stroller includes a first link to couple the plunger to the support. The first link is to pivot to move the lock from the first position to the second position when a surface of the plunger engages a surface of the receiver.

In some examples, the stroller includes an actuator disposed in the mount and a plate coupled to the actuator and slidably coupled to the handle. In such examples, the actuator is to rotate to move the lock from the first position to the second position via sliding of the plate when the handle moves from the retracted position to the extended position.

In some examples, the frame includes a first side and a second side. Each of the first side and the second side include a handle arm, a first leg coupled to the handle arm via a first joint, and a second leg coupled to the first leg via a second joint. The handle arm is to rotate to cause the second leg to pivot about the second joint to fold the stroller. In some such examples, the first joint and the second joint are coupled via a cable.

In some examples, the seat includes a seat base and a seat back. The seat back is pivotably coupled to the seat base. In some such examples, the seat base includes a first receiver and a second receiver, and the seat back includes a pulley, a first locking pin selectively disposed in the first receiver, and a second locking pin selectively disposed in the second receiver. The pulley is to disengage the first and second locking pins from the respective first and second receivers to enable rotation of the seat back relative to the seat base.

Figure 1:
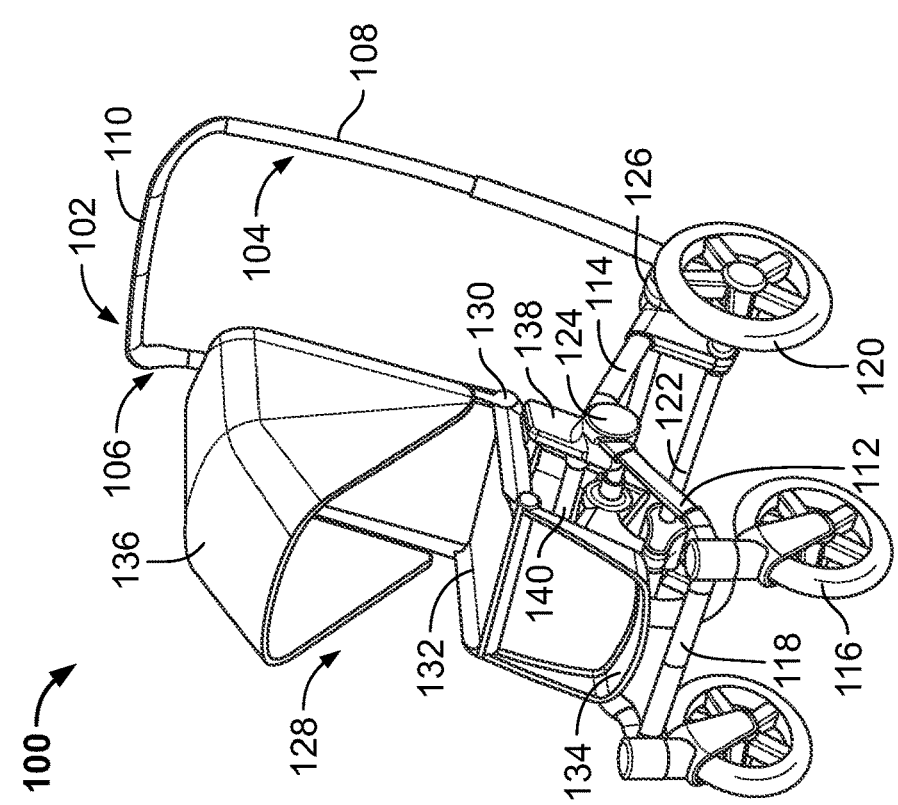
FIG. 1 is a right, front perspective view of an example stroller having one seat attached to a frame of the stroller in accordance with the teachings of this disclosure.

Turning to the figures, FIG. 1 is a right, front perspective view of an example stroller 100 constructed in accordance with the teachings of this disclosure. The example stroller 100 illustrated in FIG. 1 includes a frame 102 having a first side 104 and a second side 106. The first side 104 and the second side 106 of the stroller frame 102 include a plurality of frame members and wheels attached to the frame members. The frame members and wheels of the first side 104 of the stroller frame 102 will be described herein with the understanding that the second side 106 is a mirror image of the first side 104. Thus, the second side 106 includes substantially identical frame members and wheels as the first side 104 and, in the interest of brevity, will not be repeatedly detailed herein.

In the illustrated example stroller 100, the first side 104 includes an arm 108 extending from a parent handle 110. The parent handle 110 is disposed between the first side 104 and the second side 106 of the stroller frame 102. In some examples, the arm 108 and the parent handle 110 are integrally formed from a unit such as, for example, a tube. In some examples, a height of the parent handle 110 is adjustable via adjustment of height of the arm 108.

The first side 104 of the stroller frame 102 also includes a front leg 112 and a rear leg 114. A front wheel 116 is rotatably coupled to the front leg 112. In some examples, the front wheel 116 is rotatably coupled to a front bar 118 that extends between the first side 104 and the second side 106. A rear wheel 120 is coupled to the rear leg 114. In some examples, a rear wheel 120 is coupled to a rear bar 122 that extends between the first side 104 and the second side 106. While the example stroller 100 of FIG. 1 includes four wheels (e.g., two front wheels 116 and two rear wheels 120 coupled to the first and second sides 104, 106 of the stroller frame 102), different numbers of front and/or rear wheels are used in other examples (e.g., a single front wheel).

In the illustrated example, the front leg 112 and the rear leg 114 are coupled via a joint 124. The rear leg 114 and the arm 108 are coupled via a hub 126 (e.g., a second joint). The joint 124 and the hub 126 facilitate folding of the stroller such that front leg 112 and the arm 108 and, thus, the parent handle 110 are free to rotate relative to the rear leg 114 as will be further disclosed below in connection with FIGS. 20-26. The example stroller 100 can also include, for example, a braking mechanism.

The example stroller 100 of FIG. 1 includes a first seat 128 disposed between the first side 104 and the second side 106. The first seat 128 includes a seat frame 130 mounted to the stroller frame 102 and soft goods 132 attached to the seat frame 130. Also, in some examples, the seat frame 130 includes a footrest 134 and a canopy 136.

In the example stroller 100 of FIG. 1, the first seat 128 is removably coupled to the stroller frame 102 via a seat mount 138 of the seat frame 130, which is coupled to a mount bar 140 of the stroller frame 102. The mount bar 140 extends between the first and second sides 104, 106 of the stroller frame 102. In some examples, the first seat 128 is mounted to the stroller frame 102 such that a longitudinal axis extending through a center of the first seat 128 is substantially aligned with a longitudinal axis extending through a center of the mount bar 140. In other examples, a center of the first seat 128 is positioned right or left relative to the center of the mount bar 140. Put another way, the center of the first seat 128 can be disposed closer to the first side 104 or the second side 106 of the example stroller 100. For example, the first seat 128 may be coupled to the mount bar 140 such that a center of the first seat 128 is located closer to first side 104 of the example stroller 100 than the second side 106 of the example stroller 100. In some such examples, a portion of the seat frame 130 may overhang in the stroller frame 102 when the first seat 128 is coupled proximate to the first or second sides 104, 106 of the stroller frame 102.

FIG. 2 is a rear, right perspective view of the example stroller 100 of FIG. 1 including the first seat 128 and a second seat 200 removably coupled to the mount bar 140 of the stroller frame 102. In some examples, the second seat 200 is substantially the same as the first seat 128. For example, the second seat 200 includes a seat frame (e.g., the seat frame 130 of FIG. 1) and a seat mount (e.g., the seat mount 138 of FIG. 1). The second seat 200 can also include, for example, the soft goods 132, the footrest 134, and the canopy 136.

Each of the first and second seats 128, 200 is coupled to the mount bar 140 of the stroller frame 102 via the respective seat mounts 138 of the respective seat frames 130 of the seats 128, 200. As shown in FIG. 2, the first seat 128 is disposed proximate to the first side 104 of the example stroller 100, and the second seat 200 is disposed proximate to the second side 106 of the example stroller 100. Thus, as compared to the placement of the first seat 128 relative to the stroller frame 102 illustrated in FIG. 1, in FIG. 2, a center of the first seat 128 is shifted to a right of the center of the mount bar 140. The shifting of the first seat 128 allows the second seat 200 to be coupled to the mount bar 140 lateral to the coupling of the first seat 128 to the mount bar 140. Thus, each of the first and second seats 128, 200 are coupled to the mount bar 140. FIGS. 1 and 2 illustrate that one or more seats can be removably coupled to the example stroller 100 via the mount bar 140.

As disclosed above, each of the first and second seats 128, 200 are removably coupled to the example stroller 100 of FIG. 1 via the seat mounts 138, which are coupled to the mount bar 140. FIG. 3A is a front perspective view of an example stroller frame 300 including a mount bar 302 disposed between a first side 304 and a second side 306 of the stroller frame 300 for coupling one or more seats thereto. FIG. 3B is a top, right perspective view of the example stroller frame 300 including the mount bar 302.

Figure 5:
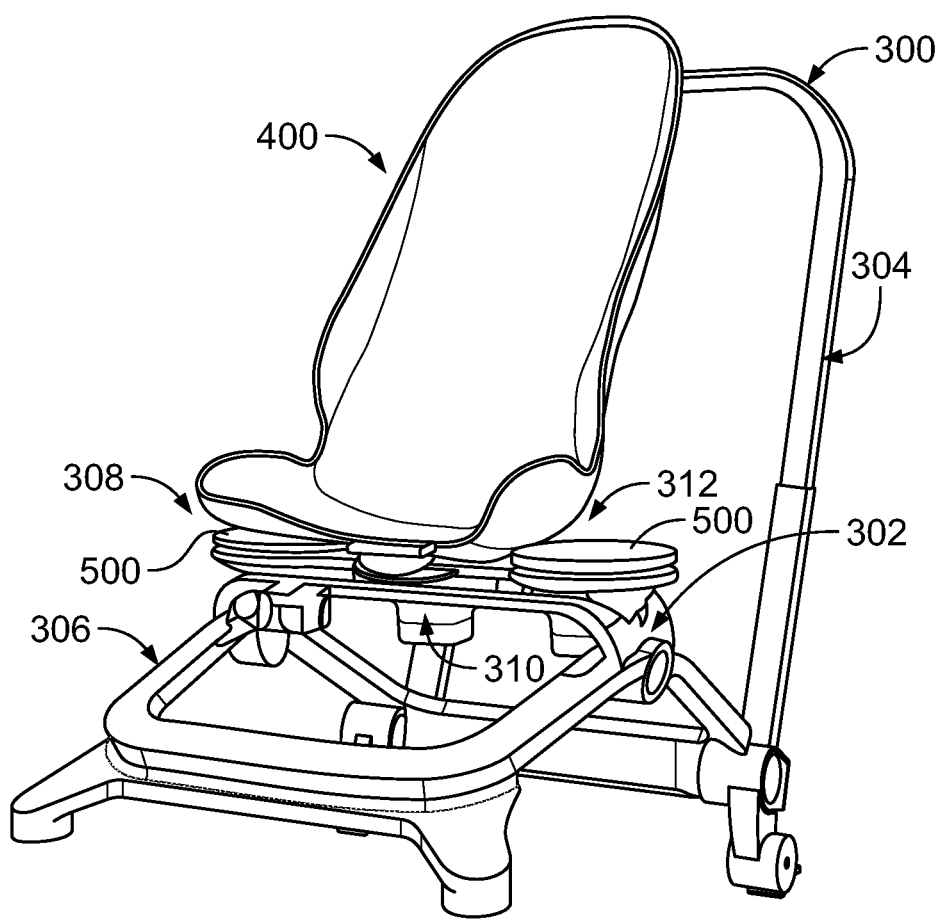
FIG. 5 is a right, front perspective view of the portion of the example stroller frame of FIGS. 3A and 3B with the example seat of FIG. 4 coupled thereto in a central position.
Figure 15:
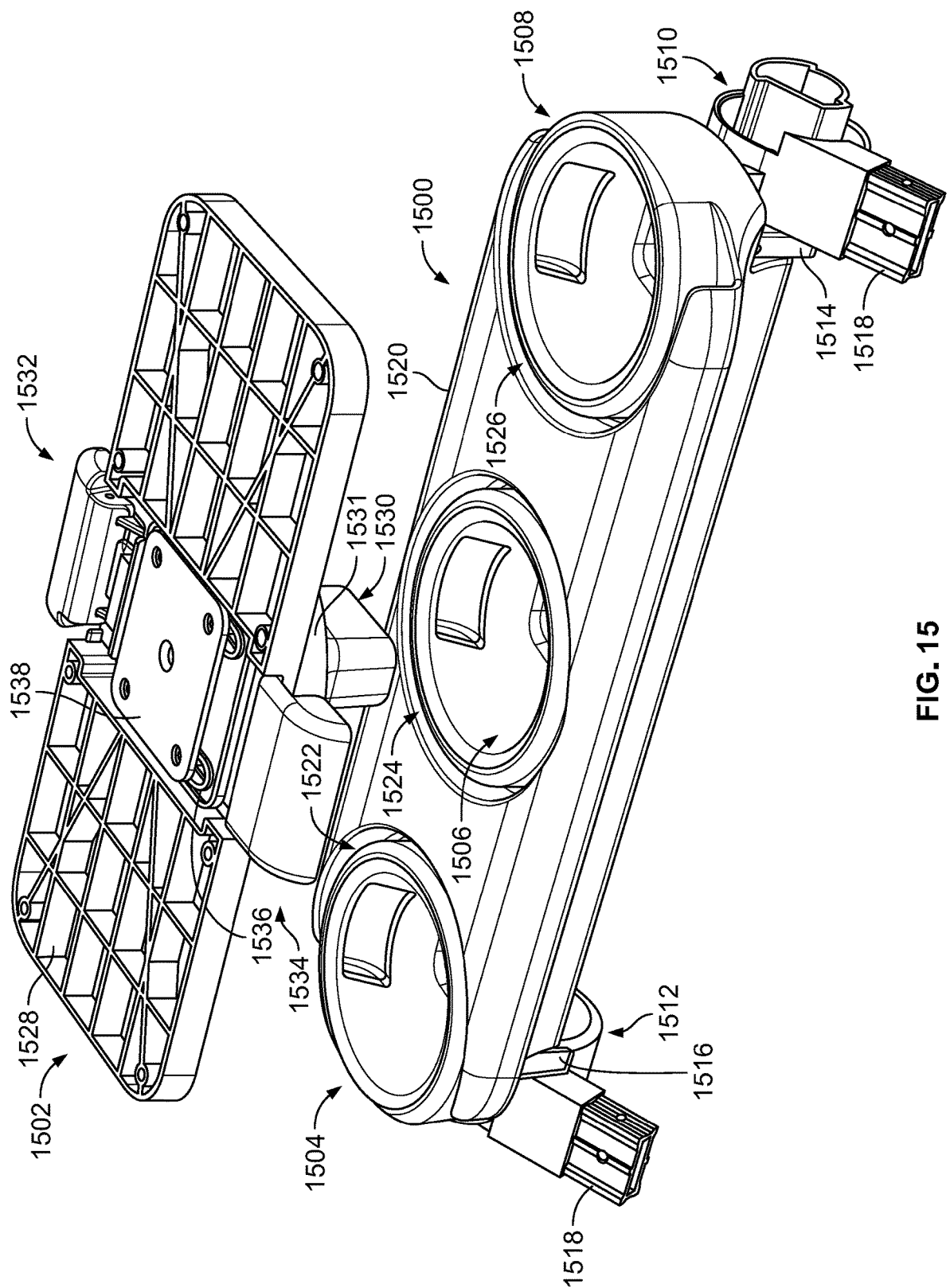
FIG. 15 is an enlarged, right, front perspective view of a third example seat mount of the seat of FIG. 4 and a mount bar including a third example receiver that may be used in connection with the example stroller frame of FIGS. 3A and 3B, the seat mount being disengaged from the receiver.

In this example, the mount bar 302 of FIGS. 3A and 3B is a cast part coupled to the example stroller frame 300. In some examples, the mount bar 302 is integral with the stroller frame 300. As illustrated in FIGS. 3A and 3B, the mount bar 302 of the example stroller frame 300 of FIG. 3 includes a first mount receiver 308, a second mount receiver 310, and a third mount receiver 312. The mount bar 302 can include additional or fewer mount receivers. The first, second, and third mount receivers 308, 310, 312 can be disposed in openings formed in the mount bar 302. For example, as shown in FIG. 3, the first, second, and third mount receivers 308, 310, 312 can be individually formed components that are inserted into respective openings in the mount bar 302. A portion of each of first, second, and third mount receivers 308, 310, 312 can be fastened to the mount bar 302 via, for example, mechanical fasteners such as a screws. In other examples, the first, second, and third mount receivers 308, 310, 312 are formed from a single mold defining a receiver bar that is coupled to the mount bar 302, with the first, second, and third mount receivers 308, 310, 312 of the receiver bar disposed in openings of the mount bar 302 (e.g., as shown in FIG. 5, below). In other examples, the mount bar 302 and the first, second, and third mount receivers 308, 310, 312 are formed from a single mold (e.g., as shown in FIG. 15, below). Also, although the first, second, and third mount receivers 308, 310, 312 are arranged linearly along the mount bar 302, the receivers can be arranged in other patterns such as, for example, a triangular pattern.

Each of the example first, second, and third mount receivers 308, 310, 312 are substantially identical with respect to shape and size. For example, the first, second, and third mount receivers 308, 310, 312 of FIGS. 3A and 3B include a shell 314 having a substantially frustoconical or funnel-shaped portion 316 and substantially square end portion 318. The square end portion 318 of the example first, second, and third mount receivers 308, 310, 312 includes a projection 320 that extends into an interior of the shell 314. The interior of the shell 314 defines a cavity or an opening 322.

As shown in FIGS. 3A and 3B, the mount receivers 308, 310, 312 are supported by the mount bar 302. In the example stroller frame 300, each mount receiver 308, 310, 312 is coupled to the mount bar 302 such that square end portion 318 extends through an opening in the mount bar 302 and at least a portion of the frustoconical portion 316 of each mount receiver 308, 310, 312 rests on a surface 324 of the mount bar 302 facing away from a ground surface on which the frame 300 rests when in use. In this example, the shell 314 including the frustoconical portion 316, the square end portion 318, and the projection 320 can be a plastic material and can be formed by, for example, injection molding. In other examples, other material(s) or combination of material(s) and manufacturing methods may be used. The first, second, and third mount receivers 308, 310, 312 can have other shapes than that shown in FIGS. 3A and 3B. Also, in some examples, the first, second, and third mount receivers 308, 310, 312 are different sizes and/or shapes relative to one another.

Figure 4:
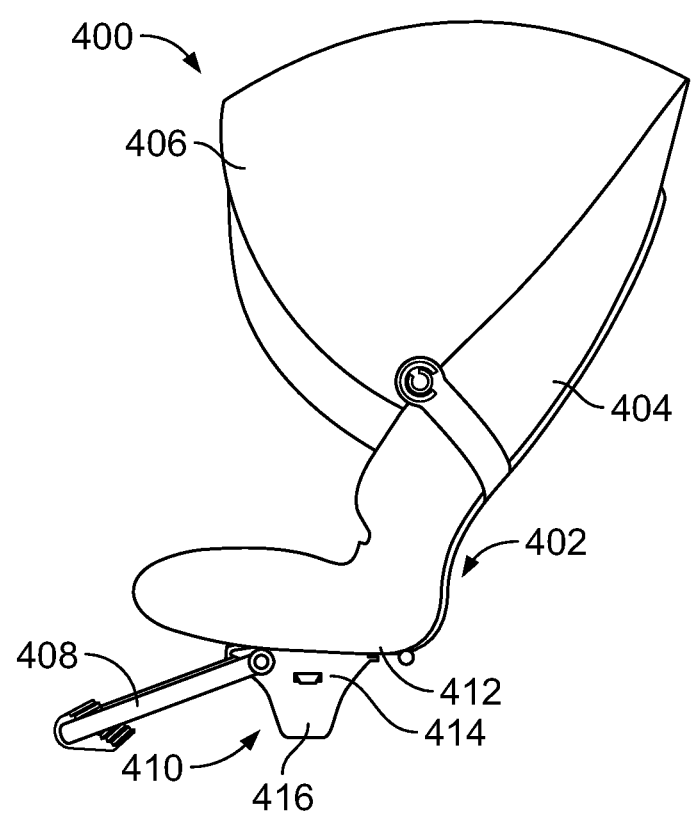
FIG. 4 is right side view of an example seat for coupling to the example stroller frame of FIGS. 3A and 3B.

FIG. 4 is a right side view of an example seat 400 that can be coupled to the mount bar 302 of FIGS. 3A and 3B to removably secure the example seat 400 to the example stroller frame 300 of FIGS. 3A and 3B. The example seat 400 of FIG. 4 includes a seat frame 402. The seat 400 includes, for example, soft goods 404 coupled to the seat frame 402, a canopy 406, and a footrest 408. In other examples, the seat 400 of FIG. 4 does not include the canopy 406 and/or the footrest 408.

The seat frame 402 includes a seat mount 410 coupled to a surface 412 of the seat frame 402 (e.g., a bottom or ground-facing surface of the seat frame 402 when the seat 400 is coupled to the stroller frame 300). The seat mount 410 can be fastened to the surface 412 of the seat frame 402 via one or more mechanical fastener(s) such as, for example, screws.

When the seat 400 is coupled to the stroller frame 300, the seat mount 410 is disposed or nested in one of the first, second, or third mount receivers 308, 310, 312 of the mount bar 302. The seat mount 410 is a male part inserted into the cavity 322 of the shell 314 (the female part) of one of the first, second, or third mount receivers 308, 310, 312. Accordingly, the seat mount 410 has a shape and size that is complementary to the shape and size of the first, second, or third mount receivers 308, 310, 312 (or at least one of the first, second, or third mount receivers 308, 310, 312 in examples where the mount receivers are differently shaped or sized). For example, as illustrated in FIG. 4, the seat mount 410 includes a substantially frustoconical portion 414 and a square end portion 416 corresponding to the example shape of the first, second, and third mount receivers 308, 310, 312 shown in FIGS. 3A and 3B. The seat mount 410 can be formed from a plastic material using, for example, injection molding. In other examples, other material(s) or combination of material(s) and manufacturing methods may be used. Also, although the seat mount 410 is described herein in connection with the seat 400, a substantially similar seat mount 410 can be attached to an accessory such as a basket.

In operation, the complementary shapes of the first, second, and/or third mount receivers 308, 310, 312 of the stroller frame 300 and the seat mount 410 of the seat 400 provide for coupling of the seat 400 to the stroller frame 300 without requiring exact alignment between the seat mount 410 and a respective cavity 322 of the mount receivers 308, 310, 312 when the user is inserting the seat mount 410 into the cavity 322. In particular, because of the frustoconical portion 316 of, for example, the example first mount receiver 308, the seat mount 410 is guided into the first mount receiver 308 without requiring precise alignment of the seat mount 410 and the first mount receiver 308 by the user. For example, to insert the seat mount 410 in the first mount receiver 308, the user positions the seat mount 410 of the seat 400 over the first mount receiver 308 and lowers the seat 400 onto the stroller frame 300 such that the seat mount 410 is received in the cavity 322 of the first mount receiver 308. In some examples, the user may not have aligned the respective square end portions 318, 416 of the seat mount 410 and the first mount receiver 308. As a result, the square end portion 416 of the seat mount 410 enters the first mount receiver 308 at an angle or offset relative to the square end portion 416 of the first mount receiver 308. In such examples, the frustoconical portion 316 of the first mount receiver 308 facilities placement of the square end portion 416 of the seat mount 410 into the square end portion 318 of the first mount receiver 308. In particular, the curved or sloped surface of the frustoconical portion 316 allows the square end portion 416 of the seat mount 410 to slide into the square end portion 318 of the first mount receiver 308 to couple the example seat 400 to the example stroller frame 300. Thus, the first, second, and third mount receivers 308, 310, 312 provide for self-alignment of the seat mount 410, thereby reducing potential user difficulties in coupling the seat 400 to the stroller frame 300 and any risks that the seat 400 is not securely coupled to the stroller frame 300.

FIG. 5 is a right, perspective view of the example stroller frame 300 of FIGS. 3A and 3B with seat mount 410 of the seat 400 of FIG. 4 (shown without the canopy 406) disposed in one of the mount receivers 308, 310, 312 of the mount bar 302. In the example of FIG. 5, the example seat 400 is shown as coupled to the stroller frame 300 via the second mount receiver 310. In other examples, the seat 400 can be coupled to any of the first, second, or third mount receivers 308, 310, 312. In particular, a width of the example frame 300 supports the example seat 400 in any of the first, second, or third mount receivers 308, 310, 312 without a risk of the stroller frame 300 becoming unstable or tipping over due to uneven weight bearing on the example frame 300 when one seat 400 is coupled to the frame 300 at, for example, the first mount receiver 308 proximate to the second side 306 of the frame 300 or the third mount receiver 312 proximate to the first side 304 of the frame 300. Rather, the example frame 300 supports a single seat 400 in any of the first, second, or third mount receivers 308, 310, 312, thereby reducing potential injuries to an occupant of the seat 400 during use due to an unstable stroller frame. Also, the example seat 400 can be coupled to the example frame 300 in a direction facing a direction of travel of the stroller or in a rearward-facing direction relative to the direction of travel. In some examples, the example seat 400 can be coupled to the example frame 300 sideways relative to the direction of travel (e.g., when the seat 400 is coupled to the first or third mount receivers 308, 312).

In examples where only one or two of the first, second, or third mount receivers 308, 310, 312 have a seat mount 410 disposed therein, a cover 500 can be coupled to the mount receivers 308, 310, 312 that are not in use (i.e., do not have a seat mount 410 disposed therein). As shown in FIG. 5, the example seat 400 is coupled to the second mount receiver 310. A cover 500 is removably coupled to the first mount receiver 308 and the third mount receiver 312, which are not in use the example shown in FIG. 5. The cover 500 prevents debris from accumulating in the respective cavities 322 of the first and third mount receivers 308, 312 when the first and third mount receivers 308, 312 are not in use. The cover 500 can be, for example, a plate that is coupled to each mount receiver 308, 310, 312 by snapping or press-fitting the plate to a surface of the mount receiver(s) 308, 310, 312. In other examples, the cover 500 can be coupled to the mount receiver(s) 308, 310, 312 by via screw-like fit between the cover 500 and the mount receiver(s) 308, 310, 312 (e.g., by twisting or screwing a threaded portion of the cover 500 into the mount receiver 308, 310, 312). In some examples, the cover 500 has a conical or frustoconical shape and sits in the mount receiver(s) 308, 310, 312. In some examples, the cover 500 is made of plastic though other material(s) or combination of material(s) may be used. In further examples, the cover 500 is a cloth pouch that substantially fills the mount receiver(s) 308, 310, 312 when disposed therein. The cover 500 can be other shapes, sizes, or materials and/or disposed in or coupled to the mount receiver(s) 308, 310, 312 in other manners to cover or fill the respective cavities 322 when any one of the mount receiver(s) 308, 310, 312 are not in use. In other examples, the mount receivers 308, 310, 312 that are not in use are not covered by the cover 500 and are used, for example, as cup holders or for storage.

Figure 6:
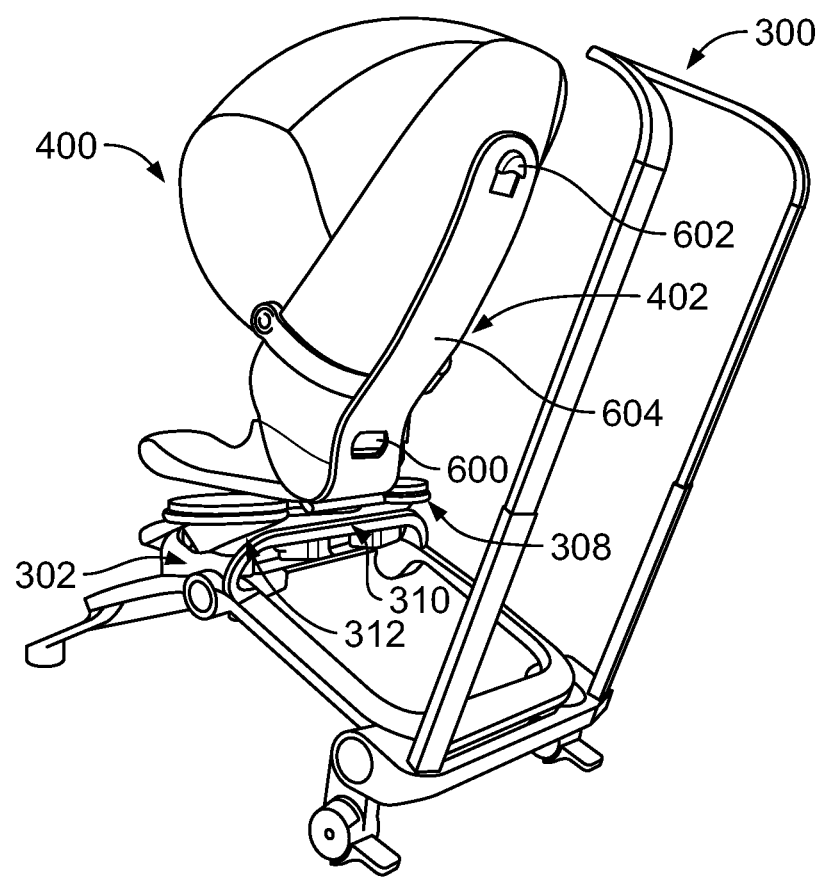
FIG. 6 is a right, rear perspective view of the portion of the example stroller frame with the seat mounted as shown in FIG. 5.

FIG. 6 is a right, rear perspective view of the example stroller frame 300 of FIGS. 3A and 3B with the seat 400 of FIG. 4 disposed in the second mount receivers 310 as shown in FIG. 5. As will be further disclosed below, the example seat 400 includes a handle 600 for selectively releasing the example seat 400 from the second mount receiver 310 (or any of the other mount receivers 308, 310, 312 of the mount bar 302). As also shown in FIG. 6, the example seat 400 can include a recline handle 602 for adjusting an angle of inclination of a back surface 604 of the seat frame 402 to selectively move the seat 400 between a substantially upright position and a substantially recline positon.

Figure 7:
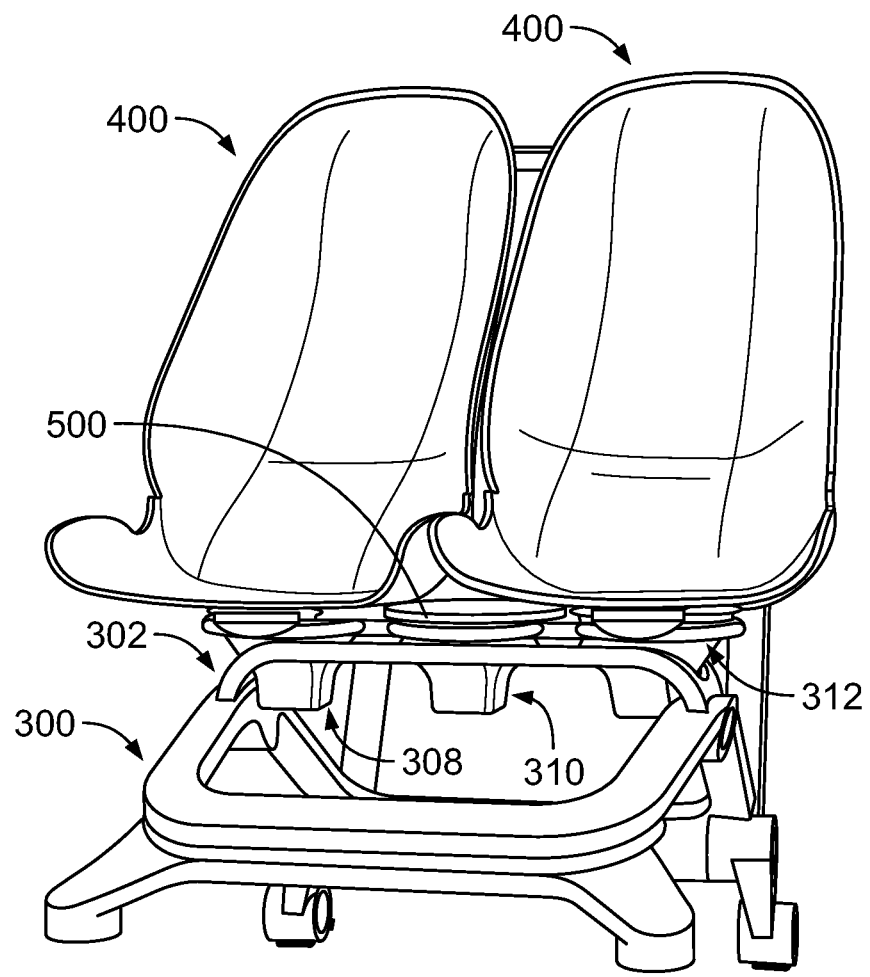
FIG. 7 is a right, front perspective view of the portion of the example stroller frame of FIGS. 3A and 3B with two of the example seats of FIG. 4 coupled thereto in side-by-side relation.

FIG. 7 is a front perspective view of the example stroller frame 300 of FIGS. 3A and 3B including two example seats 400 coupled thereto. As shown in FIG. 7, a first seat 400 is coupled to the first mount receiver 308 via the seat mount 410 of the first seat 400 and a second seat 400 is coupled to the third mount receiver 310 via the seat mount 410 of the second seat 400. Thus, each of the first seat 400 and the second seat 400 are coupled to the example stroller frame 300 in the same or substantially the same way. In the example of FIG. 7, the second mount receiver 310 is not in use and, thus, is covered with the cover 500.

Although each of the first and second seats 400 of FIG. 7 are coupled to the stroller frame 300 in a forward-facing direction, one or both of the first and second seats 400 could be facing rearward. In some examples, an accessory such as a basket is coupled to the stroller frame 300 instead of one of the first or second seats 400. As shown in FIGS. 3A, 3B, and 5-7, the example stroller frame 300 including the mount bar 302 provides for flexibility with respect to the number of seats 400 (or accessories) coupled to the stroller frame 300, the orientation of the seat(s) 400, and the placement of the seat(s) 400 on the mount bar 302 relative to the first and second sides 304, 306 of the stroller frame 300.

Figure 8:
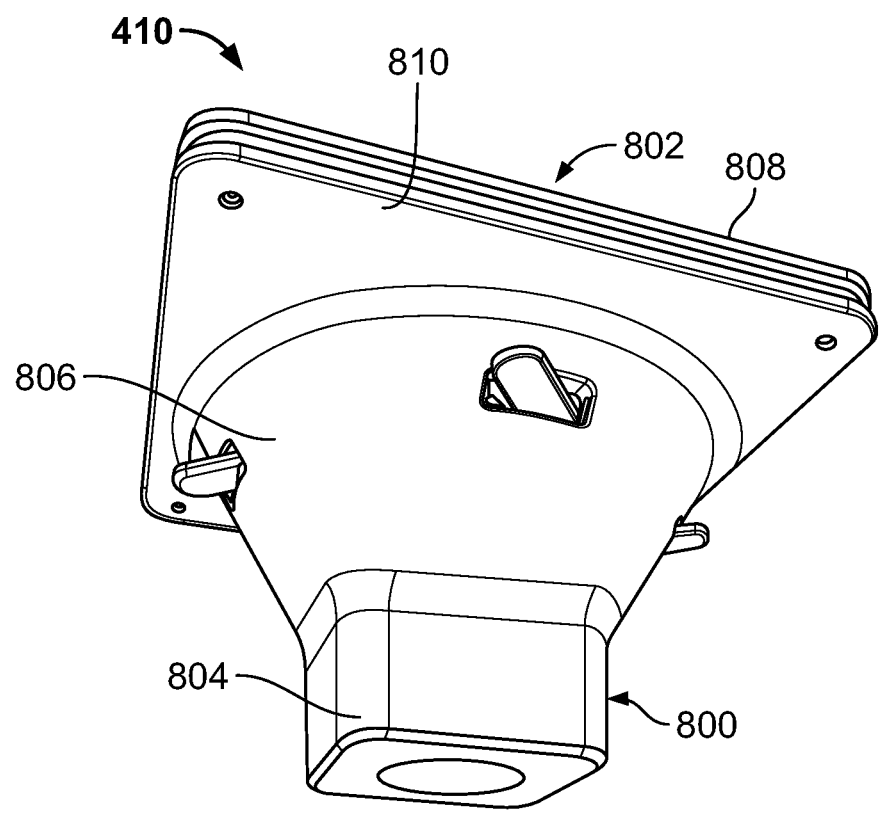
FIG. 8 is an enlarged, side perspective view of a first example seat mount of the seat of FIG. 4 mounted in a first example receiver that may be used in connection with the example stroller frame of FIGS. 3A and 3B.

FIG. 8 is an enlarged, side perspective view of a coupling between a first example mount receiver 800 of the stroller frame 300 of FIGS. 3A and 3B and a first example seat mount 802 of the seat 400 of FIG. 4 when the seat 400 is coupled to the stroller frame 300 as shown in FIGS. 5-7. The example mount receiver 800 of FIG. 8 can be any of the first, second, or third mount receivers 308, 310, 312 of FIGS. 3A and 3B. The example seat mount 802 of FIG. 8 corresponds to seat mount 410 of FIG. 4. For illustrative purposes, the seat 400, the stroller frame 300, and the mount bar 302 are not shown.

As illustrated in FIG. 8, the seat mount 802 is received in the mount receiver 800 (e.g., the cavity 322 of the first, second, or third mount receiver 308 shown in FIG. 3B). Thus, a square end portion of the seat mount 802 (e.g., the square end portion 416 of the seat mount 410 of FIG. 4) is received or disposed in a square end portion 804 of the mount receiver 800. A frustoconical portion (e.g., the frustrconical portion 414 of the seat mount 410 of FIG. 4) is received or disposed in the frustoconical portion 806 of the mount receiver 800. In some examples, at least a portion of a surface 808 of the seat mount 802 sits or rests on surface 810 of the mount receiver 800 when the seat mount 802 is disposed in the mount receiver 800. In such examples, the engagement of the surface 808 of the seat mount 802 with the surface 810 of the mount receiver 800 can provide an indication to the user that the seat mount 802 is fully disposed in the cavity of the mount receiver 800 (e.g., the cavity 322 shown in FIG. 3B).

Figure 9:
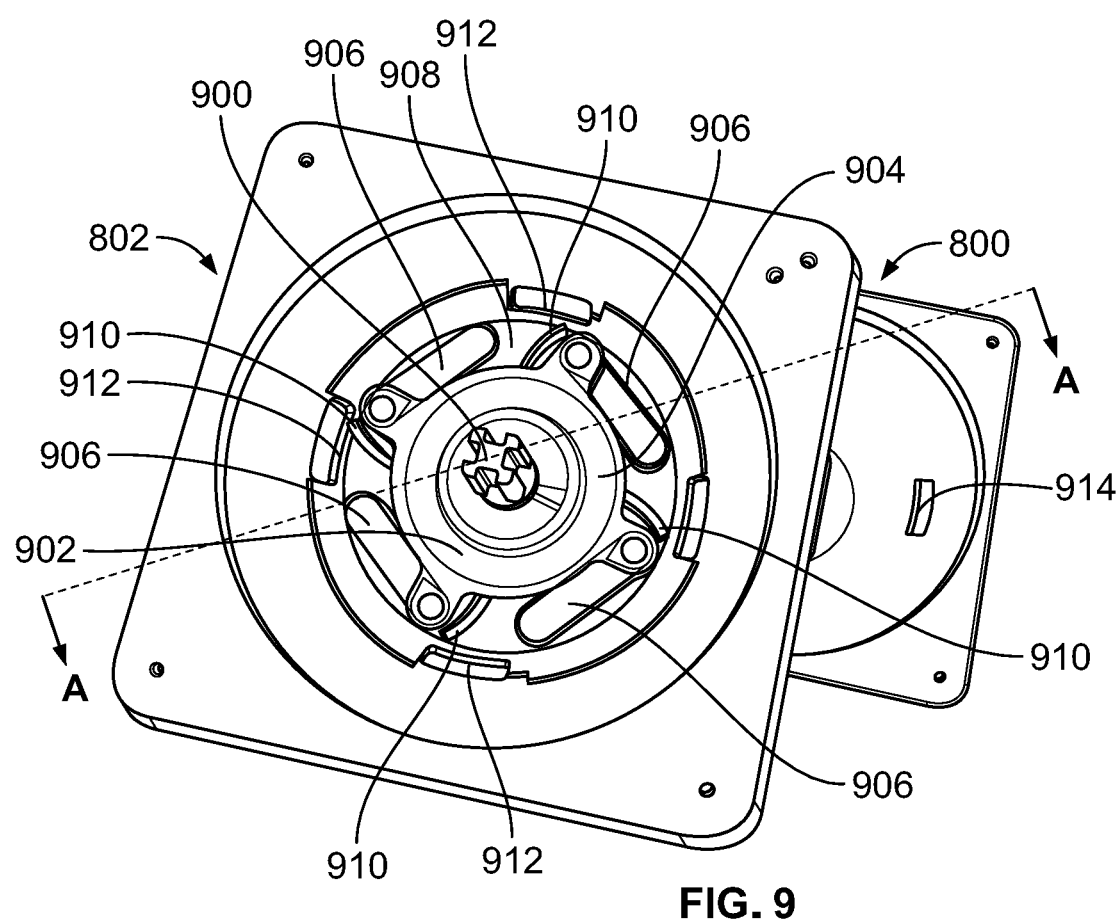
FIG. 9 is an enlarged, top perspective view of the first example seat mount and the first example receiver of FIG. 8, the seat mount being disengaged from the receiver.

FIG. 9 is a top view of the example mount receiver 800 and the example seat mount 802 of FIG. 8, where the seat mount 802 is not engaged with the mount receiver 800. In particular, FIG. 9 shows the seat mount 802 disengaged from the mount receiver 800, such as before the seat mount 802 has been inserted into the mount receiver 800 or after the seat mount 802 has been removed from the mount receiver 800. As shown in FIG. 9, the example seat mount 802 includes an actuator 900 having a screw or cam drive 902. A turntable 904 is disposed about the actuator 900 and coupled with the screw drive 902 of the actuator 900. The example seat mount 802 shown in FIG. 9 includes four locks 906 pivotally coupled to the turntable 904. The turntable 904 can include fewer or additional locks 906. The turntable 904 and the locks 906 are further supported by a floor 908. In some examples, the floor 908 includes one or more guides 910, which define a degree of rotation of the turntable 904 and/or the locks 906, as further disclosed below. The number of guides 910 can correspond to a number of locks 906 coupled to the turntable 904.

The seat mount 802 also includes a plurality openings or apertures 912. As also shown in FIG. 9, the mount receiver 800 also includes a plurality of openings or apertures 914. The number of openings 912, 914 of the seat mount 802 and the first mount receiver 800 correspond to a number of locks 906 of the seat mount 410. As further disclosed below, when the seat mount 802 engages the mount receiver 800, the locks 906 pivot from a retracted position shown in FIG. 9 to a locked position (FIG. 11) via rotation of the turntable 904. In the locked position, the locks 906 are partially disposed in the respective openings 912 of the seat mount 802 and the respective openings 914 of the mount receiver 800 to secure the seat mount 802 to the mount receiver 800. In some examples, the seat mount 802 is shaped so as to only fit inside the mount receiver 800 in a manner that will align the openings 912 of the seat mount 802 with the openings 914 of the first mount receiver 800.

Figure 10:
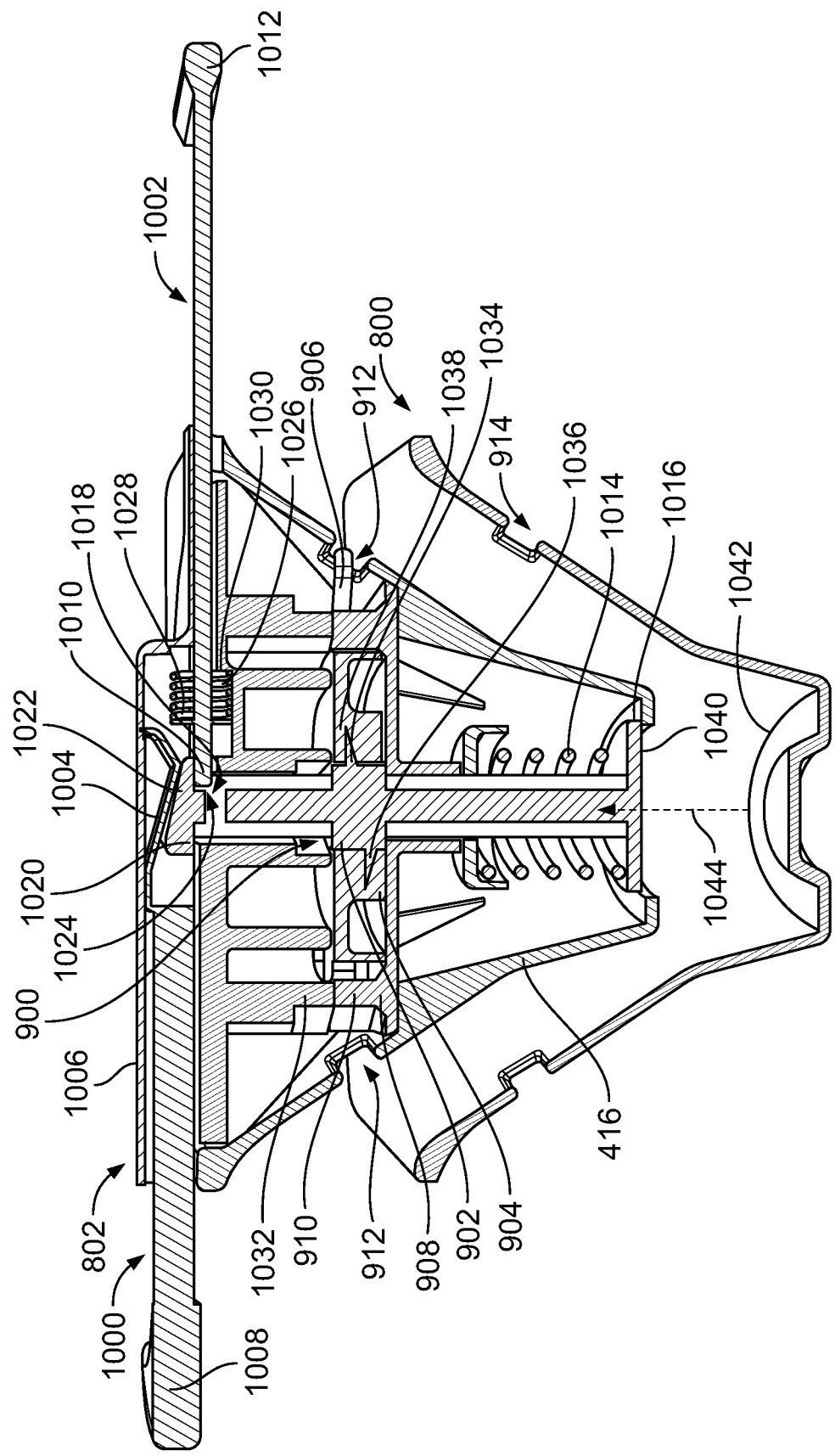
FIG. 10 is a cross-sectional view of the first example seat mount and the first example receiver taken along the A-A line of FIG. 9, the seat mount being disengaged from the receiver.

FIG. 10 is a cross-sectional view of the mount receiver 800 and the seat mount 802 of FIGS. 8 and 9 taken along the A-A line of FIG. 9 and including a first release handle 1000 and a second release handle 1002 for selectively coupling the seat 400 of FIG. 4 to the example stroller frame 300 of FIGS. 3A and 3B. The first release handle 1000 can be accessed from a front of the example seat 400 (e.g., a seat portion of the seat 400). The second release handle 1002 can be accessed from a back of the example seat 400 (e.g., as shown in FIG. 6). The first release handle 1000 includes a first end 1004 slidably disposed in a housing 1006 of the seat mount 802 and a second end 1008 external to the housing 1006. The second release handle 1002 includes a first end 1010 slidably disposed in the housing 1006 and a second end 1012 external to the housing 1006. Thus, each of the first and second release handles 1000, 1002 are partially disposed in the housing 1006 and are slidable relative to the housing 1006.

The seat mount 802 includes a first spring 1014 operatively coupled to a first end 1016 of the actuator 900. Thus, in some examples, the actuator 900 is a plunger. When the seat mount 802 is disengaged from the first mount receiver 800, the first spring 1014 is in an expanded state.

The actuator 900 includes a handle lock 1018 disposed at a second end 1020 of the actuator 900. When the seat mount 802 is being placed in the mount receiver 800 (e.g., to couple the seat 400 to the stroller frame 300) or when the seat mount 802 is being removed from the mount receiver 800 (e.g., to remove the seat 400 from the stroller frame 300), the first release handle 1000 and the second release handle 1002 are in extended or released positions relative to the handle lock 1018 of the actuator 900. In the extended positions, the first and second release handles 1000, 1002 can slide relative to the housing 1006.

As illustrated in FIG. 10, the first end 1004 of the first release handle 1000 is at least partially sloped, slanted, or curved and engages a first surface 1022 of the handle lock 1018. The first surface 1022 of the handle lock 1018 of FIG. 10 has a slope or curvature at least partially complementing the slope or curvature of the first end 1004 of the first release handle 1000. In the extended position, the first release handle 1000 slidably extends outward from the housing 1006 (e.g., is pulled outward from the housing 1006 by a user) and the first end 1004 of the first release handle 1000 presses down on the first surface 1022 of the handle lock 1018.

Before the first release handle 1000 is pulled outward from the housing 1006 and moves to the extended position or at substantially the same time that the first release handle 1000 is moved to the extended position, the second release handle 1002 is in or moves to the extended positon. In particular, the first end 1010 of the second release handle 1002 is disposed in a notch 1024 of the handle lock 1018, as shown in FIG. 10. The second release handle 1002 can be slidably extended outward from the notch 1024 and, thus, the housing 1006 (e.g., pulled outward from the housing 1006 by the user). In the example of FIG. 10, when the second release handle 1002 moves to the extended positon, a second spring 1026 disposed in the housing 1006 is compressed between a collar 1028 of the second release handle 1002 and a wall 1030 of a support 1032 disposed in the housing 1006. In some examples, the support 1032 is disposed in the seat mount 802 between the housing 1006 and the turntable 904 to support, for example, the first and second release handles 1000, 1002, the actuator 900, etc. Also, in some examples, another spring is disposed in the housing 1006 proximate to the first release handle 1000 and contracts during extension of first release handle 1000 from the housing 1006 by the user (as shown below in FIGS. 13 and 14).

As also shown in FIG. 10, the screw drive 902 of the actuator 900 includes a first inclined plane portion 1034 and a second inclined plane portion 1036. The first and second inclined plane portions 1034, 1036 can be, for example, screw threads. The turntable 904 has a screw track 1038 having a pitch corresponding to a pitch of the inclined plane portions 1034, 1036 of screw drive 902. The inclined plane portions 1034, 1036 are engaged with or threaded in the screw track 1038.

Figure 11:
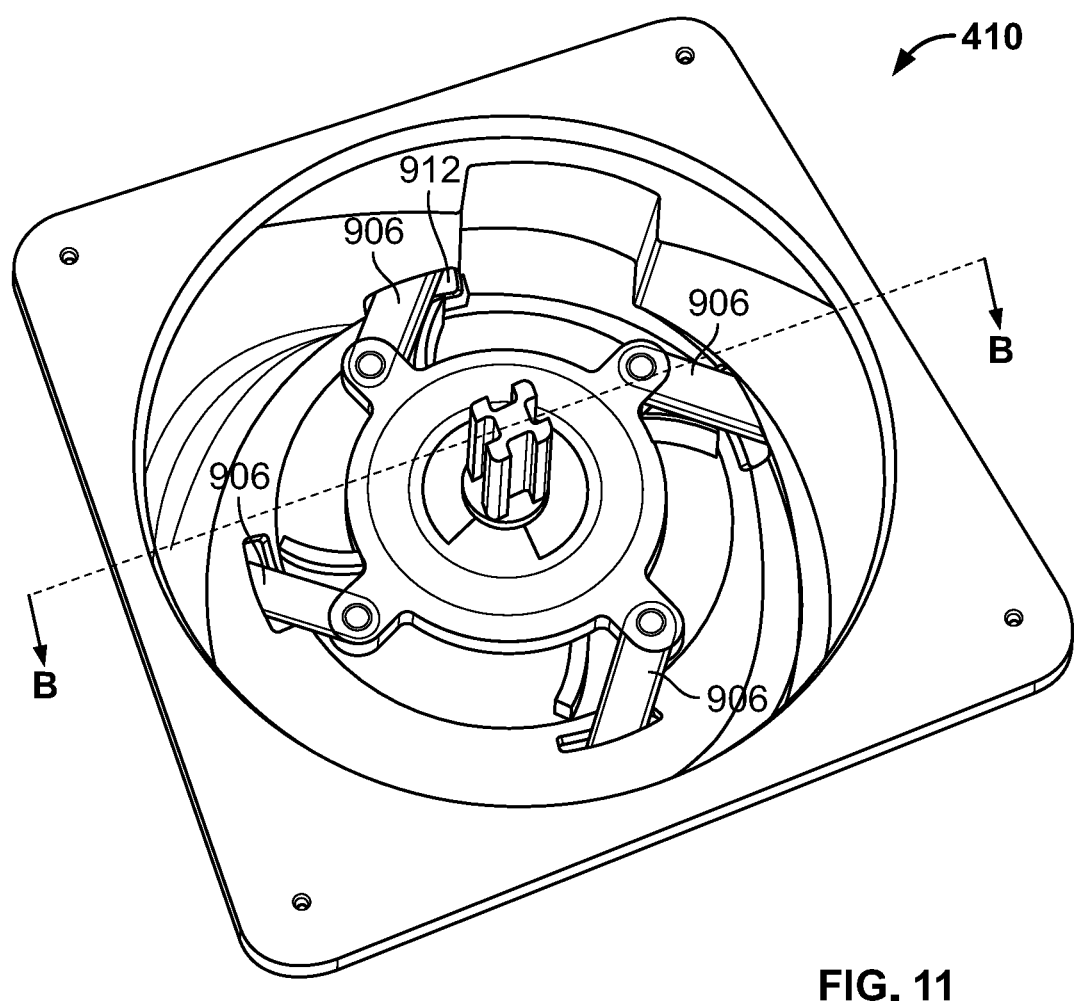
FIG. 11 is an enlarged, top perspective view of the first example seat mount and the first example receiver of FIG. 8, the seat mount locked to the receiver.

When the seat mount 802 is disengaged from the mount receiver 800, as shown in FIGS. 9 and 10, the locks 906 are in a retracted position, or a position in which the locks 906 do not extend through the openings 912 of the seat mount 802 and the openings 914 of the mount receiver 800. As shown in FIG. 11, when the seat mount 802 is disposed in the mount receiver 800, the locks 906 are moved to a locked position in which the locks 906 extend through respective openings 912, 914 of the seat mount 802 and the mount receiver 800. Thus, the example seat 400 is removably secured to the example stroller frame 300 via locking of the example seat mount 802 to the example mount receiver 800.

Referring again to FIG. 10, to lock the seat mount 802 to the mount receiver 800 to removably secure the seat 400 to the stroller frame 300, the seat mount 802 is disposed in the mount receiver 800 such that a surface 1040 of the actuator 900 engages a projection 1042 of the mount receiver 800 (e.g., the projection 320 of the first, second, and/or third mount receivers 308, 310, 312 of FIG. 3B). The engagement of the surface 1040 of the actuator 900 with the projection 1042 causes the actuator 900 to overcome the force of the first spring 1014 and to move along a longitudinal axis of the seat mount 802, or upward relative to the projection 1042, as represented by the dashed line 1044 in FIG. 10. The first spring 1014 moves to a loaded state as a result of the upward movement of the actuator 900.

Figure 12:
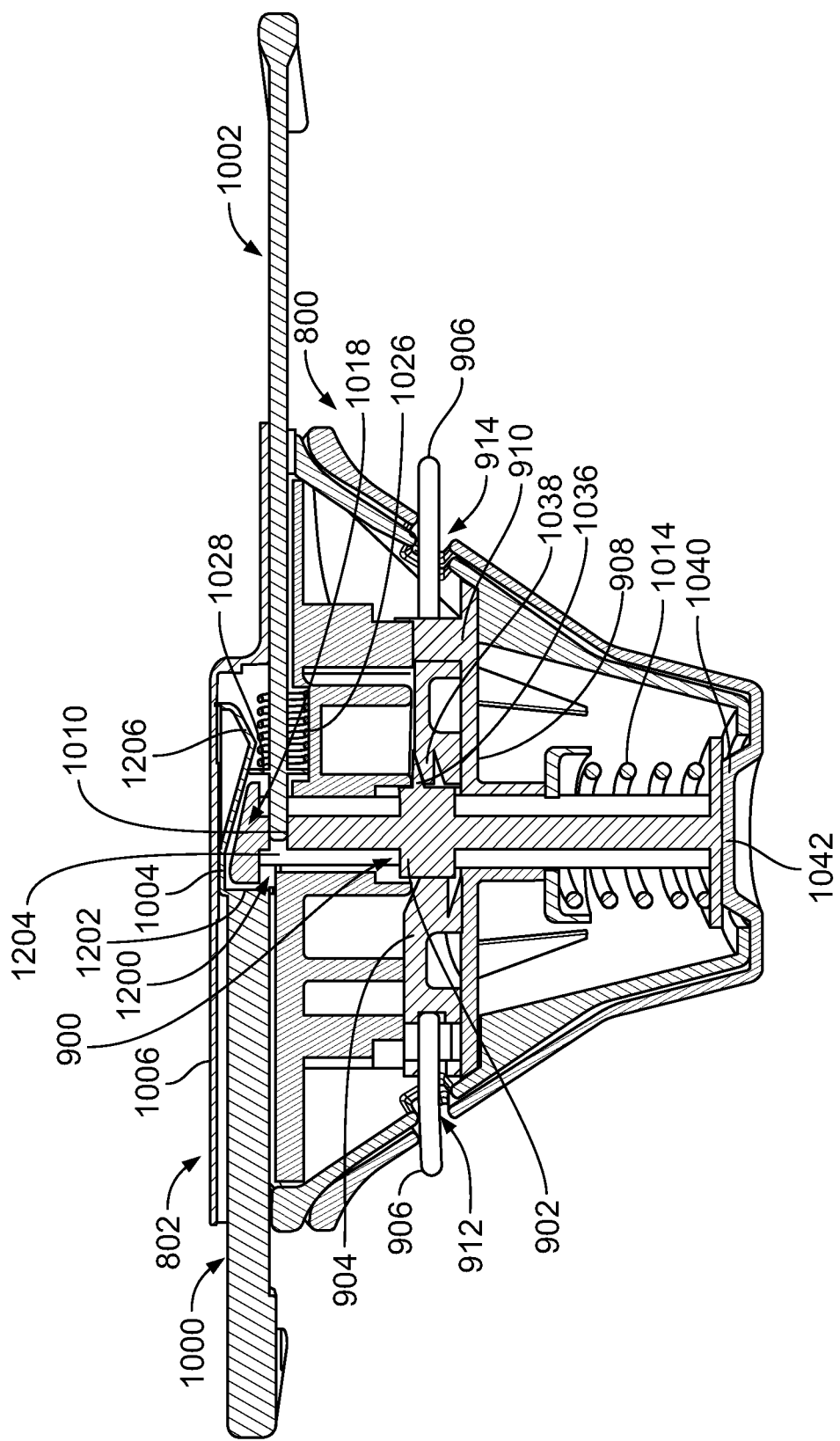
FIG. 12 is a cross-sectional view of the first example seat mount and the first example receiver taken along the B-B line of FIG. 11, the seat mount locked to the receiver.

FIG. 12 is a cross-sectional view of the example mount receiver 800 and the example seat mount 802 taken along the B-B line of FIG. 11. In FIG. 12, the example seat mount 802 is coupled to the example mount receiver 800 and, thus, the seat 400 is secured to the stroller frame 300 as shown in, for example, FIGS. 5-7. As shown in FIG. 12, the upward movement of the actuator 900 as a result of the engagement of the surface 1040 of the actuator 900 with the projection 1042 causes the inclined plane portions 1034, 1036 of the screw drive 902 to move upward (inclined plane portion 1034 is hidden in FIG. 12). The upward movement of the inclined plane portions 1034, 1036 causes the turntable 904 to rotate to follow the movement of the inclined plane portions 1034, 1036 to which the turntable 904 is coupled via the screw track 1038. For example, the turntable 904 can rotate approximately 10° to 15° degrees over a distance of about 15 mm along the longitudinal axis of the seat mount 802. In other examples, the range of motion may be greater or less.

The rotation of the turntable 904 causes the locks 906 to pivot from a retracted position to a locked or engaged position in which the locks are disposed in the openings 912 of the seat mount 802 and the openings 914 of the mount receiver 800 as shown in FIG. 12. The extension of the locks 906 into the respective openings 912, 914 locks the seat mount 802 to the mount receiver 800. In some examples, the guides 910 of the floor 908 prevent the locks 906 from pivoting beyond a predetermined angle so as to position the locks 906 in the openings 912, 914. Thus, the movement of the actuator 900 along the longitudinal axis of the seat mount 802 (e.g., the upward or vertical movement of the actuator 900 relative to the projection 320) is translated into rotational movement of the turntable 904 via the screw drive 902, which results in the extension of the locks 906 through the openings 912, 914 to secure the seat mount 802 to the mount receiver 800.

When the seat mount 802 is disposed in the mount receiver 800, the first release handle 1000 and the second release handle 1002 are in locked positions via the handle lock 1018 of the actuator 900. In particular, the first end 1004 of the first release handle 1000 moves to a retracted position after the user inserts the seat mount 802 in the mount receiver 800 (e.g., as a result of a release of the first release handle 1000 by the user). Thus, the first end 1004 moves further into the housing 1006 relative to a position of the first end 1004 when the first release handle 1000 is in the extended position shown in FIG. 10. As a result of the retraction of the first release handle 1000 into the housing 1006 and the upward movement of the actuator 900, the handle lock 1018 is disposed in a first slot 1200 formed between the first end 1004 and a surface 1202 of the first release handle 1000. When the handle lock 1018 is in the first slot 1200, the handle lock 1018 locks the first release handle 1000, as illustrated in FIG. 12.

The second release handle 1002 also moves to a retracted position when the seat mount 802 is coupled to the mount receiver 800 (e.g., as a result of a release of the second release handle 1000 by the user). In the retracted position, the first end 1010 of the second release handle 1002 moves further into the housing 1006 relative to a position of the first end 1010 when the second release handle 1002 is in the extended position shown in FIG. 10. As a result of the retraction of the second release handle 1002 and the upward movement of the actuator 900, the first end 1010 of the second release handle 1002 is pushed by the second spring 1026 into a second slot 1204 formed in the handle lock 1018. Thus, the second release handle 1002 is locked via the second slot 1204 of the handle lock 1018. Also, the actuator 900 is locked from further movement along the longitudinal axis of the seat mount 802 as a result of the insertion of the first end 1010 of the second release handle 1002 in the second slot 1204.

In some examples, the collar 1028 of the second release handle 1002 is formed proximate to the first end 1010 of the second release handle 1002. When the first release handle 1000 is in the locked position (i.e., the handle lock 1018 is disposed in the first slot 1200 formed by the first release handle 1000) and when the second release handle 1002 is in the locked position (i.e., the first end 1010 of the second release handle 1002 is disposed in the second slot 1204 of the handle lock 1018), a curved portion 1206 of the first end 1004 of the first release handle 1000 engages the collar 1028. As a result of the engagement of the curved portion 1206 with the collar 1028, a pulling force is required to move the first release handle 1000 to the extended positon. Put another way, a force is required to move the curved portion 1206 of the first end 1004 past the collar 1028 to move the first release handle 1000 outward from the housing 1006. Similarly, a pulling force is required to move the first end 1010 of the second release handle 1002 and the collar 1028 past the curved portion 1206 of the first release handle 1000 to move the second release handle outward from the housing 1006 to the extended position. Thus, the collar 1028 further secures the first and second release handles 1000, 1002 in the locked positions by coupling the first and second release handles 1000, 1002 to one another.

To release the seat mount 802 from the mount receiver 800, the user substantially simultaneously pulls the first release handle 1000 and the second release handle 1002 outward relative to the housing 1006. In some examples, the user may release the seat mount 802 by first pulling the second release handle 1002 and then pulling the first release handle 1000 while holding the second release handle 1002 in the extended position. The pulling of the first release handle 1000 causes the curved portion 1206 of the first end 1004 to move past the collar 1028 of the second release handle 1002 in the direction in which the first release handle 1000 is being pulled. As the first release handle 1000 moves outward, the first end 1004 of the first release handle 1000 presses down on the handle lock 1018, as shown in FIG. 10. Thus, when the first release handle 1000 is in the extended position, the handle lock 1018 is no longer disposed in the first slot 1200 and the curved portion 1206 is no longer engaged with the collar 1028 of the second release handle 1002. The downward pressing force of the first end 1004 of the first release handle 1000 on the handle lock 1018 pushes the actuator 900 downward along the longitudinal axis of the seat mount 802 (e.g., toward the projection 1042).

Before the first release handle 1000 moves to the extended position or at substantially the same time as the first release handle 1000 moves to the extended position, the second release handle 1002 moves the extended position via the outward pulling of the first and second release handles 1000, 1002 by the user. The outward pulling of the second release handle 1002 causes the first end 1010 of the second release handle 1002 to disengage from the second slot 1204 of the actuator 900. At substantially the same time the first end 1010 of the second release handle 1002 moves out of the second slot 1204 of the actuator 900 or after the movement of the first end 1010 of the second release handle 1002 out of the slot 1204, the actuator 900 is pressed downward by the first end 1004 of the first release handle 1000. The second spring 1026 associated with the second release handle 1002 is compressed as a result of the outward pulling of the second release handle 1002, as shown in FIG. 10.

As a result of the release of the first and second release handles 1000, 1002, the pushing of the first end 1004 of the first release handle 1000 on the first surface 1022 of the handle lock 1018, and the resulting downward movement of the actuator 900, the inclined plane portions 1034, 1036 of the screw drive 902 move downward. To follow the movement of the inclined plane portions 1034, 1036, the turntable 904 rotates. Rotation of the turntable 904 causes the locks 906 to pivot, thereby retracting the locks 906 from the respective openings 912, 914 of the seat mount 802 and the mount receiver 800. Thus, the downward movement of the actuator 900 along the longitudinal axis of the seat mount 410 is translated into rotational movement of the turntable 904 via the screw drive 902, which results in the retraction of the locks 906 to release the seat mount 410 from the first mount receiver 308. Also, the first spring 1014 returns to the expanded position shown in FIG. 10. The seat 400 is lifted by the user via the release handles 1000, 1002 to remove the example seat mount 802 from the example mount receiver 800.

Figure 13:
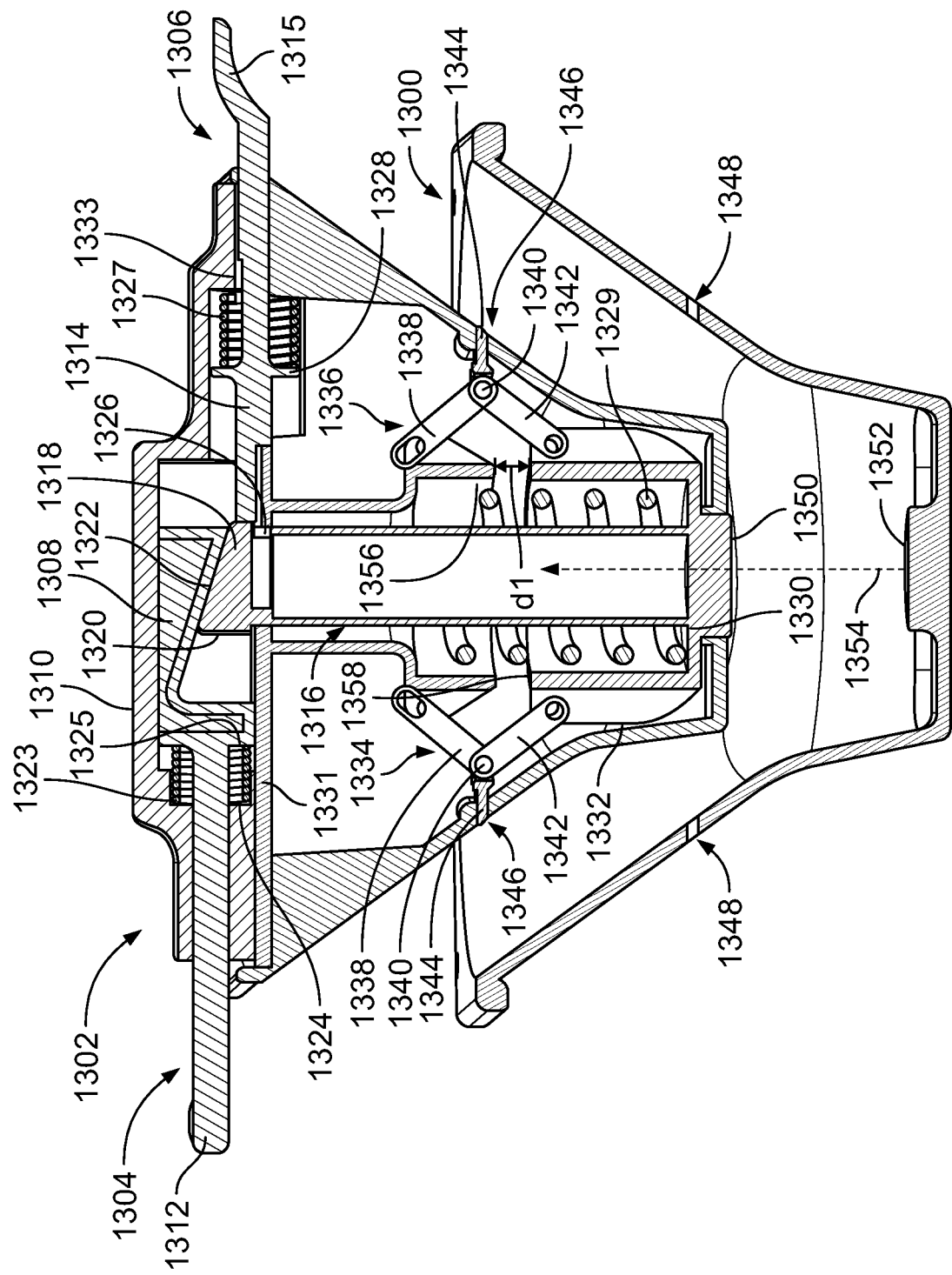
FIG. 13 is a cross-sectional view of a second example seat mount that may be used in connection with the example seat of FIG. 4 and a second example receiver that may be used in connection with the example stroller frame of FIGS. 3A and 3B, the seat mount being disengaged from the receiver.

FIG. 13 is a cross-sectional view of a second example mount receiver 1300 of the example stroller frame 300 of FIGS. 3A and 3B and a second example seat mount 1302 of the example seat 400 of FIG. 4. As shown in FIG. 13, the example seat mount 1302 is disengaged from the example mount receiver 1300, such as prior to when the seat 400 is coupled to the stroller frame 300 or when the seat 400 is being removed from the stroller frame 300. The example mount receiver 1300 of FIG. 13 can be any of the first, second, or third mount receivers 308, 310, 312 of FIGS. 3A and 3B. The example seat mount 1302 of FIG. 13 corresponds to seat mount 410 of FIG. 4. For illustrative purposes, the seat 400, the stroller frame 300, and the mount bar 302 are not shown.

As shown in FIG. 13, the example seat mount 1302 includes a first release handle 1304 and a second release handle 1306 for selectively coupling the seat 400 of FIG. 4 to the example stroller frame 300 of FIGS. 3A and 3B. In some examples, the first and second release handles 1304, 1306 of the example seat mount 1302 of FIG. 13 are substantially the same as the first and second release handles 1000, 1002 of the example seat mount 802 shown in FIGS. 10 and 12. For example, the first release handle 1304 includes a first end 1308 slidably disposed in a first housing 1310 of the seat mount 1302 and a second end 1312 external to the first housing 1310. The second release handle 1306 includes a first end 1314 slidably disposed in the first housing 1310 and a second end 1315 external to the first housing 1310. The first and second release handles 1304, 1306 move between respective extended positions, as shown in FIG. 13, and retracted position, as disclosed in connection with FIG. 12, above, and FIG. 14, below.

The example seat mount 1302 of FIG. 13 includes an actuator 1316. The actuator 1316 includes a handle lock 1318 disposed at a second end 1320 of the actuator 1316. As illustrated in FIG. 13, in the extended position, the first release handle 1304 slidably extends outward from the first housing 1310 (e.g., is pulled outward from the first housing 1310 by a user) and the first end 1308 of the first release handle 1304 presses down on a first surface 1322 of the handle lock 1318. As illustrated in FIG. 13, the first end 1308 of the first release handle 1304 is at least partially sloped, slanted, or curved. The first surface 1322 of the handle lock 1318 has a slope or curvature at least partially complementing the slope or curvature of the first end 1308 of the first release handle 1304. A first spring 1323 is compressed between a first wall 1324 of the first housing 1310 and a wall 1325 of the first end 1308 of the first release handle 1304 when the first release handle 1304 is in the extended positon.

Before the first release handle 1304 is pulled outward from the first housing 1310 and moves to the extended position or at substantially the same time that the first release handle 1304 moves the extended position, the second release handle 1306 is in or moves to the extended positon. In particular, the first end 1314 of the second release handle 1306 engages a second surface 1326 of the handle lock 1318 as shown in FIG. 13. In other examples, the first end 1314 of the second release handle 1306 is disposed in a notch of the handle lock 1318, as shown, for example, in FIG. 10 (e.g., the notch 1024). The second release handle 1304 can be slidably extended away from the second surface 1326 and outward from the first housing 1310 (e.g., pulled outward from the first housing 1310 by the user). When the second release handle 1002 moves to the extended position, a second spring 1327 disposed in the housing 1310 is compressed between a collar 1328 of the second release handle 1306 and a second wall 1333 of the housing 1310, as shown in FIG. 13.

The seat mount 1302 includes a third spring 1329 operatively coupled to a second end 1330 of the actuator 1316. Thus, in some examples, the actuator 1316 is a plunger. When the seat mount 1302 is disengaged from the mount receiver 1300, the third spring 1329 is in an expanded state.

As also shown in FIG. 13, the seat mount 1302 includes a support 1331 coupled to the housing 1310 and disposed in the seat mount 1302. Also, the actuator 1316 includes a second housing 1332. The support 1331 and the second housing 1332 are coupled by first and second scissor links 1334, 1336 such that at least a portion of the actuator 1316 is disposed in the support 1331. Each of the first and second scissor links 1334, 1336 includes a first link 1338 coupled via a fastener 1340 to a second link 1342. For example, the first link 1338 of each of the scissor links 1334, 1336 has a first end coupled to the fastener 1340 and a second end coupled to the support 1331. The second link 1342 of each of the scissor links 1334, 1336 has a first end coupled to the fastener 1340 and a second end coupled to the second housing 1332 of the actuator 1316. Thus, the scissor links 1334, 1336 couple the support 1331 and the second housing 1332 of the actuator 1316. The seat mount 1302 can include additional scissor links 1334, 1336 to couple the second housing 1332 of the actuator 1316 and the support 1331. Each of the first and second scissor links 1334, 1336 includes a lock 1344 extending therefrom. Each of the locks 1344 is disposed in a respective opening 1346 in the seat mount 1302. Also, the mount receiver 1300 includes openings 1348.

As shown in FIG. 13, when the seat mount 1302 is disengaged from the mount receiver 1300, the locks 1344 are in a retracted position, or a position in which the locks 1344 do not extend through the openings 1348 of the mount receiver 1300. Also, a surface 1356 of the support 1331 is spaced apart a distance $d_1$ from a surface 1358 of the second housing 1332 of the actuator 1316. When the seat mount 1302 is disposed in the mount receiver 1300 (e.g., a cavity of the mount receiver 1300 such as the cavity 322 shown in FIG. 3B), the locks 1344 move to a locked or engaged position in which the locks 1344 extend through openings 1346 of the seat mount 1302 and the openings 1348 of the mount receiver 1300. Thus, as disclosed above with respect to the example mount receiver 800 and seat mount 802 of FIGS. 8-12, the example seat 400 is removably secured to the example stroller frame 300 via locking of the example seat mount 1302 to the example mount receiver 1300.

To lock the seat mount 1302 to the mount receiver 1300 to removably secure the seat 400 to the stroller frame 300, the seat mount 1302 is disposed in the mount receiver 1300 such that a surface 1350 of the actuator 1316 engages a projection 1352 of the mount receiver 1300 (e.g., the projection 320 of the first, second, and/or third mount receivers 308, 310, 312 of FIG. 3B). The engagement of the surface 1350 of the actuator 1316 with the projection 1352 causes the actuator 1316 to overcome the force of the third spring 1329 and to move along a longitudinal axis of the seat mount 1302, or upward relative to the projection 1352, as represented by the dashed line 1354 in FIG. 13. The third spring 1329 moves to a loaded state as a result of the upward movement of the actuator 1316.

Figure 14:
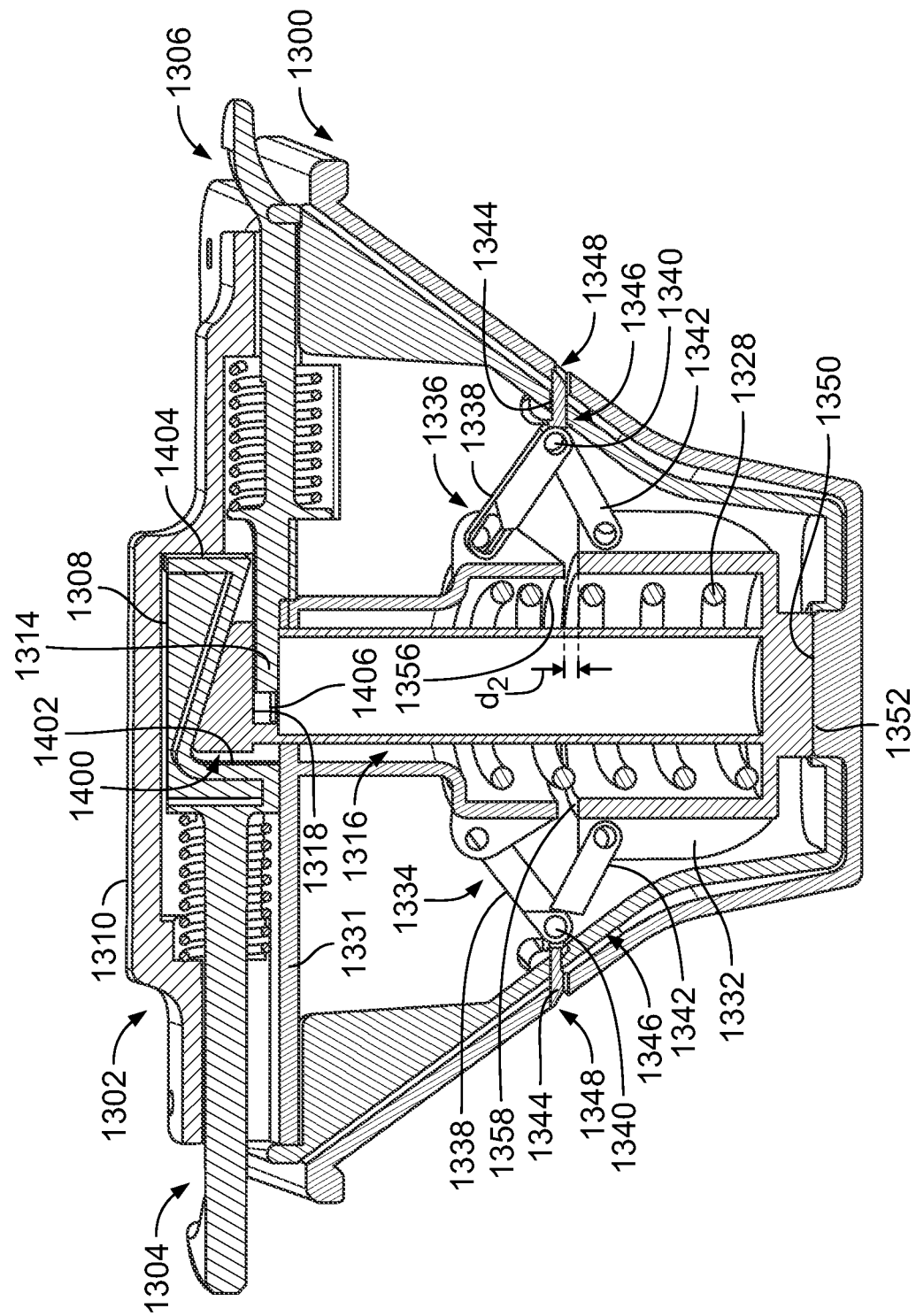
FIG. 14 is a cross-sectional view of the second example seat mount and the second example receiver of FIG. 13, the seat mount locked to the receiver.

FIG. 14 is a cross-sectional view of the example mount receiver 1300 and the example seat mount 1302 of FIG. 13. In FIG. 14, the example seat mount 1302 is coupled to the example mount receiver 1300 and, thus, the seat 400 is secured to the stroller frame 300 as shown in, for example, FIGS. 5-7. As shown in FIG. 14, the upward movement of the actuator 1316 as a result of the engagement of the surface 1350 with the projection 1352 causes each of the links 1338, 1342 of the respective first and second scissor links 1334, 1336 to pivot about the respective fastener 1340 toward one another as the actuator 1316 moves toward the support 1331. As a result of the pivoting of the respective links 1338, 1342 about the respective fastener 1340, a distance $d_2$ between the surface 1356 of the support 1331 and the surface 1358 of the second housing 1332 of the actuator 1316 is less than the distance $d_1$ between the surfaces 1356, 1358 when the seat mount 1302 is disengaged from the mount receiver 1300, as shown in FIG. 13.

As the actuator 1316 moves toward the support 1331 and the links 1338, 1342 of the respective first and second scissor links 1334, 1336 pivot about the respective fasteners 1340, the locks 1344 of each of the first and second scissor links 1334, 1336 extend through the respective openings 1346 of the seat mount 1302 to engage the respective openings 1348 of the mount receiver 1300, as shown in FIG. 14. Thus, the locks 1344 move from the retracted position to the locked position to lock the seat mount 1302 to the mount receiver 1300. The movement of the actuator 1316 along the longitudinal axis of the seat mount 1302 (e.g., the upward or vertical movement of the actuator 1316 relative to the projection 1352) causes the first and second scissor links 1334, 1336 to pivot, which results in the extension of the locks 1344 through the openings 1346, 1348 to secure the seat mount 1302 to the mount receiver 1300.

When the seat mount 1302 is disposed in the mount receiver 1300, the first release handle 1304 and the second release handle 1306 are in locked positions via the handle lock 1318 of the actuator 1316. In particular, the first end 1308 of the first release handle 1304 moves to a retracted position after the user inserts the seat mount 1302 in the mount receiver 1300 (e.g., as a result of a release of the first release handle 1304 by the user). Thus, the first end 1308 moves further into the housing 1310 relative to a position of the first end 1308 when the first release handle 1304 is in the extended position shown in FIG. 13. As a result of the retraction of the first release handle 1304 into the housing 1310 and the upward movement of the actuator 1316, the handle lock 1318 is disposed in a first slot 1400 formed between the first end 1308 and a surface 1402 of the first release handle 1304. When the handle lock 1318 is in the first slot 1400, the handle lock 1318 locks the first release handle 1304, as illustrated in FIG. 14. In some examples, the first end 1308 of the first release handle 1304 engages a wall 1404 of the housing 1310, which further secures the first release handle 1304 in the retracted position, as also illustrated in FIG. 14. A pulling force is required to move the first release handle 1304 from the retracted position of FIG. 14 to the extended position of FIG. 13.

The second release handle 1306 also moves to a retracted position when the seat mount 1302 is coupled to the mount receiver 1300 (e.g., as a result of a release of the second release handle 1306 by the user). In the retracted position, the first end 1314 of the second release handle 1306 moves further into the housing 1310 relative to a position of the first end 1314 when the second release handle 1306 is in the extended position shown in FIG. 13. As a result of the retraction of the second release handle 1306 and the upward movement of the actuator 1316, the first end 1314 of the second release handle 1306 is pushed by the third spring 1329 into a second slot 1406 formed in the handle lock 1318. Thus, the second release handle 1306 is locked via the second slot 1406 of the handle lock 1318. Also, the actuator 1316 is locked from further movement along the longitudinal axis of the seat mount 1302 as a result of the insertion of the first end 1314 of the second release handle 1306 in the second slot 1406. A pulling force is required to move the second release handle 1306 out of the second slot 1406 to the extended position shown in FIG. 13.

To release the seat mount 1302 from the mount receiver 1300, the user substantially simultaneously pulls the first release handle 1304 and the second release handle 1306 outward relative to the housing 1310. In some examples, the user may release the seat mount 1302 by first pulling the second release handle 1306 and then pulling the first release handle 1304 while holding the second handle 1306 in the extended position. As the first release handle 1304 moves outward relative to the housing 1310, the first end 1308 of the first release handle 1304 presses down on the handle lock 1318, as shown in FIG. 13. Thus, when the first release handle 1304 is in the extended position, the handle lock 1318 is no longer disposed in the first slot 1400. The downward pressing force of the first end 1308 of the first release handle 1304 on the first surface 1322 of handle lock 1318 pushes the actuator 1316 downward along the longitudinal axis of the seat mount 1302 (e.g., toward the projection 1352 and away from the support 1331). The first spring 1323 associated with the first release handle 1304 is compressed as a result of the outward pulling of the first release handle 1304, as shown in FIG. 13.

Before the first release handle 1304 moves to the extended position or at substantially the same time as the first release handle 1304 moves to the extended position, the second release handle 1306 moves the extended position via the substantially simultaneously outward pulling of the first and second release handles 1304, 1306 by the user. The outward pulling of the second release handle 1306 causes the first end 1314 of the second release handle 1306 to disengage from the second slot 1406 of the actuator 1316. At substantially the same time the first end 1314 of the second release handle 1306 moves out of the second slot 1406 of the actuator 1316 or after the first end 1314 of the second release handle 1306 moves out of the second slot 1406, the actuator 1316 is pressed downward by the first end 1308 of the first release handle 1304. The second spring 1327 associated with the second release handle 1306 is compressed as a result of the outward pulling of the second release handle 1306, as shown in FIG. 13.

As a result of the release of the first and second release handles 1304, 1306, the pushing of the first end 1308 of the first release handle 1304 on the first surface 1322 of the handle lock 1318, and the resulting downward movement of the actuator 1316, the links 1338, 1342 of the respective first and second scissor links 1334, 1336 pivot about the respective fasteners 1340 away from one another. As the links 1338, 1342 of the respective first and second scissor links 1334, 1336 pivot away from one another and the actuator 1316 moves away from the support 1331, the locks 1344 are pulled inward relative to the seat mount 1302 such that the locks 1344 retract or disengage from the openings 1348 of the mount receiver 1300. The retraction of the locks 1344 from the openings 1348 of the mount receiver 1300 releases the example seat mount 1302 from the example seat mount 1300. Also, the third spring 1329 returns to the expanded position shown in FIG. 13. The seat 400 is lifted by the user via the release handles 1304, 1306 to remove the example seat mount 1302 from the example mount receiver 1300.

The examples of FIGS. 10-14 disclosed above include actuators 900, 1316 having handle locks 1018, 1318 that engage first and second release handles 1000, 1002, 1304, 1306 of the seat mounts 802, 1302. When the first and second release handles 1000, 1002, 1304, 1306 are substantially simultaneously pulled by the user, the actuators 900, 1316 to move downward relative to the mount receivers 800, 1300 as the first and second release handles 1000, 1002, 1304, 1306 are released from the handle locks 1018. As disclosed above, the downward movement of the actuators 900, 1316 and engagement with the projections 1042, 1352 of the mount receivers 800, 1300 activates the locks 906, 1344 to mount the respective seat mounts 802, 1302 to the mount receivers 800, 1300. FIGS. 15-19 illustrate a third example mount receiver of a stroller frame and a third example seat mount of a seat for coupling to the stroller frame. In the examples of FIGS. 15-19, one of the release handles controls the locking and unlocking of the other release handle. The locking and unlocking of the release handles causes rotation of an actuator, which drives the locking and unlocking of the seat mount to the mount receiver, as will be disclosed below. As compared to the examples of FIGS. 10-14, the examples of FIGS. 15-19 provide for locking and unlocking of the seat mount to the mount receiver without vertical translation of the actuator.

Figure 16:
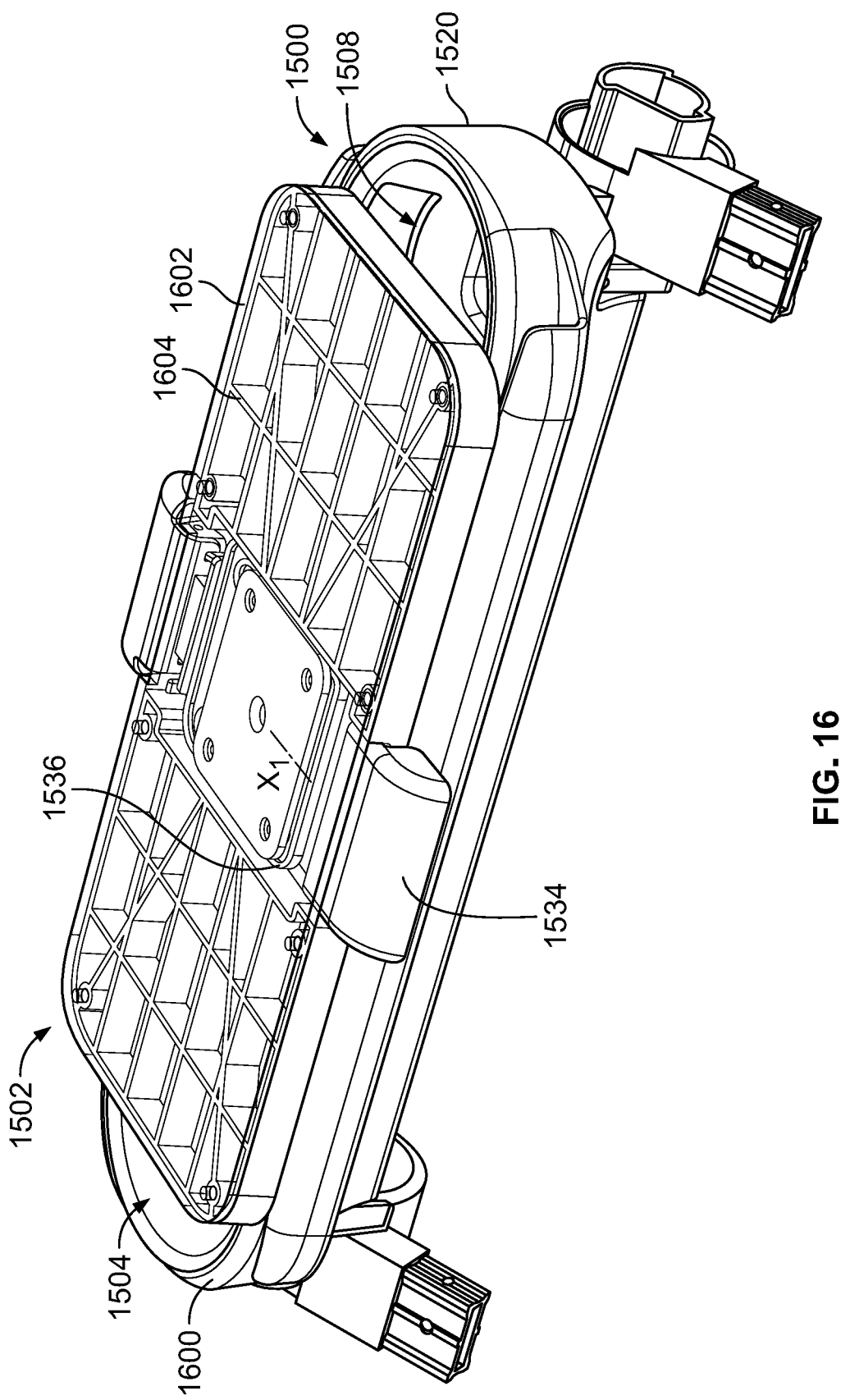
FIG. 16 is an enlarged, right, front perspective view of the third example seat mount and the mount bar of FIG. 15, the seat mount locked to the third example receiver of FIG. 15.

FIG. 15 is a right, perspective view an example mount bar 1500 and an example seat mount 1502, where the example seat mount 1502 is disengaged from the example mount bar 1500. The example mount bar 1500 can be coupled to a stroller frame such as the example stroller frame 102 of FIGS. 1 and 2 or the example stroller frame 300 of FIGS. 3A, 3B and 5-7. The example seat mount 1502 can be coupled to the example seat 400 of FIG. 4 or an accessory that is to be mounted to a stroller frame. The example mount bar 1500 includes a first mount receiver 1504, a second mount receiver 1506, and a third mount receiver 1508. The example seat mount 1502 can be received in any of the first, second, or third mount receivers 1504, 1506, 1508 (e.g., a cavity of any of the first, second, or third mount receivers 1504, 1506, 1508 such as the cavity 322 shown in FIG. 3B). For example, FIG. 16 is a right, perspective view of the example seat mount 1502 mounted in the second mount receiver 1506 of FIG. 15.

As disclosed above, the example mount bar 1500 can be coupled to a stroller frame such as the stroller frames 102, 300 of FIGS. 1, 2, 3A, 3B and 5-7. The example mount bar 1500 can be coupled between left and right sides of the stroller as substantially disclosed above with respect to the mount bar 140, 302 of FIGS. 1, 2, 3A, 3B and 5-7. As shown in FIG. 15, the mount bar 1500 is coupled to a first joint 1510 and a second joint 1512 (e.g., the joint 124 of FIG. 1) of a stroller frame via respective first and second couplers 1514, 1516. A front leg 1518 (e.g., the front leg 112 of FIG. 1) extends from each of the joints 1510, 1512, as partially shown in FIG. 15. In other examples, the mount bar 1500 is integrally formed with one or more of the legs and/or joints of the example stroller frame 102, 300 rather than removably coupled to the stroller frame 102, 300.

The example mount bar 1500 of FIG. 15 includes housing 1520 at least partially surrounding the first mount receiver 1504, the second mount receiver 1506, and the third mount receiver 1508. As illustrated in FIG. 15, a first slot 1522 is formed between the first mount receiver 1504 and the portion of the housing 1520 surrounding the first mount receiver 1504. Similarly, a second slot 1524 is formed between the second mount receiver 1506 and the portion of the housing 1520 surround the second mount receiver 1506, and a third slot 1526 is formed between the third mount receiver 1508 and the portion of the housing 1520 surround the third mount receiver 1508. The example mount bar 1500 including the housing 1520; the first, second, and third mount receivers 1504, 1506, 1508; and the first, second, and third slots 1522, 1524, 1526 can be formed via injection molding. Other suitable methods of manufacture may also be used including, for example, arrangement of multiple pieces, laser etching, and/or three-dimensional printing. When the example seat mount 1502 is mounted in one of the first, second, or third mount receivers 1504, 1506, 1508, a portion of the seat mount 1502 (i.e., a projection 1531 disclosed below) is disposed in the respective first, second, or thirds slots 1522, 1524, 1526. The first, second, or third slots 1522, 1524, 1526 associated with the mount receiver 1504, 1506, 1508 to which the seat mount 1502 is mounted helps prevent tipping of the seat mount 1502 (and the seat coupled thereto) when the seat mount 1502 is coupled to the mount bar 1500 by providing for multiple points of engagement between the seat mount 1502 and the mount bar 1500. The first, second, and third slots 1522, 1524, 1526 also facilitate alignment of the seat mount 1502 with respect to the mount bar 1502 as the seat mount 1502 is being inserted into one of the first, second, or third mount receivers 1504, 1506, 1508 and provide feedback to the user that the seat mount 1502 is properly mounted for locking the seat mount 1502 to the mount bar 1500. Although in FIG. 15, the first, second, and third slots 1522, 1524, 1526 are shown as rings and/or arches, the first, second, and third slots 1522, 1524, 1526 can have other shapes, such as one or more holes, apertures, or arcs surrounding at least a portion of the respective first, second, and third mount receivers 1504, 1506, 1508.

Turning now to the example seat mount 1502, the example seat mount 1502 includes a base 1528 and a coupler 1530 extending from the base 1528. As illustrated in FIG. 16, when the seat mount 1502 is coupled to the mount bar 1500, the coupler 1530 is disposed in one of the first, second, or third mount receivers 1504, 1506, 1508 and the base 1528 is disposed on (e.g., sits on) a surface 1600 of the housing 1520 of the mount bar 1500. Thus, the coupler 1530 and the first, second, or third mount receivers 1504, 1506, 1508 have complementary shapes (e.g., complementary frustoconical shapes).

The base 1528 can be coupled to a surface of a seat (e.g., the ground-facing surface 412 of the seat frame 402 of FIG. 4) or an accessory via one or more mechanical or chemical fasteners. In some examples, the seat mount 1502 includes a cover 1602 (FIG. 16) coupled to a seat- or accessory-facing surface 1604 of the base 1528. The base 1528 is coupled to the seat or accessory via the cover 1602. The cover 1602 provides a support surface for the seat or accessory when the seat or accessory is coupled to the seat mount 1502 and protects the components of the seat mount 1502 during use.

Returning to FIG. 15, the base 1528 of the seat mount 1502 includes a projection 1531. When the coupler 1530 is disposed in one of the first, second, or third mount receivers 1504, 1506, 1508, the projection 1531 engages the first, second, or third slot 1522, 1524, 1526 associated with the first, second, or third mount receivers 1504, 1506, 1508 in which the coupler 1530 is disposed, as disclosed above. The projection 1531 has a shape corresponding to the shape(s) of the first, second, and third slots 1522, 1524, 1526. In the example of FIG. 15, the projection 1531 has a circular or ring shape corresponding to the ring- or arched-shaped slots 1522, 1524, 1526. The base 1528, the coupler 1530, and the projection 1531 can be formed from a single mold. In other examples, the projection 1531 (or projections) may be separate elements that are coupled to the base 1528.

The example seat mount 1502 includes a first release handle 1532 and a second release handle 1534. A first plate 1536 is slidably coupled to the second release handle 1534 and a second plate 1538 is coupled to the first plate 1536. As will be disclosed below, when the second release handle 1534 moves from a locked positon to an unlocked position, the first plate 1536 slides to unlock the seat mount 1502 from the mount bar 1500.

Figure 17:
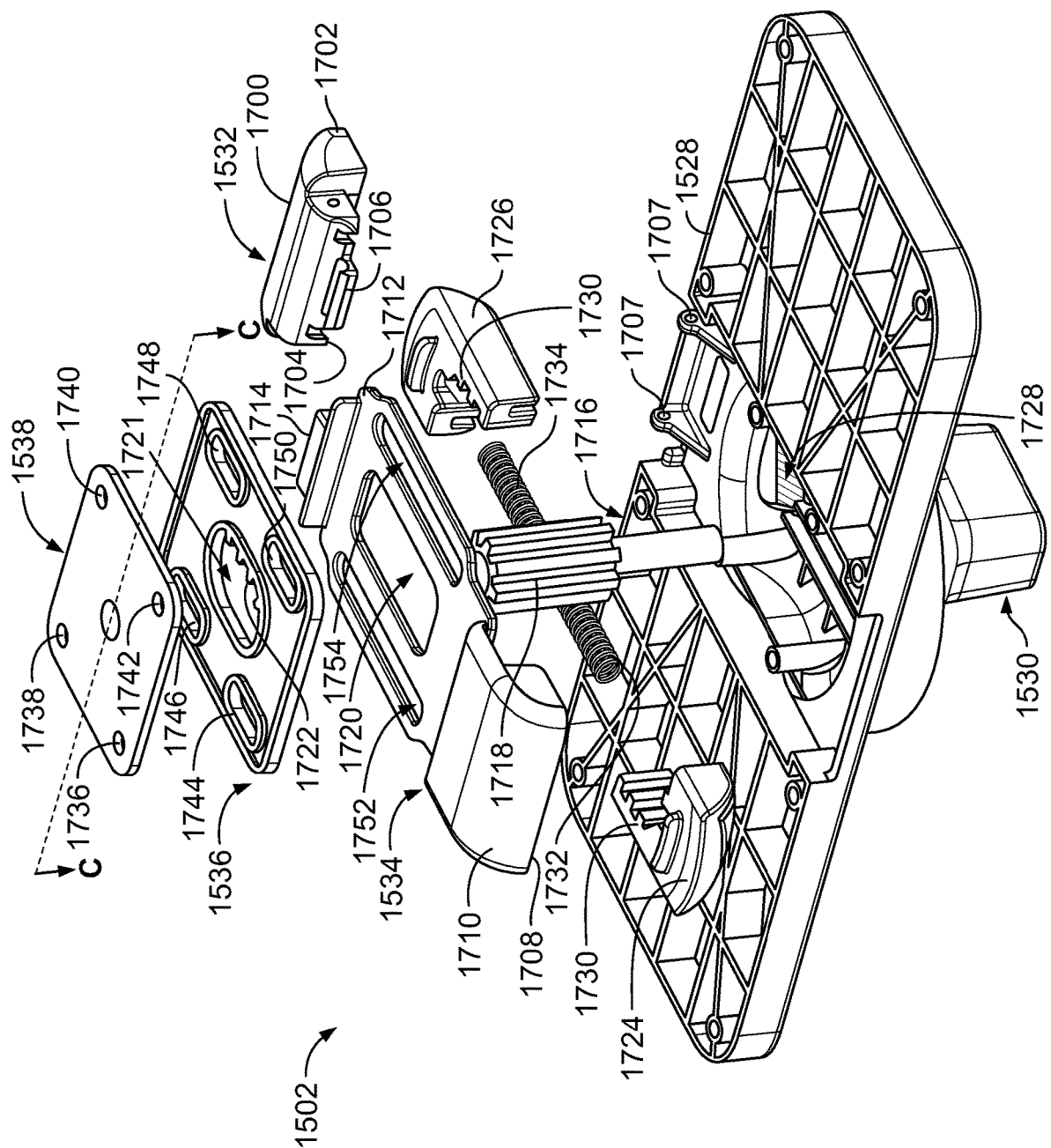
FIG. 17 is an exploded view of the third example seat mount of FIG. 15.

FIG. 17 is an exploded view of the example seat mount 1502 of FIG. 15. As shown in FIG. 17, a first end 1700 of the example first release handle 1532 includes a grip portion 1702 and a second end 1704 of the first release handle 1532 includes a hook 1706. The first release handle 1532 is coupled to the base 1528 via one or more pivots 1707. A first end 1708 of the example second release handle 1534 includes a grip portion 1710. A second end 1712 of the second release handle 1534 includes a hook receiver 1714. When the first and second release handles 1532, 1534 are in a locked position, the hook 1706 of the first release handle 1532 is disposed in the hook receiver 1714 of the second release handle 1534 (as illustrated in above in FIG. 16 and below in FIG. 18).

The seat mount 1502 includes an actuator 1716. When the seat mount 1502 is assembled, the actuator 1716 is disposed in the coupler 1530 of the seat mount 1502. The actuator 1716 includes a pinion 1718. When assembled, the pinion 1718 extends through a first opening 1720 formed in the second release handle 1534 and a first opening 1721 formed in the first plate 1536. The pinion 1718 selectively engages a rack 1722 formed in the first opening 1721 of the first plate 1536.

The seat mount 1502 includes a first lock 1724 and a second lock 1726. The first and second locks 1724, 1726 are disposed in respective openings 1728 formed in the coupler 1530. Each of the first and second locks 1724, 1726 includes teeth 1730. When the seat mount 1502 is assembled, the pinion 1718 of the actuator 1716 selectively engages the teeth 1730 of the first and second locks 1724, 1726. In some examples, the first and second locks 1724, 1726 are mirror images of one another.

A first spring 1732 is disposed between the first lock 1724 and the actuator 1716. A second spring 1734 is disposed between the second lock 1726 and the actuator 1716. As will be disclosed below in connection with FIG. 18, in some examples, the first spring 1732 is disposed between the first lock 1724 and a first projection formed in the coupler 1530 proximate to the actuator 1716 and the second spring 1734 is disposed between the second lock 1726 and a second projection formed in the coupler 1530 proximate to the actuator 1716. The first and second springs 1732, 1734 move between compressed and extended positions during locking and unlocking of the seat mount 1502 from one of the first, second, or third mount receivers 1504, 1506, 1508 of the mount bar 1500 via extension and retraction of the first and second locks 1724, 1726.

As illustrated in FIG. 17, the second plate 1538 includes a first opening 1736, a second opening 1738, a third opening 1740, and fourth opening 1742. The first plate 1536 includes a second opening 1744, a third opening 1746, a fourth opening 1748, and a fifth opening 1750. The second release handle 1534 includes a second opening 1752 and a third opening 1754. In operation, mechanical fasteners (e.g., screws as shown in FIGS. 15 and 16, above, and FIGS. 18 and 19, below) extend through (1) the first opening 1736 of the second plate 1538, the second opening 1744 of the first plate 1536, and the second opening 1752 of the second release handle 1534; (2) the second opening 1738 of the second plate 1538, the third opening 1746 of the first plate 1536, and the second opening 1752 of the second release handle 1534; (3) the third opening 1740 of the second plate 1538, the fourth opening 1748 of the first plate 1536, and the third opening 1754 of the second release handle 1534; and (4) the fourth opening 1742 of the second plate 1538, the fifth opening 1750 of the first plate 1536, and the third opening 1754 of the second release handle 1534. Thus, the second plate 1538, the first plate 1536, and the second release handle 1534 are operatively coupled to one another.

Figure 18:
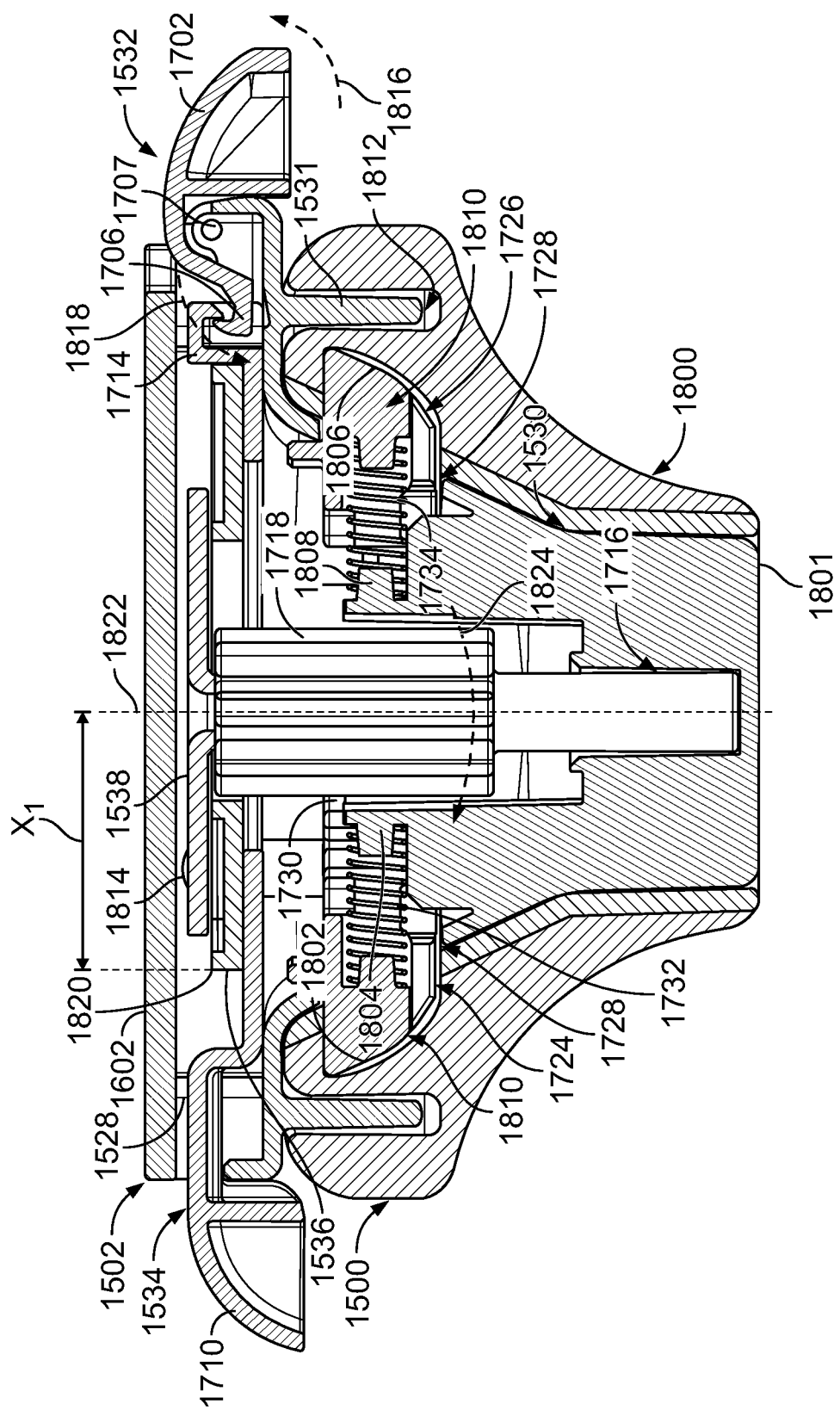
FIG. 18 is a cross-sectional view of the assembled third example seat mount, taken along the C-C line of FIG. 17, the seat mount locked to the third example receiver of FIG. 15.

FIG. 18 is a cross-sectional view of the assembled example seat mount 1502 taken along the C-C line of FIG. 17 and coupled or mounted to the example mount bar 1500 of FIG. 15 via an example mount receiver 1800. The example mount receiver 1800 of FIG. 18 can be any of the first, second, or third mount receivers 1504, 1506, 1508 of FIGS. 15 and 16. As shown in FIG. 18, the coupler 1530 of the seat mount 1502 is disposed in the mount receiver 1800 (e.g., a cavity of the mount receiver 1800 such as the cavity 322 shown in FIG. 3B) such that the coupler 1530 rests on a surface 1801 of the mount receiver 1800. For illustrative purposes, the seat 400 and the stroller frame 300 are not shown. Also, the example mount bar 1500 is partially shown for illustrative purposes.

As shown in FIG. 18, the first spring 1732 is disposed between a wall 1802 of the first lock 1724 and a first projection 1804 of the coupler 1530. The second spring 1734 is disposed between a wall 1806 of the second lock 1726 and a second projection 1808 of the coupler 1530. When the coupler 1530 is disposed in the mount receiver 1800 of FIG. 18, the first and second springs 1732, 1734 are in extended positions such that forces exerted by the first and second springs 1732, 1734 push the respective first and second locks 1724, 1726 outward relative to the actuator 1716, through the openings 1728 of the coupler 1530, and into respective notches 1810 formed in the mount receiver 1800 to couple the seat mount 1502 to the mount receiver 1800.

As also shown in FIG. 18, when the seat mount 1502 is coupled to the mount receiver 1800, the projection 1531 of the base 1528 of the seat mount 1502 is received in a slot 1812 associated with the mount receiver 1800 (e.g., one of the slots 1522, 1524, 1526 associated with the respective mount receivers 1504, 1506, 1508 of FIG. 15). Thus, the seat mount 1502 is securely coupled to the mount receiver 1800 via (1) the first and second locks 1724, 1726 in the notches 1810 of the mount receiver 1800 and (2) the projection 1531 in the slot 1812.

As disclosed above with respect to FIG. 17, the second release handle 1534, the first plate 1536, and the second plate 1538 are operatively coupled via one or more mechanical fastener(s), such as screw(s) for example. FIG. 18 shows a fastener 1814 coupling the second release handle 1534, the first plate 1536, and the second plate 1538. For example, the fastener 1814 can be disposed in the fourth opening 1742 of the second plate 1538, the fifth opening 1750 of the first plate 1536, and the third opening 1754 of the second release handle 1534. The seat mount 1502 includes other fasteners 1814 corresponding to the number of openings in the second plate 1538 (e.g., first, second, and third openings 1736, 1738, 1740 of the second plate 1538).

In the example of FIG. 18, the first and second release handles 1532, 1534 are in locked positions such that the hook 1706 of the first release handle 1532 is disposed in the hook receiver 1714 of the second release handle 1534. To release the seat mount 1502 from the mount receiver 1800, a user pivots the grip portion 1702 of the first release handle 1532 upward relative to the surface 1801 of the mount receiver 1800, as represented by a first arrow 1816 of FIG. 18. The upward pivoting of the grip portion 1702 of the first release handle 1532 causes the hook 1706 to pivot downward, or in a direction toward the surface 1801 of the mount receiver 1800, as represented by a second arrow 1818 of FIG. 18. The downward pivoting of the hook 1706 releases the coupling between the hook receiver 1714 of the second release handle 1534 and the hook 1706 of the first release handle 1532, thereby unlocking the second release handle 1534 from the first release handle 1532. When the second release handle 1534 is unlocked, the second release handle 1534 can be pulled outward relative to the seat mount 1502 via the grip portion 1710 of the second release handle 1534. The first release handle 1532 is coupled to the base 1528 via the one or more pivots 1707 and remains coupled to the seat mount 1502 when not attached to the second release handle 1534.

As also shown in FIG. 18, when the first and second release handles 1532, 1534 are in the locked positions, an end 1820 of the first plate 1536 is located a first distance $x_1$ from a longitudinal axis 1822 passing through the actuator 1716. When the second release handle 1534 is unlocked from the first release handle 1532 and pulled outward, the first plate 1536 slides with the second release handle 1534 in the direction of the movement of the second release handle 1534. The sliding of the first plate 1536 causes the pinion 1718 of the actuator 1716 to rotate via the engagement of the pinion 1718 with the rack 1722 (FIG. 17) of the first plate 1536, as represented by the arrow 1824 of FIG. 18 (due to the cross-sectional view of FIG. 18, the rack 1722 is not behind the pinion 1718 but in front, closer to the reader). The rotation of the pinion 1718 causes the first and second locks 1724, 1726 to retract from the notches 1810 of the mount receiver 1800 via the engagement of the pinion 1718 with the teeth 1730 of the first and second locks 1724, 1726. Retraction of the first and second locks 1724, 1726 from the notches 1810 of the mount receiver 1800 allows the seat mount 1502 to be removed from the mount receiver 1800.

Figure 19:
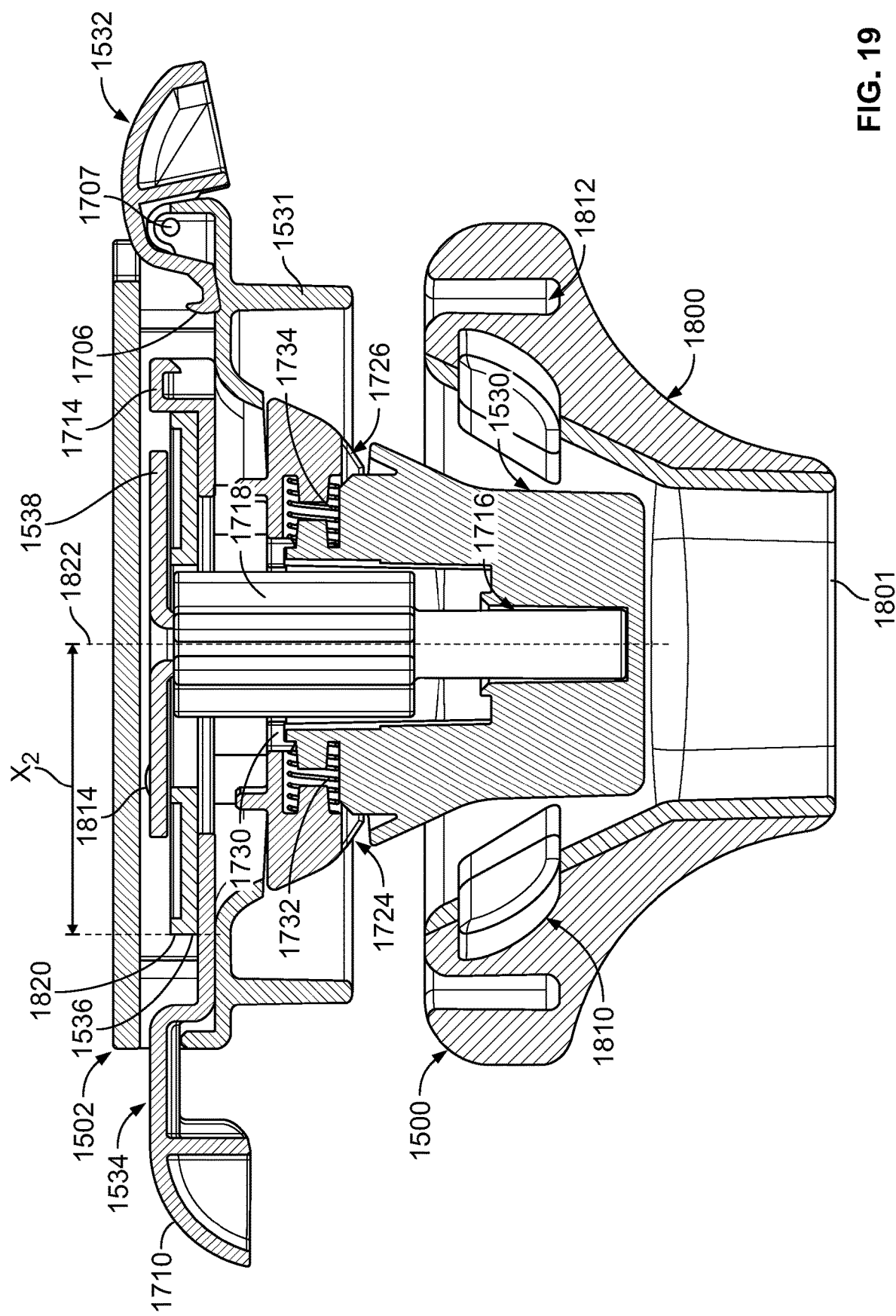
FIG. 19 is a cross-sectional view of the assembled third example seat mount, taken along the C-C line of FIG. 17, the seat mount disengaged from the third example receiver of FIG. 15.

FIG. 19 is a cross-sectional view of the example seat mount 1502 uncoupled or disengaged from the example mount receiver 1800 of FIG. 18. As shown in FIG. 19, the first and second release handles 1532, 1534 are in unlocked positions such that the hook 1706 of the first release handle 1532 is not disposed in the hook receiver 1714 of the second release handle 1534. Also, the second release handle 1534 is in an extended position relative to the position of the second release handle 1534 in FIG. 18 (e.g., as a result of the user pulling on the grip portion 1710 of the second release handle 1534).

As a result of the movement of the second release handle 1534 to the extended position, the first plate 1536 slides in a direction of the movement of the second release handle 1534. As shown in FIG. 19, when the second release handle 1534 is in the extended position, the end 1820 of the first plate 1536 is located a second distance $x_2$ from the longitudinal axis 1822 passing through a center of the actuator 1716, where the second distance $x_2$ is greater than the first distance $x_1$ of the end 1820 of the first plate 1536 from the longitudinal axis 1822 shown in FIG. 18. FIGS. 15 and 16 also show the sliding of the first plate 1536 and the change in distances $x_1$, $x_2$ when the second release handle 1534 is in the locked position and the seat mount 1502 is coupled to the mount bar 1500 (FIG. 16) as compared to when the second release handle 1534 is in the unlocked position and the seat mount 1502 is uncoupled from the mount bar 1500 (FIG. 15).

The fastener 1814 extending through the first plate 1536, the second plate 1538, and the second release handle 1534 provides for alignment of the first plate 1536 relative to the second release handle 1534 during sliding of the second release handle 1534 and the first plate 1536. Also the lengths along the major axes of the ellipses that form the first through fifth openings 1721, 1744, 1746, 1748, 1750 of the first plate 1536 and the first through third openings 1720, 1752, 1754 determine an amount that the second release handle 1534 and the first plate 1536 can slide when the grip portion 1710 of the second release handle 1534 is pulled by the user.

As the first plate 1536 slides in the direction of the movement of the second release handle 1534 (e.g., outward relative to the seat mount 1502), the sliding of the first plate 1536 causes the pinion 1718 of the actuator 1716 to rotate as a result of the engagement between the pinion 1718 and the rack 1722 of the first plate 1536. As the pinion 1718 rotates as a result of the sliding of the first plate 1536 in the direction of the movement of the second release handle 1534, the pinion 1718 engages the teeth 1730 of the first and second locks 1724, 1726. The rotation of the pinion 1718 and the engagement of the pinion 1718 with the teeth 1730 of the first and second locks 1724, 1726 causes the first and second locks 1724, 1726 to be pulled inward toward the actuator 1716 and to retract from the notches 1810 of the mount receiver 1800. As a result of the retraction of the first and second locks 1724, 1726 from the notches 1810, the first and second springs 1732, 1734 move to a compressed position.

The retraction of the first and second locks 1724, 1726 from the notches 1810 of the mount receiver 1800 unlocks the seat mount 1502 from the mount receiver 1800, thereby allowing the user to lift the seat mount 1502 from the mount receiver 1800 and remove the seat mount 1502 (and, thus, the seat or accessory to which the seat mount 1502 is coupled) from the mount bar 1500. As shown in FIG. 19, when the seat mount 1502 is lifted from the mount receiver 1800, the projection 1531 of the seat mount 1502 is disengaged from the slot 1812 of the mount receiver 1800 such that the seat mount 1502 is completely uncoupled from the mount receiver 1800.

If the user wishes to re-attach the seat or accessory to which the seat mount 1502 is coupled or to couple another seat or accessory having the seat mount 1502 of FIGS. 15-19 to the mount bar 1500, the user inserts the seat mount 1502 into the mount receiver 1800 by aligning the coupler 1530 of the seat mount 1502 with the surface 1801 of the mount receiver 1800 and aligning the projection 1531 of the seat mount 1502 with the slot 1812 associated with the mount receiver 1800. In some examples, the first and second release handles 1532, 1534 are in unlocked positions when the seat mount 1502 is inserted into the mount receiver 1800 (e.g., by a user holding and/or pulling the grip portions 1702, 1710 of the first and second release handles 1532, 1534). When the coupler 1530 is inserted into the mount receiver 1800 (e.g., the coupler 1530 engages the surface 1801 of the mount receiver 1800) and the projection 1531 is disposed in the slot 1812, the user may lock the first and second release handles 1532, 1534 by pushing the second release handle 1534 inward relative to the seat mount 1502 and pivoting the first release handler 1532 downward (e.g., toward the surface 1801 of the mount receiver 1800) such that the hook 1706 of the first release handle 1532 is disposed in the hook receiver 1714 of the second release handle 1534. Thus, the second release handle 1534 moves to a retracted position. In other examples, the second release handle 1534 automatically moves inward or retracts when the user releases the grip portion 1710 of the second release handle 1534.

As the second release handle 1534 moves to the retracted position, the first plate 1536 slides in the direction of the movement of the second release handle 1534. The sliding of the first plate 1536 as a result of the movement of the second release handle 1534 causes the pinion 1718 of the actuator 1716 to rotate due to the engagement of the pinion 1718 with the rack 1722 of the first plate 1536. When the first plate 1536 slides due to the movement of the second release handle 1534 to the retracted positon, the pinion 1718 rotates in a direction opposite the direction of rotation of the pinion 1718 when the second release handle 1534 moves to the extended position (e.g., the pinion 1718 rotates in a direction opposite the arrow 1824 of FIG. 18). The rotation of the pinion 1718 during movement of the second release handle 1534 to the retracted position causes the first and second locks 1724, 1726 to move outward relative to the actuator 1716 via the engagement of the teeth 1730 of the first and second locks 1724, 1726 with the pinion 1718. The first and second locks 1724, 1726 extend into the respective notches 1810 of the mount receiver 1800 to lock the seat mount 1502 to the mount receiver 1800. Also, the first and second springs 1732, 1734 move from compressed positions to extended positions as a result of the extension of the first and second locks 1724, 1726 into the notches 1810 of the mount receiver 1800.

Thus, FIGS. 8-19 illustrate the removably secure coupling of the example seat mount 410 of FIG. 4 to the example stroller frame 300 of FIGS. 3A and 3B via different locking mechanisms. As illustrated in FIGS. 8-19 the mount receiver 800, 1300, 1504, 1506, 1508, 1800 is a passive mechanical part in that it does not include moving parts. Rather, the example seat mount 802, 1302, 1502 includes components that provide for locking of the seat mount 802, 1302, 1502 to the mount receiver 800, 1300, 1504, 1506, 1508, 1800. For example, the example seat mount 802 of FIGS. 8-12 includes the actuator 900 having the screw drive 902, the turntable 904, the locks 906, and the first and second release handles 1000, 1002. The example seat mount 1302 of FIGS. 13 and 14 includes the actuator 1316 and the first and second scissor links 1334, 1336 including the locks 1344. The example seat mount 1502 of FIGS. 15-19 includes the actuator 1716 including the pinion 1718, the first plate 1536 including the rack 1722, and the locks 1724, 1726. Providing the locking mechanism via the seat mount 802, 1302, 1502 reduces the number of components on the stroller frame 300 and, thus, reduces the potential for components on the stroller frame 300 and the seat 400 to fail or to improperly engage. Providing the locking mechanism via the seat mount 802, 1302, 1502 also increases user control over the locking of the seat 400 to the stroller frame 300, as the operation of the seat mount 802, 1302, 1502 is controlled by the user via the first and second release handles 1000, 1002, 1304, 1306, 1532, 1534. Because the mount receiver 800, 1300 is a mechanically passive component, once the user releases the first and second release handles 1000, 1002, 1304, 1306, 1532, 1534, the user can determine that the seat 400 is locked to the frame 300 via activation of the locks 906, 1344, 1724, 1726 of the seat mount 802, 1302, 1502 without wondering if any components in the frame 300 have properly reacted to the insertion of the seat mount 802, 1302, 1502.

After the seat 400 has been removed from the stroller frame 300 via disengagement of the seat mount 410, 802, 1302, 1502 from the mount receiver 308, 310, 312, 800, 1300, 1504, 1506, 1508, 1800 of FIGS. 3A, 3B, 5-16, 18, and 19, the user can couple other seat(s) and/or accessories to the stroller frame 300. Other seat(s) and/or accessories can be coupled to any of the mount receivers 308, 310, 312, 800, 1300, 1504, 1506, 1508, 1800 of the stroller frame 300 substantially as disclosed herein with respect to the locking of the example seat mounts 802, 1302, 1502 to the example mount receivers 800, 1300, 1504, 1506, 1508, 1800 in FIGS. 3A, 3B, 5-16, 18, and 19. In other examples, the user may wish to fold the stroller frame 300 to store stroller frame 300 in a collapsed or non-use position.

Figure 20:
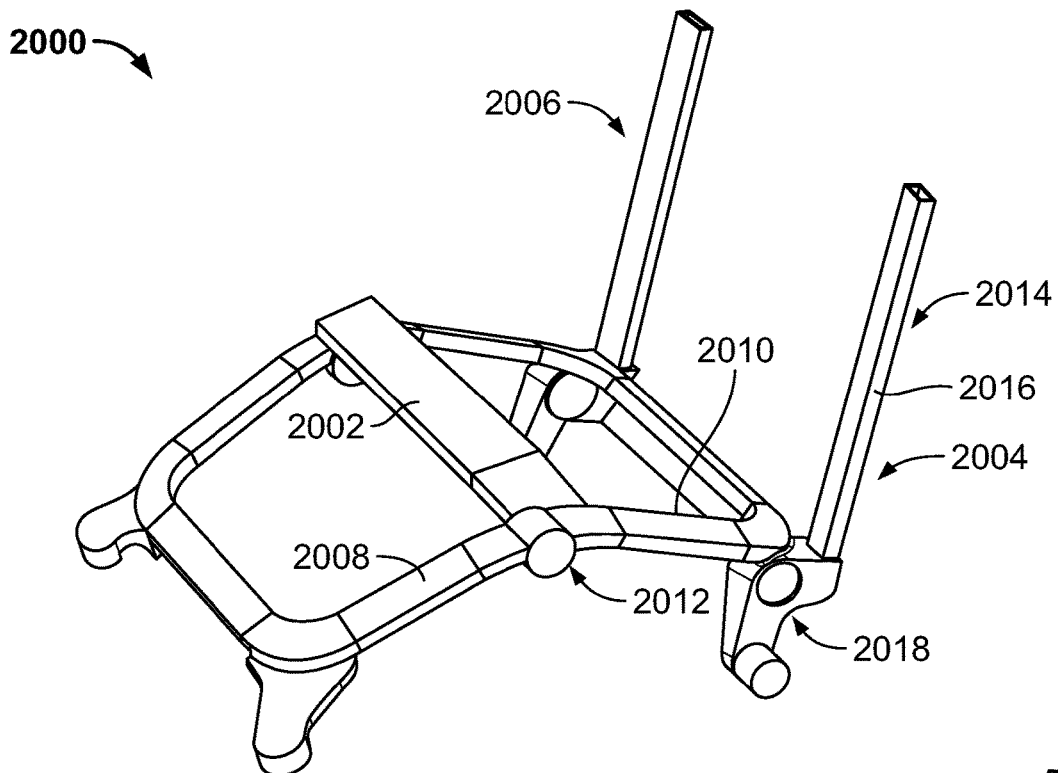
FIG. 20 is right, front perspective view of a portion of an example foldable stroller frame in an unfolded position.

FIG. 20 is a right, perspective partial view of an example foldable stroller frame 2000 (such as the example stroller frame 102 of FIGS. 1 and 2 and/or the example stroller frame 300 of FIGS. 3A, 3B, and 5-7). For illustrative purposes, the example stroller frame 2000 is shown without front or rear wheels, seat, or a parent handle coupled thereto. Also, as shown in FIG. 20, the frame 2000 includes a mount bar 2002 for coupling one or more seats to the frame 2000, as disclosed above in connection with FIGS. 2-19. For illustrative purposes, the mount bar 2002 of FIG. 20 is shown without seat mount receivers (e.g., the mount receivers 308, 310, 312, 800, 1300, 1504, 1506, 1508, 1800 of FIGS. 3A, 3B, 5-16, 18, and 19).

The frame 2000 has a first side 2004 and a second side 2006. The frame 2000 will be described with respect to the first side 2004 with the understanding that the second side 2006 is a mirror image of the first side 2004. Thus, the second side 2006 includes substantially identical frame members as the first side 2004 and, in the interest of brevity, will not be described herein.

The first side 2004 of the example frame 2000 includes a front leg 2008 and a rear leg 2010. The front leg 2008 and the rear leg 2010 are coupled via a joint 2012. The example frame 2000 includes a parent handle 2014 extending between a first side 2004 and a second side 2006 of the frame 2000, which is partially shown for illustrative purposes in FIG. 25. The parent handle 2014 includes an arm 2016. The rear leg 2010 and the arm 2016 are coupled via a hub 2018. The arm 2016, the hub 2018, and the joint 2012 cooperate to allow the front leg 2008 and the arm 2016 to rotate relative to the rear leg 2010 to fold the frame 2000. However, the following description of the folding of the stroller via cooperation between the arm 2016, the hub 2018, and the joint 2012 is an example; in other examples, the joint 2012 and the hub 2018 operate independently of one other to fold the frame 2000.

Figure 21:
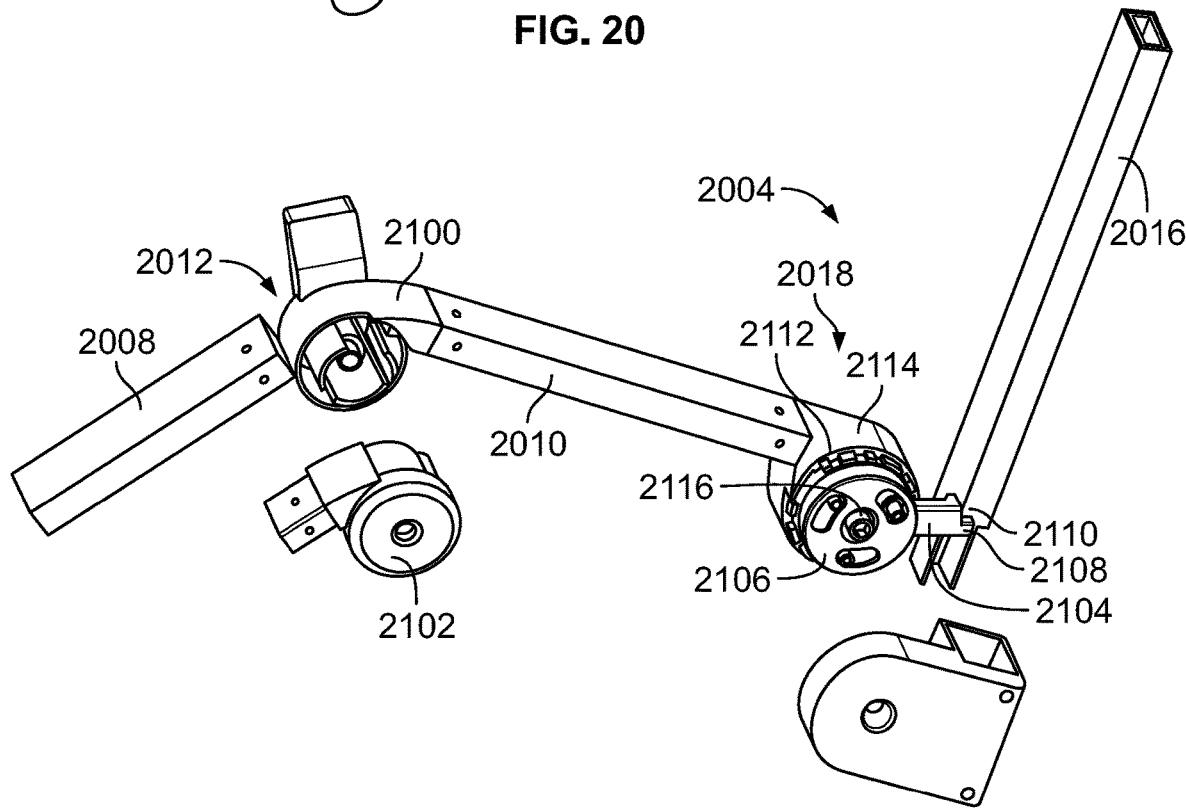
FIG. 21 is a perspective view of a first side of the example stroller frame of FIG. 20; the second side being a mirror image thereof.

FIG. 21 is an exploded perspective view of the first side 2004 of the example frame 2000 of FIG. 20 in an unfolded position. As shown in FIG. 21, the joint 2012 includes a first housing 2100 coupled to a second housing 2102 to pivotally couple the front leg 2008 to the rear leg 2010. As also shown in FIG. 21, the hub 2018 includes a lever 2104 coupled to a cam 2106. The lever 2104 has an end 2108 extending in a direction away from a center of the cam 2106 and toward the arm 2016 of the handle 2014. In some examples, when the frame 2000 is in the unfolded position, an end 2110 of the arm 2016 engages the end 2108 of the lever 2104. In other examples, the end 2110 of the arm 2016 does not engage the end 2108 of the lever 2104 when the frame 2000 is in the unfolded position. The hub 2018 also includes a locking gear 2112 coupled to the cam 2106. The locking gear 2112, the cam 2106, and at least a portion of the lever 2104 are disposed in a housing 2114 of the hub 2018. In the example of FIG. 21, a shaft 2116 extends through the locking gear 2112 and the cam 2106.

Figure 22:
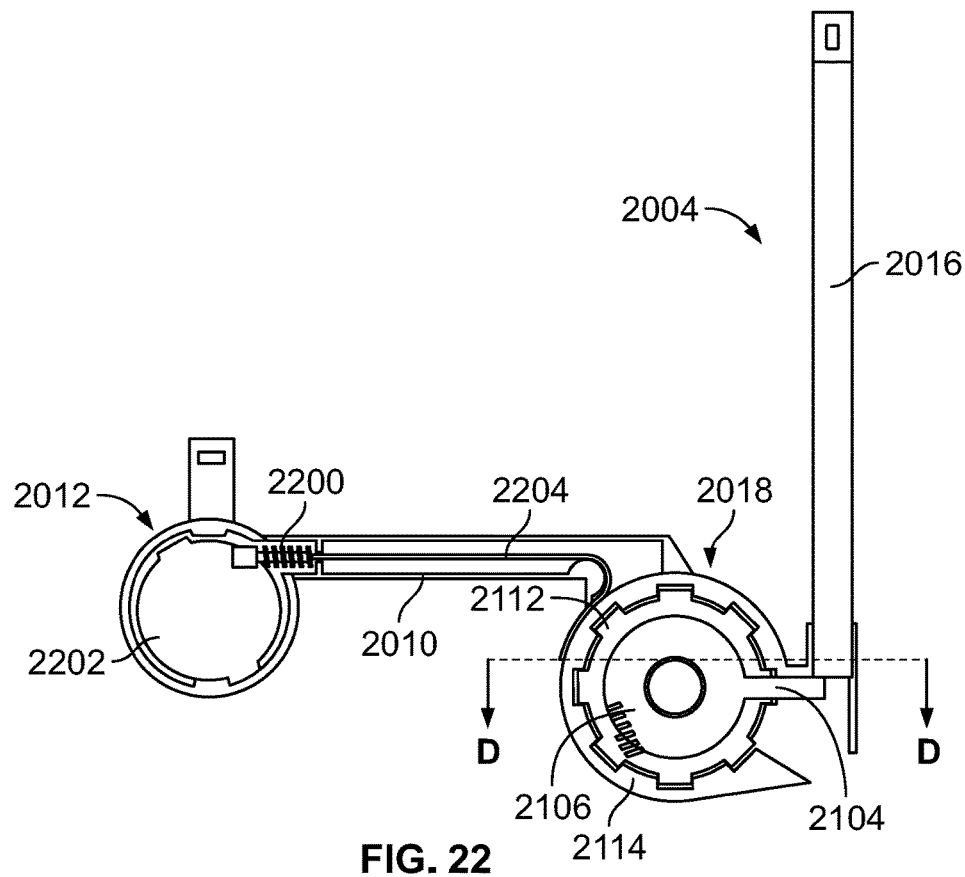
FIG. 22 is a schematic view of the first side of the example stroller frame of FIGS. 20 and 21 in the unfolded position.

FIG. 22 is a schematic view of first side 2004 of the example frame 2000 of FIGS. 15 and 16 in the unfolded position. As shown in FIG. 22, when the frame 2000 is in the unfolded position, a spring-loaded locking pin 2200 engages a receiver 2202 disposed in the joint 2012 to lock the joint 2012. The locking pin 2200 is coupled to the hub 2018 via a cable 2204 disposed in the rear leg 2010. The cable 2204 is coupled to the locking pin 2200 and the hub 2018 via, for example, a respective ball end, sleeve, or eyelet coupling between (1) a first end of the cable 2204 and the locking pin 2200 and (2) a second end of the cable 2204 and the hub 2018.

Figure 23:
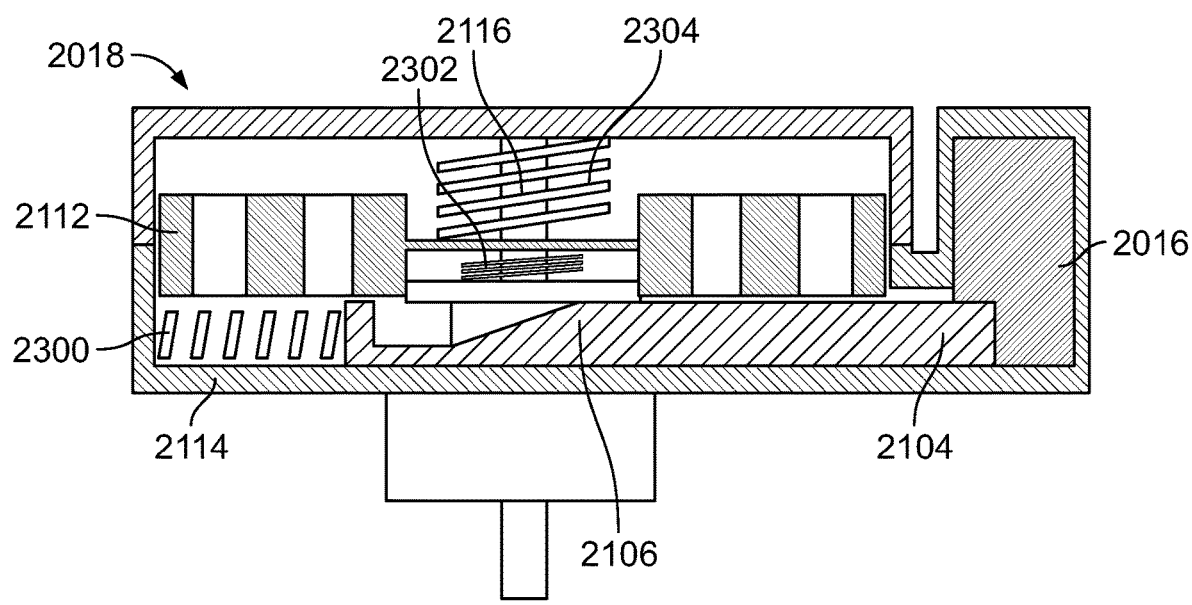
FIG. 23 is a schematic cross-sectional view of a hub of the first side of the example stroller frame of FIGS. 20 and 21, taken along the D-D line of FIG. 22; the hub of the second side being a mirror image thereof.

FIG. 23 is a schematic cross-sectional view of the hub 2018 and the arm 2016 taken along the D-D line of FIG. 22. As shown in FIG. 23, the cam 2106 is coupled to a first spring 2300, which controls a degree of rotation of the cam 2106 and, thus, the lever 2104, as will be disclosed below. The hub 2018 can include other springs, such as a second spring 2302 disposed between the cam 2106 and the locking gear 2112 and a third spring 2304 disposed between the locking gear 2112 and the housing 2114.

Figure 24:
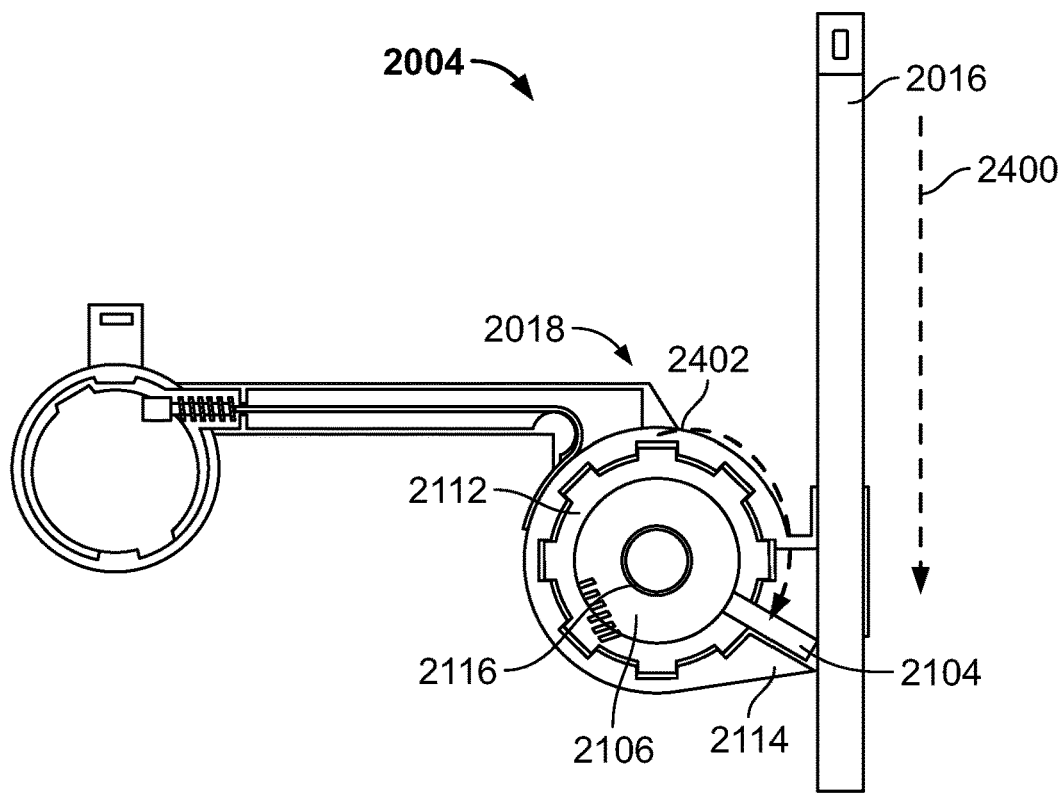
FIG. 24 is a schematic view of the first side of the example stroller frame of FIGS. 20 and 21 in a partially folded position.
Figure 25:
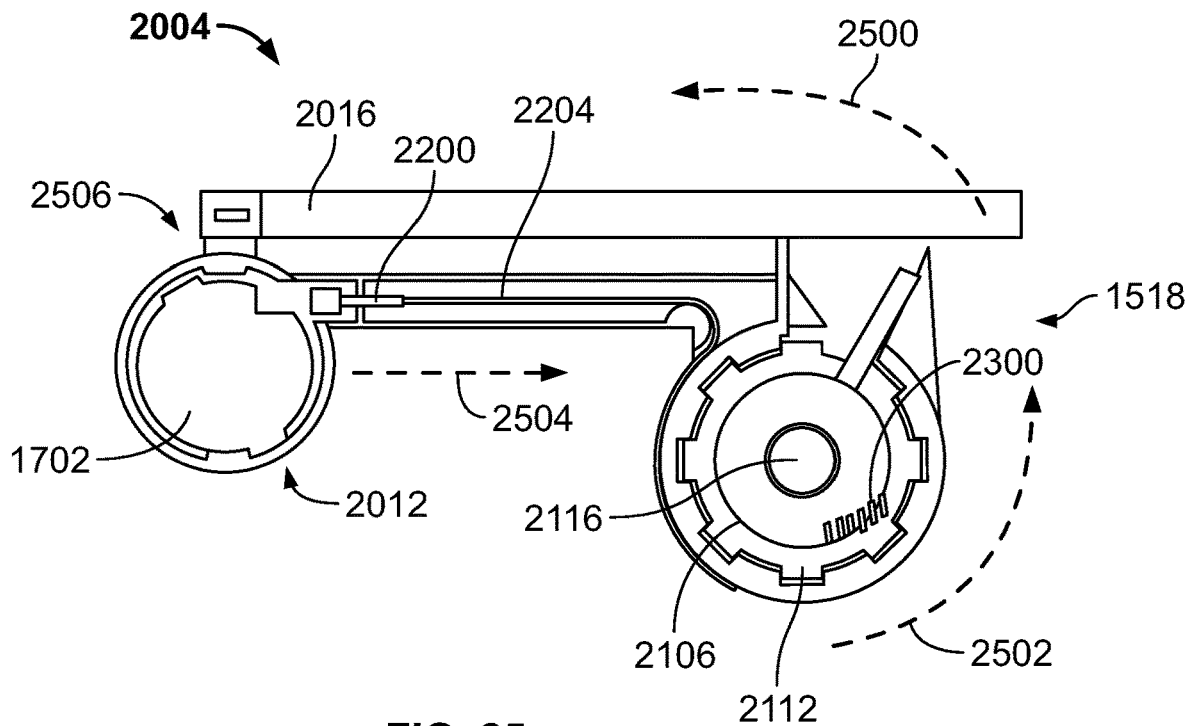
FIG. 25 is a schematic view of the first side of the example stroller frame of FIGS. 20 and 21 in a folded position.

FIG. 24 is a schematic view of the first side 2004 of the example frame 2000 in a partially folded position. FIG. 25 is a schematic view of the first side 2004 of the example frame 2000 in a folded position. To move the example frame 2000 from the unfolded or partially folded position shown in FIGS. 20-24 to the folded position of FIG. 25, a user pushes down on the arm 2016 (e.g., the user pushes on an handle bar or parent bar extending between the arms 2016 of the first and second sides 2004, 2006 of the frame 2000, as shown in FIGS. 1 and 2). In some examples, the user releases a secondary lock to enable the user to push down on the arm 2016 when the user wishes to fold the stroller. When engaged, the secondary lock can prevent movement of the arm 2016 so that the frame 2000 does not fold or collapse during use of the stroller.

The downward motion of the arm 2016 activates the hub 2018 and the joint 2012 to facilitate folding of the frame 2000. As the user pushes down on the arm 2016, as represented by the first arrow 2400 of FIG. 24, the arm 2016 pushes the lever 2104. As a result, the lever 2104 and the cam 2106 rotate clockwise about the shaft 2116, as represented by the second arrow 2402 of FIG. 24. Rotation of the cam 2106 releases the locking gear 2112 for rotation about the shaft 2116.

To collapse the frame 2000, the user rotates the arm 2016 downward and forward toward the joint 2012, as represented by the first arrow 2500 of FIG. 25. The downward and forward rotation of the arm 2016 causes the cam 2106 and the locking gear 2112 to rotate counterclockwise about the shaft 2116, as represented by the second arrow 2502 of FIG. 25. The degree of rotation of the cam 2106 about the shaft 2116 is controlled by the first spring 2300. The locking gear 2112 rotates with the cam 2106. Rotation of the locking gear 2112 causes the locking pin 2200 to be pulled out of the receiver 2202 of the joint 2012 via the cable 2204. Put another way, as the locking gear 2112 rotates about the shaft 2116, the locking gear 2112 pulls the cable 2204 and, thus, the locking pin 2200 coupled to the cable 2204 toward the hub 2018, as represented by the third arrow 2504 of FIG. 25. When the locking pin 2200 is removed from the receiver 2202, the joint 2012 is unlocked. The unlocking of the joint 2012 allows the front leg 2008 to pivot at the joint 2012 to collapse a front portion of the frame 2000. To secure the example frame 2000 in the locked position, the frame 2000 includes a fold lock 2506. The fold lock 2506 can be, for example, a spring-loaded latch that couples the arm 2016 to the joint 2012.

Figure 26:
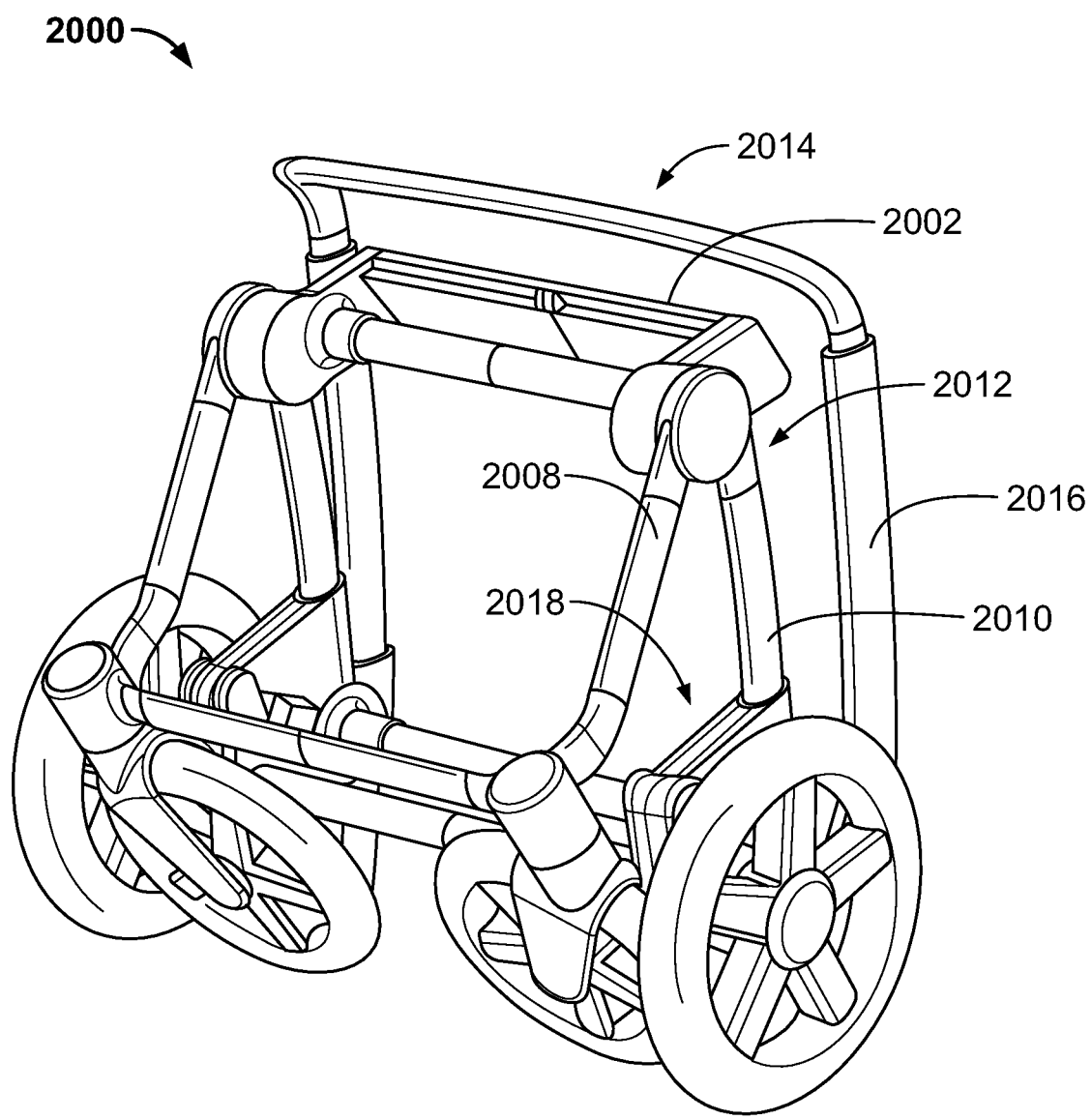
FIG. 26 is a right, front perspective view of the example stroller frame of FIG. 20.

FIG. 26 is a front, right perspective view of the example frame 2000 of FIG. 25 in the folded position an including front and rear wheels. As illustrated in FIG. 26, in the folded position, the frame 2000 is collapsed at the joint 2012 and the hub 2018. The release of both the joint 2012 and the hub 2018 via the cable 2204 when the user pushes down on the arm 2016 provides for ease of use, as the user does not have to release the joint 2012 and the hub 2018 separately.

As also shown in FIG. 26, when the frame 2000 is in the folded position, the parent handle 2014 is proximate to the mount bar 2002. In operation, at least a portion of the seat mount receivers (e.g., the mount receivers 308, 310, 312, 800, 1300, 1504, 1506, 1508, 1800 of FIGS. 3A, 3B, 5-16, 18, and 19) coupled to the mount bar 2002 projects from the mount bar 2002, as shown in FIGS. 3A and 3B. In some examples, the seat mount receivers coupled to the mount bar 2002 are made of a flexible elastomeric material such that an edge of a seat mount receiver located near the arm 2016 (e.g., a seat mount receiver located proximate to the first or second sides 2004, 2006 of the frame 2000) flexes or bends inward relative a center of the frame 2000 to clear a path for the arm 2016. Thus, additional clearance does not need to be provided to account for the seat mount receiver(s) coupled to the mount bar 2002 when the stroller is folded. Rather, the flexing of the seat mount receiver maximizes a degree to which the arm 2016 is folded relative to the joint 2012, thereby decreasing the size of the frame 2000 in the folded position.

Figure 27:
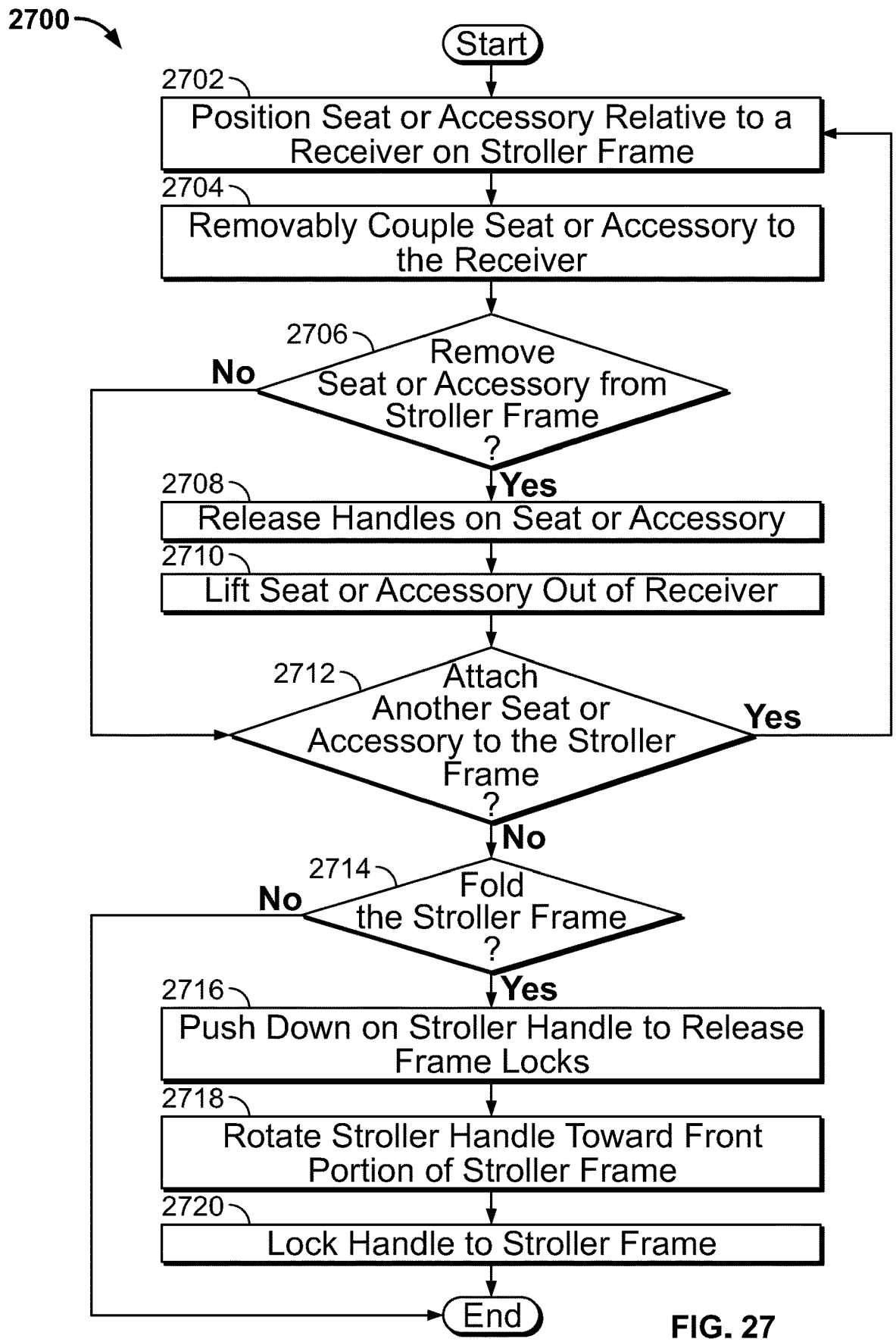
FIG. 27 is a flowchart representative of an example method disclosed herein for removably coupling a seat to a foldable stroller frame.

FIG. 27 is a flowchart illustrating an example process 2700 for removably coupling a seat or accessory (e.g., the seat 128, 200, 400 or an accessory such as a basket) to a foldable frame (e.g., the frame 102, 300, 2000) of a stroller (e.g., the stroller 100). Although the example process 2700 is disclosed with respect to the flowchart illustrated in FIG. 27, many other methods of operating the example seat 128, 200, 400 and/or the example frame 102, 300, 2000 may alternatively be used. For example, the order of execution of the blocks may be changed, and/or some of the blocks described may be changed, eliminated, or combined.

The example process 2700 of FIG. 27 includes positioning the seat or accessory relative to a receiver on a stroller frame (block 2702). For example, a user can position the seat 128, 200, 400 over one of the mount receivers 308, 310, 312, 800, 1300, 1504, 1506, 1508, 1800 of the frame 102, 300, 2000 such that the seat mount 410, 802, 1302, 1502 on the seat 128, 200, 400 is substantially aligned over an opening or cavity 322 of the one of the mount receivers 308, 310, 312, 800, 1300, 1504, 1506, 1508, 1800.

The example process 2700 includes removably coupling the seat or the accessory to the receiver (block 2704). For example, the user can insert the seat mount 410, 802, 1302, 1502 of the seat 128, 200, 400 in one of the mount receivers 308, 310, 312, 800, 1300, 1504, 1506, 1508, 1800. When the seat mount 410, 802, 1302, 1502 engages the one of the mount receivers 308, 310, 312, 800, 1300, 1504, 1506, 1508, 1800, the locks 906, 1344, 1724, 1726 of the seat mount 410, 802, 1302, 1502 engage with the openings 912, 1346, 1728 of the seat mount 410, 802, 1302, 1502 and the openings 914, 1348 or notches 1810 of the one of the mount receivers 308, 310, 312, 800, 1300, 1504, 1506, 1508, 1800 to lock the seat 128, 200, 400 to the frame 102, 300, 2000.

The example process 2700 includes a decision whether to remove the seat or accessory from the stroller frame (block 2706). For example, the user may decide to remove the seat or accessory from the frame because the stroller is no longer being used and the user wishes to fold stroller. Or the user may wish to replace the seat or accessory with a different type of seat or accessory. For example, the user may wish to replace an upright seat for a toddler with a bassinet to accommodate an infant.

If a decision is made not to remove a seat or accessory from the stroller frame (block 2706), the example process 2700 continues at block 2712, as disclosed below. However, if a decision is made to remove the seat or accessory from the stroller frame (block 2706), the example process 2700 includes releasing handles on the seat or accessory to unlock the seat or accessory from the receiver (block 2708). For example, the user may substantially simultaneously pull the first release handle 1000, 1304 and the second release handle 1002, 1306 outward relative to the mount receiver 308, 310, 312, 800, 1300 to which the seat mount 410, 802, 1302 is coupled, which causes the locks 906, 1344 of the seat mount 410, 802, 1302 to retract from the openings 914, 1346 of the mount receiver 308, 310, 312, 800, 1300. As another example, the user may pivot the first release handle 1532 to unlock the second release handle 1534. In such examples, the user pulls the second release handle 1534 outward relative to the mount receiver 1504, 1506, 1508, 1800 to which the seat mount 1502 is coupled, which causes the first plate 1536 to slide with the second release handle 1534 and rotate the actuator 1716 of the seat mount 1502. Rotation of the actuator 1716 causes the locks 1724, 1726 to retract from the notches 1810 of the mount receiver 1504, 1506, 1508, 1800.

When unlocked, the user can lift the seat or accessory out of the receiver (block 2710). For example, when the seat 128, 200, 400 or accessory is unlocked from the mount receiver 308, 310, 312, 800, 1300, 1504, 1506, 1508, 1800 via the pulling and/or pivoting of the release handles 1000, 1002, 1304, 1306, 1532, 1534 and the resulting disengagement of the seat mount 410, 802, 1302, 1502 from the mount receiver 308, 310, 312, 800, 1300, 1504, 1506, 1508, 1800 via the retraction of the locks 906, 1344, 1724, 1726, the seat or accessory can be lifted out of the mount receiver 308, 310, 312, 800, 1300, 1504, 1506, 1508 by the user.

The example process 2700 includes a decision whether to attach another seat or accessory to the stroller frame (block 2712). For example, the user may wish to replace the seat (e.g., an upright seat) or accessory removed from the frame with another type of seat (e.g., a bassinet) or accessory. Also, if the user previously in the example process 2700 decided not to remove the seat or accessory from the stroller frame (e.g., block 2706), the decision at block 2712 would be whether to attach another seat or accessory to the frame via a different receiver than the receiver to which the seat or accessory is coupled. If the user wishes to attach another seat or accessory to the stroller frame (block 2712), the example process 2700 returns to the user positioning a seat or accessory over a receiver on the stroller frame to removably couple the seat or accessory to the frame (blocks 2702, 2704). The type of seat or accessory can differ from the seat or accessory currently attached to the stroller frame to provide for combinations such as one seat and one accessory, one upright seat and one bassinet, etc. Also, the orientation of the seat or accessory can differ from the seat or accessory currently attached to the stroller frame to include, for example, one forward-facing seat and one rearward-facing seat.

If the user does not wish to attach another seat or accessory to the stroller frame (block 2712), the example process 2700 includes a decision whether to fold the stroller frame (block 2714). For example, the user may wish to store the stroller frame in a collapsed position because the stroller is no longer being used.

If the user does not wish to fold the stroller frame (block 2714), the example process 2700 ends. However, if the user wishes to fold the stroller frame (block 2714), the example process 2700 includes pushing down on a handle of the stroller frame to release locks that secure the frame in the unfolded position (block 2716). For example, the user can push down on a parent handle 110, 2014 of the stroller frame 102, 300, 2000. On each side of the stroller frame, the parent handle 110, 2014 includes the arm 108, 2016 that engages the lever 2104 of the hub 2018 coupling the rear leg 2010 and the handle 2014. Thus, the frame 102, 300, 2000 collapses at the hub 2018.

The example process 2700 includes rotating the stroller handle toward a front portion (e.g., proximate to a front wheel) of the stroller frame (block 2718). For example, the user can rotate the parent handle 110, 2014 via the arm 108, 2016 forward toward the joint 2012 coupling the front leg 2008 and the rear leg 2010. The rotation of the parent handle 110, 2014 causes rotation of the cam 2106 and the locking gear 2112 of the hub 2018, which in turn pulls the cable 2204 connecting the hub 2018 and the joint 2012 via the rear leg 2010. The pulling of the cable 2204 releases the locking pin 2200 from the receiver 2202 of the joint 2012, thereby allowing the front leg 2008 to pivot relative to the rear leg 2010. Thus, the frame 102, 300, 2000 also collapses at the joint 2012.

The example process 2700 includes locking the handle to the stroller frame (block 2720). For example, the parent handle 110, 2014 can be coupled to the joint 2012 via the fold lock 2506 to secure the frame 102, 2000 in the collapsed or folded position for storage.

When one or more seats are attached to a stroller frame via the example seat mounts disclosed herein, the seat(s) enable one or more occupants to be transported via the stroller in a forward-facing seat configuration, a rearward-facing seat configuration, and/or a sideways seat configuration relative to the direction of travel of the stroller. An example seat disclosed herein can be further adjusted with respect to a recline angle of a back of the seat relative to a base of the seat to provide for comfort of the occupant(s) during use of the stroller. Further, the seatback recline angle of the examples seat disclosed herein can be adjusted when two or more seats are coupled to the stroller frame (e.g., as shown in FIG. 2) without interference from the other seat and/or the stroller handle.

Figure 28:
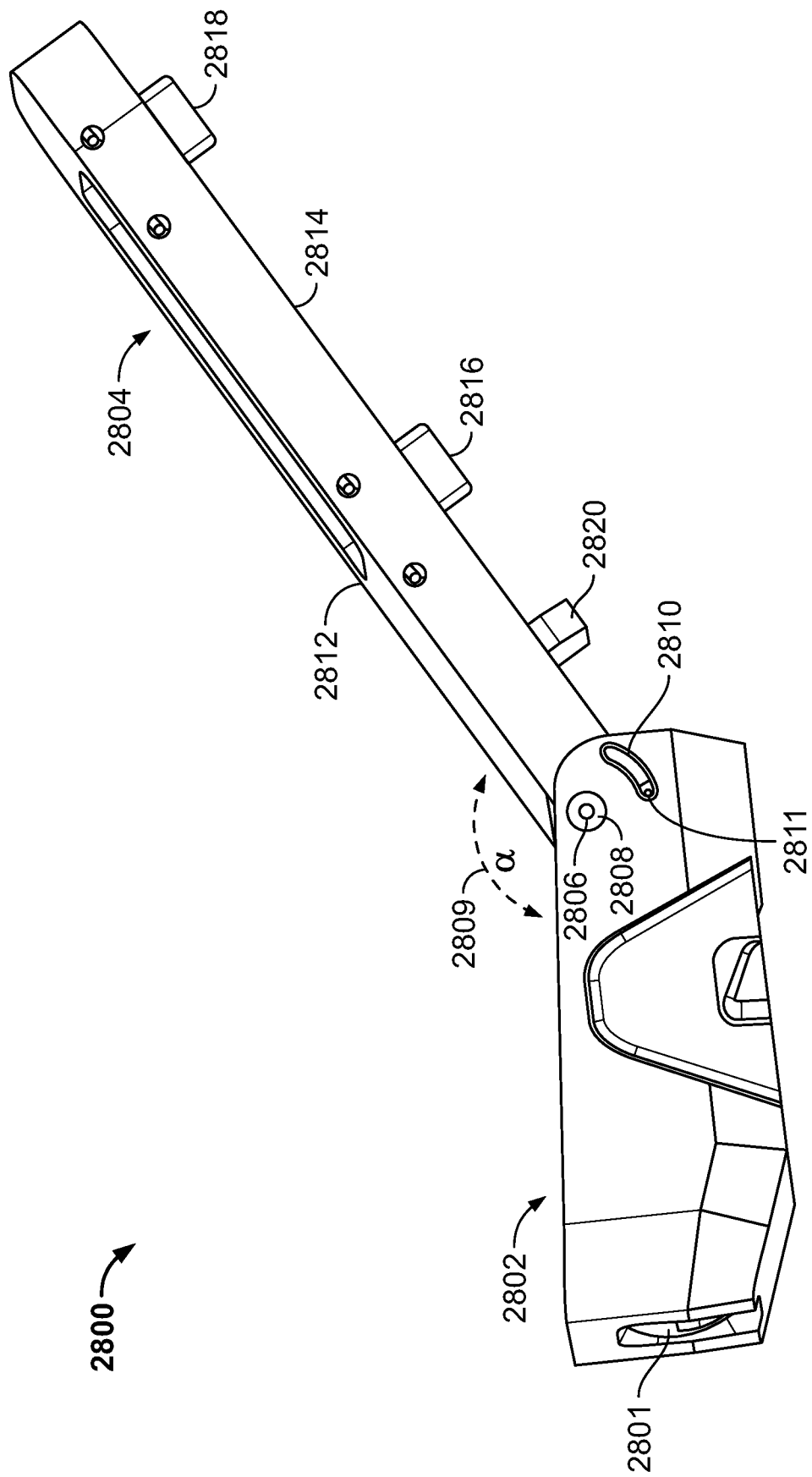
FIG. 28 is a perspective view of a first side of an example seat having an adjustable seat back in accordance with the teachings of this disclosure; the second side being a mirror image thereof.

FIG. 28 is a right side view of an example seat 2800 (e.g., the seat 128, 200, 400) that can be mounted to a stroller frame (e.g., the stroller frame 102, 2000) via a coupling between a seat mount attached to the example seat 2800 (e.g., the seat mount 410, 802, 1302, 1502) and a mount receiver of the stroller frame (e.g., the mount receiver 308, 310, 312, 800, 1300, 1504, 1506, 1508, 1800). For example, a first seat release handle 2801 (e.g., the first or second release handle 1000, 1304, 1532 of FIGS. 10 and 12-19) and a second release handle (not shown; e.g., the second release handle 1002, 1306, 1534 of FIGS. 10 and 12-19) can be accessed from the seat 2800 to control mounting and removal of the seat 2800 from the mount receiver of the stroller frame. For illustrative purposes in FIG. 28, the example seat 2800 is shown without a seat mount. Also, the stroller frame and mount receiver(s) are not shown.

The example seat 2800 includes a seat base 2802 and a seat back 2804 movably coupled to the seat base 2802. The seat back 2804 is coupled to the seat base 2802 via an axle 2806 that is received in a first axle receiver 2808 of the seat base 2802. The seat back 2804 rotates about the axle 2806 during adjustment of the recline angle α of the seat back 2804 relative to the seat base 2802, as represented by the arrow 2809. The seat base 2802 includes a first slot 2810. A stopper 2811, which may be, for example, a head of a screw, is disposed in the first slot 2810. During rotation of the seat back 2804, the stopper 2811 slides in the first slot 2810. The first slot 2810 and the stopper 2811 control a range of motion of the seat back 2804 about the axle 2806 by providing limits as to how far the seat back 2804 can be rotated relative to the seat base 2802. The left side of the example seat 2800 is a mirror image of the right side shown in FIG. 28. Thus, the left side of the example seat 2800 includes a second axle receiver 2808 and a second slot 2810 for receipt of a second stopper 2811 as shown for the right side of the example seat 2800 in FIG. 28.

The example seat back 2804 includes a first surface 2812 and a second surface 2814 opposite the first surface 2812. In operation, the first surface 2812 is a surface upon which a back of an occupant of the seat 2800 rests when the occupant is seating in the seat 2800. The second surface 2814 includes a first release button 2816 and a second release button 2818. The first and second release buttons 2816, 2818 can be spring-loaded. In some examples, the first and/or second release buttons 2816, 2818 are located at other positons on the seat 2800 (e.g., a side surface or a top surface of the seat back 2804). As will be disclosed below, activation of the first or second release buttons 2816, 2818 releases pins that lock the seat back 2804 to the seat base 2802 at a selected recline angle to allow the seat back 2804 to rotate about the axle 2806, thereby allowing the user to adjust the recline angle of the seat back 2804. A recline handle 2820 is coupled to the second surface 2814. During operation, the user can grasp the recline handle 2820 while adjusting the recline angle of the seat 2800.

Figure 29:
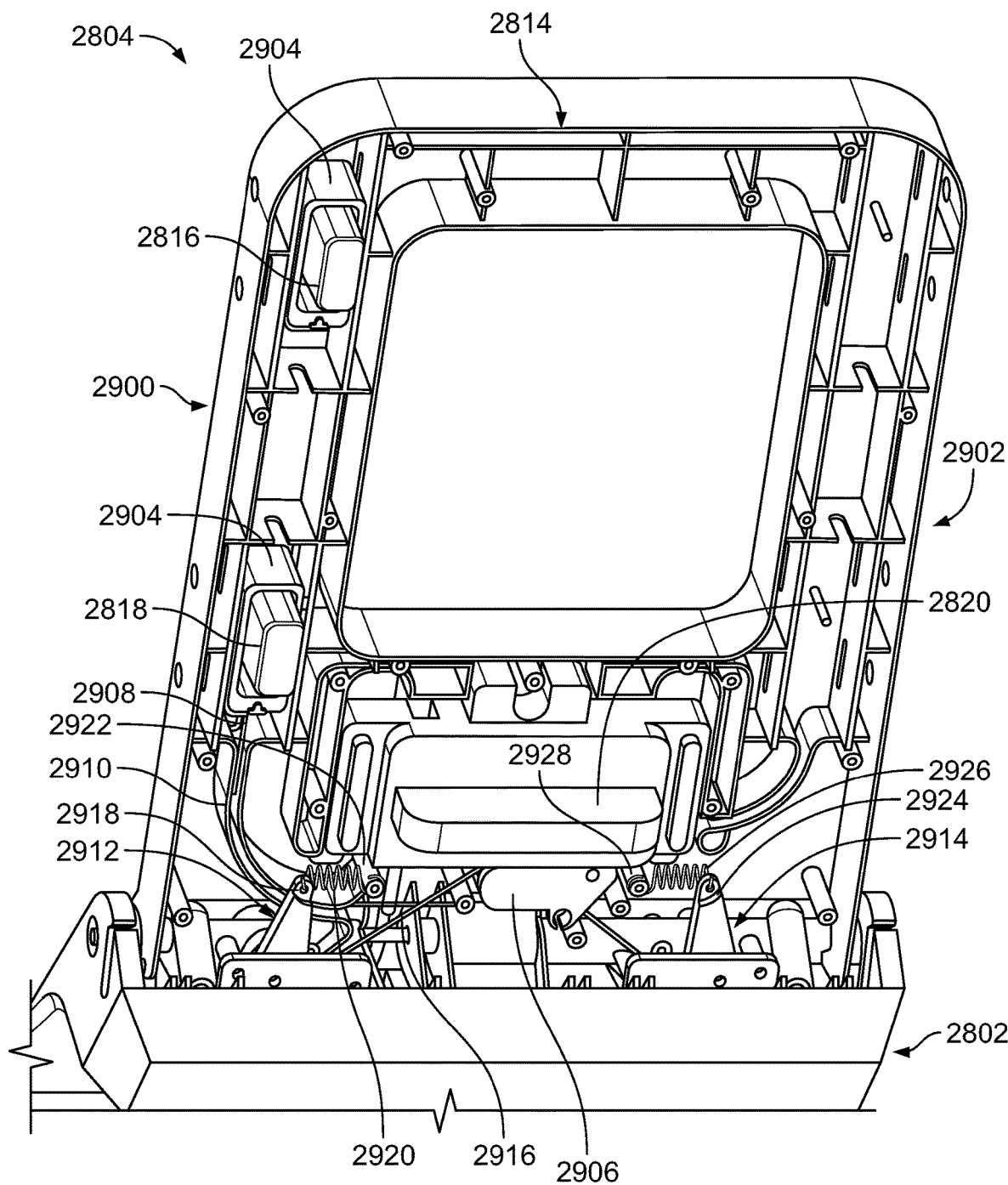
FIG. 29 is an enlarged, rear perspective view of the seat back of the example seat of FIG. 28.

FIG. 29 is an enlarged perspective view of the second surface 2814 of the seat back 2804 of the example seat 2800 of FIG. 1. In some examples, a cover is coupled to the second surface 2814, however, for illustrative purposes, the second surface 2814 is shown without a cover in FIG. 29. As shown in FIG. 29, the first and second release buttons 2816, 2818 are disposed on a first side 2900 (e.g., a left side) of the second surface 2814 in a linear arrangement such that the first release button 2816 is located a spaced apart distance from the second release button 2818 along a longitudinal axis. In other examples, the first release button 2816 is disposed on the first side 2900 of the second surface 2814 and the second release button 2818 is disposed on a second side 2902 (e.g., a right side) of the second surface 2814. Also, in other examples, a distance between the first and second release buttons 2816, 2818 can differ from that shown in FIGS. 28 and 29. In some examples, the example seat 2800 includes one release button or includes additional release buttons than shown in FIGS. 28 and 29.

Each of the first and second release buttons 2816, 2818 are disposed in a respective housing 2904. Also, each of the first and second release buttons 2816, 2818 are operatively coupled to a pulley 2906, which controls locking and unlocking pins from seat base 2802 to enable adjustment of the recline angle of the seat back 2804 relative to the seat base 2802. Thus, operation of either one of the first and second release buttons 2816, 2818 can be used to change an angle of recline of the seat back 2804. For example purposes, the adjustment of the recline angle of the seat back 2804 will be discussed with respect to activation of the second release button 2818 with the understanding that the first release button 2816 operates substantially the same as the second release button 2818 and that the first and second release buttons operate substantially the same regardless of their location on the second surface 2814 of the seat back 2804.

Figure 30:
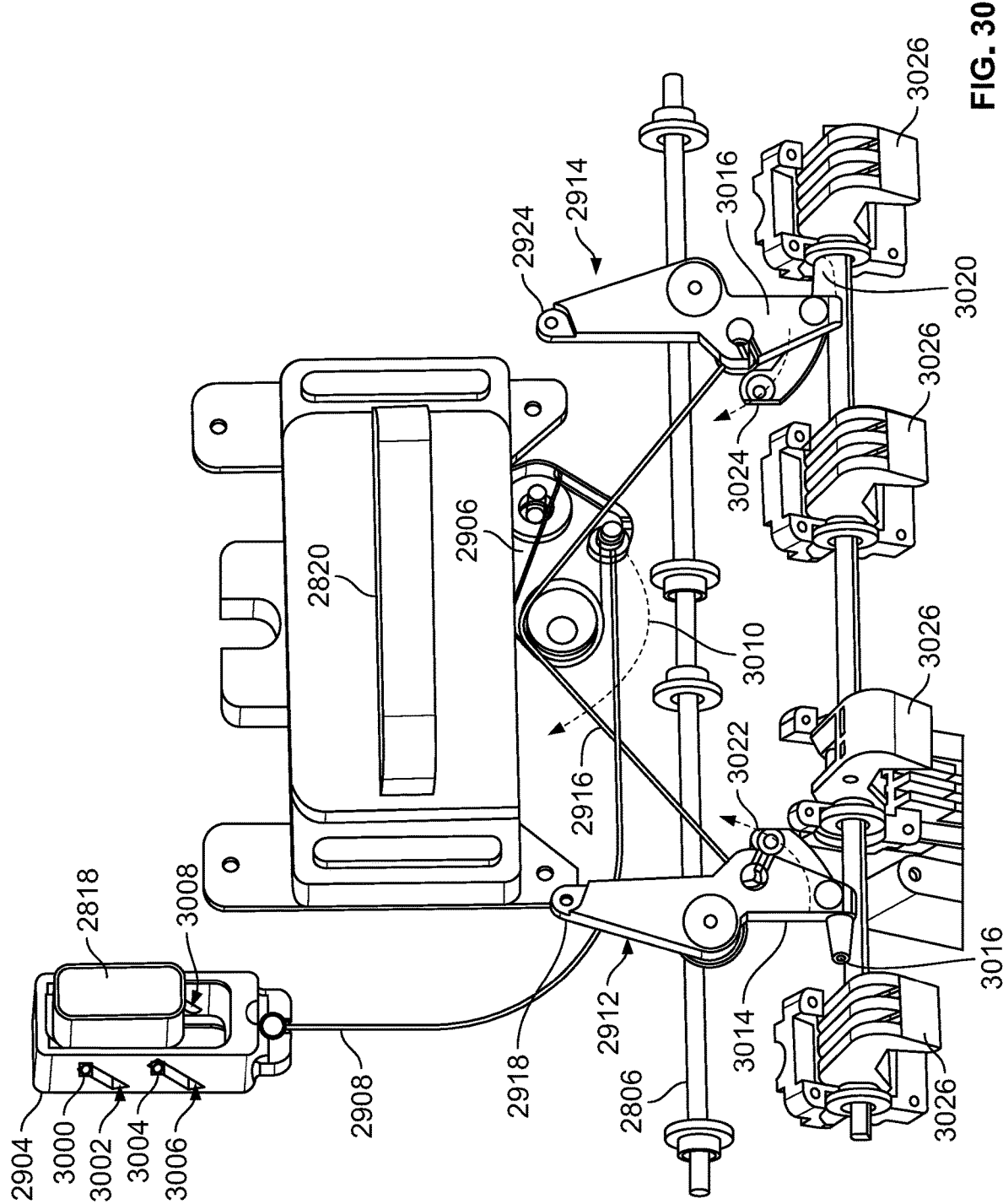
FIG. 30 is a partial, enlarged perspective view of the seat back of FIG. 29.

FIG. 30 is an enlarged left, perspective view the example pulley 2906 and the example second release button 2818 for selectively adjusting the recline angle of the seat back 2804 relative to the seat base 2802. For illustrative purposes, the second surface 2814 of the seat back 2804 is not shown in FIG. 30. Also for illustrative purposes, the pulley 2906 is shown in a transparent view.

As shown in FIG. 30, the second release button 2818 is coupled to the housing 2904 via a first rod 3000 having a first end disposed in a first opening 3002 of the housing 2904 and a second end disposed in a second opening of the housing 2904 (not shown) and a second rod 3004 having a first end disposed in a third opening 3006 of the housing 2904 and a second end disposed in a fourth opening 3008. As shown in FIG. 30, the openings 3002, 3006, 3008 formed in the housing 2904 at an angle. In operation, when a user presses the second release button 2818, the first and second rods 3000, 3004 slide downward in the openings 3002, 3006, 3008 such that housing 2904 moves upward relative to the seat base 2802. Thus, the first and second rods 3000, 3004 serve as cams.

Referring to FIG. 29, a first cable 2908 is coupled to the second release button 2818 and the pulley 2906. In some examples, the first cable 2908 is disposed in a housing 2910 for alignment of the first cable 2908 and to protect the first cable 2908 from interference with other components of the seat back 2804. When the housing 2904 moves upward as a result of activation of the second release button 2818, the housing 2904 pulls the first cable 2908. The pulling of the first cable 2908 as a result of the movement of the housing 2904 causes the pulley 2906 to pivot upward toward the recline handle 2820, as represented by the arrow 3010 in FIG. 30.

As show in FIGS. 29 and 30, the seat back 2804 includes a first recline adjuster 2912 and a second recline adjuster 2914. The first recline adjuster 2912 is disposed proximate to the first side 2900 of the second surface 2814 of the seat back 2804 and the second recline adjuster 2914 is disposed proximate to the second side 2902 of the second surface 2814. The first and second recline adjusters 2912, 2914 are coupled to the pulley 2906 via a second cable 2916 that runs through the pulley 2906 and has respective ends coupled to the first and second recline adjusters 2912, 2914, as shown in FIG. 30.

A first end 2918 of the first recline adjuster 2912 is coupled to the second surface 2814 via a first spring 2920 coupled to a first post 2922 of the second surface 2814. A first end 2924 of the second recline adjuster 2914 is coupled to the second surface 2814 via a second spring 2926 coupled to a second post 2928 of the second surface 2814. Referring to FIG. 30, a second end 3014 of the first recline adjuster 2912 includes a first pin 3016. Also, a second end 3018 of the second recline adjuster 2914 includes a second pin 3020. Each of the first and second pins 3016, 3020 are removably coupled to the seat base 2802 to lock the seat back 2804 to the seat base 2802 at a selected recline angle.

Figure 31:
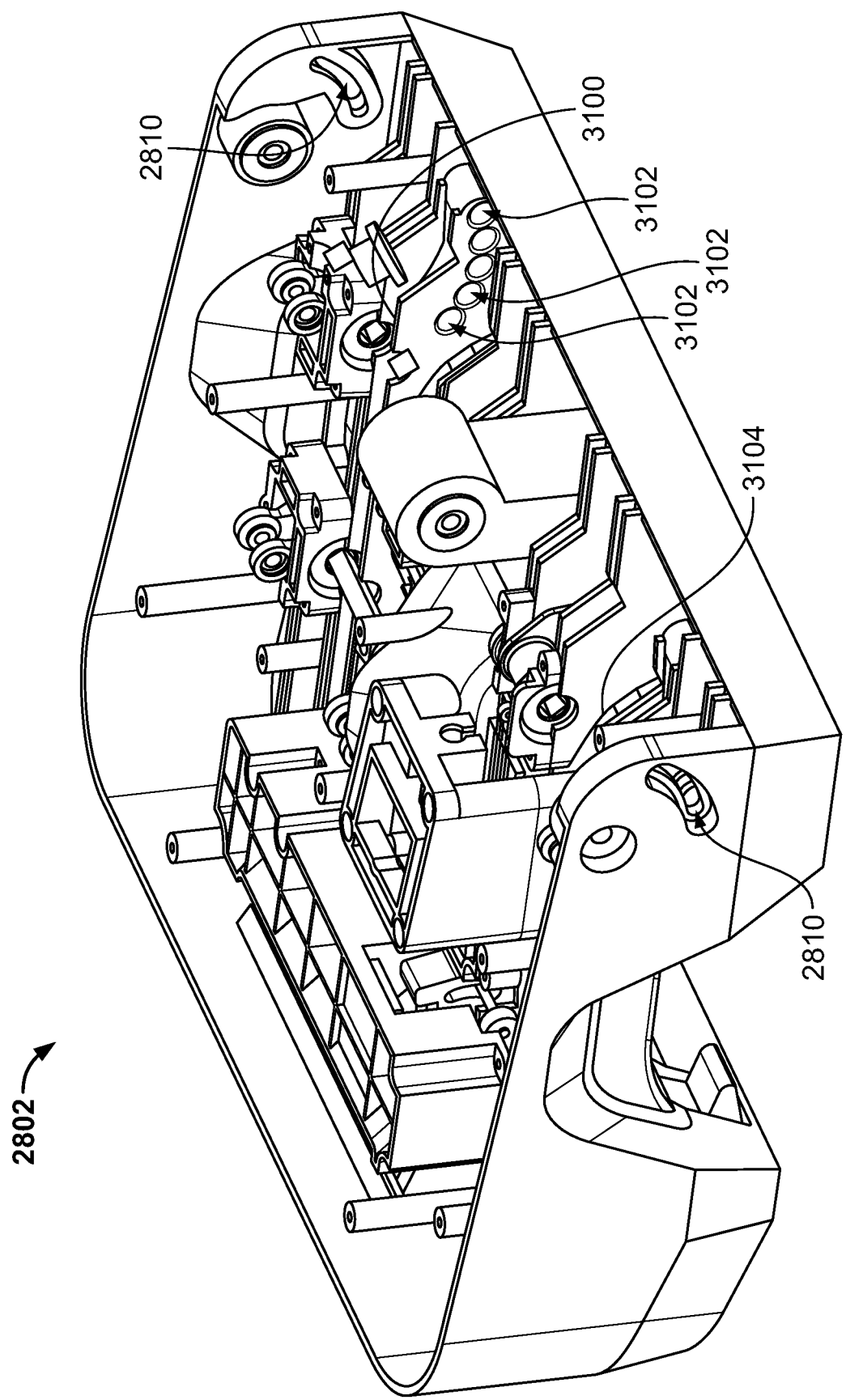
FIG. 31 is an enlarged, rear perspective view of a seat base of the example seat of FIG. 28.

FIG. 31 is an enlarged view of the seat base 2802. As shown in FIG. 31, the seat base 2802 includes a first positioner 3100 including a plurality of openings or receivers 3102. The seat base 2802 also includes a second positioner 3104. The second positioner 3104 is a mirror image of the first positioner 3100. Thus, the second positioner 3104 includes a plurality of openings 3102 substantially identical to those shown with respect to the first positioner 3100. As shown with respect to the first positioner 3100, the openings 3102 of the first and second positioners 3100, 3104 are angled relative to one another such that the openings 3102 form an arc, where each of the openings 3102 defines a recline position of the seat back 2804 relative to the seat base 2802. Example recline positons include a substantially upright position in which the seat back 2804 is disposed at an angle of approximately 90° relative to the seat base 2802 and a substantially reclined positon in which the seat back 2804 is disposed at an angle greater than 90° relative to the seat base 2802. Although the first positioner 3100 is shown as having five openings 3102, the first and second positioners 3100, 3104 can have fewer or additional openings 3102. Also, the openings 3102 can be positioned at different angles relative to one another than shown in FIG. 31 to define different recline positions for the seat back 2804.

When the seat back 2804 is coupled to the seat base 2802 (e.g., as shown in FIG. 29), the second pin 3020 of the second recline adjuster 2914 is disposed in one of the openings 3102 of the first positioner 3100. Also, the first pin 3016 of the first recline adjuster 2912 is disposed in one of the openings 3102 of the second positioner 3104 aligned with the opening 3102 of the first positioner 3100 in which the second pin 3020 is disposed. Put another way, the first and second pins 3016, 3020 are disposed in openings 3102 of the respective first and second positioners 3100, 3104 that have a shared longitudinal axis passing through each of the openings 3102. The openings 3102 in which the first and second pins 3016, 3020 are disposed determine the recline angle of the seat back 2804 relative to the seat base 2802 and lock the seat back 2804 to the seat base 2802 at the selected angle.

Referring again to FIGS. 29 and 30, when the user presses the second release button 2818, causing the pulley 2906 to pivot upward as represented by the arrow 3010, the second cable 2916 moves with the pulley 2906. The second cable 2916 pulls each of the first and second recline adjusters 2912, 2914 inward relative to a central longitudinal axis extending along the second surface 2814, or in the direction represented by the arrows 3022, 3024 of FIG. 30. The movement of the first and second recline adjusters 2912, 2914 causes the first and second pins 3016, 3020 to move out the respective openings 3102 of the first and second positioners 3100, 3104 of the seat base 2802. Also, the movement of the pulley 2906, the second cable 2916, and the first and second recline adjusters 2912, 2914 causes each of the first and second springs 2920, 2926 to move from a resting length to an expanded length. Thus, in the example seat 2800, activation of one release button (e.g., the first or second release buttons 2816, 2818) unlocks the first and second pins 3016, 3020 at substantially the same time via movement of the pulley 2906 and the second cable 2916, which causes each of the first and second recline adjusters 2912, 2914 to pivot substantially simultaneously. Therefore, the user can unlock the seat base 2802 from the seat back 2804 using one hand.

When the first and second pins 3016, 3020 are disengaged or retracted from the openings 3102 of the first and second positioners 3100, 3104, the seat back 2804 is free to rotate about the axle 2806. The user can grasp the recline handle 2820 (e.g., with the hand not pressing the second release button 2818) to pivot the seat back 2804 about the axle 2806, thereby adjusting the recline angle of the seat back 2804 relative to the seat base 2802. Alternatively, the user can press one of the release buttons 2816, 2818 from the side of the seat back 2804 and pivot the seat back 2804, when unlocked, to the desired position without grasping the recline handle 2820 so the change of include of the seat back 2804 can be effected with one hand. The first and second slots 2810 (FIGS. 28, 31) of the seat base 2802 and the stoppers 2811 (FIG. 28) disposed therein limit the range of motion of the seat back 2804 between for example, a substantially upright position (e.g., approximately 90° relative to the seat base 2802) to a substantially reclined position (e.g., greater than 90° relative to the seat base 2802). Also, the openings 3102 of the first and second positioners 3100, 3104 of the seat base 2802 define positions at which the seat back 2804 can be angled relative to the seat base 2802 for locking the seat back 2804 to the seat base 2802. As shown in FIG. 30, the seat back 2804 can include notched coupling mechanisms 3026 that couple the seat back 2804 to the seat base 2802 to further facilitate pivoting of the seat back 2804 while maintaining a coupling between the seat back 2804 and the seat base 2802.

When the user has positioned the seat back 2804 at a desired recline position as allowed by the stoppers 2811 disposed in the first and second slots 2810 and the openings 3102 of the first and second positioners 3100, 3104 of the seat base 2802, the user releases the second release button 2818. Upon releasing the second release button 2818, the housing 2904 moves downward relative to the seat base 2802, thereby releasing the first cable 2908, the pulley 2906, and the second cable 2916. The release of the pulley 2906 and the second cable 2916 causes the first and second recline adjusters 2912, 2914 to pivot outward relative to a central longitudinal axis extending along the second surface 2814 of the seat back 2804, or in a direction opposite the arrows 3022, 3024 shown in FIG. 30. The movement of the first and second recline adjusters 2912, 2914 causes the pins 3016, 3020 to enter respective openings 3102 of the first and second positioners 3100, 3104 of the seat base 2802 corresponding to the selected recline positon, thereby locking the seat back 2804 to the seat base 2802 at the desired recline angle. Also, the first and second springs 2920, 2926 return to their resting lengths.

Thus, the example seat 2800 of FIGS. 28-31 provides for selective adjustment of the recline angle of the seat back 2804 relative to the seat base 2802. The first and/or second release buttons 2816, 2818 and the recline handle 2820 are positioned on the second surface 2814 of the seat back 2804 rather than, for example, the sides of the seat back 2804. This positioning allows the user to easily access to the recline handle 2820 and at least one of the release buttons 2816, 2818 when the example seat 2800 is coupled to the stroller frame with, for example, a second seat or an accessory, without the risk of pinching of the user's hand when trying to access the buttons between two seats or the seat and the accessory. Although the example seat 2800 can include only one release button, the inclusion of two release buttons 2816, 2818 at different heights along the seat back 2804 or on different sides of the seat back 2804 provides for flexibility in that the user can access the release button(s) 2816, 2818 when the example seat 2800 is disposed in any of the mount receivers of the stroller frame (e.g., left, right, or center mount receivers). Also, the seat back 2804 can be locked from the seat base 2802 for adjustment of the recline angle via activation of one release button 2816, 2818, which controls the first and second recline adjusters 2912, 2914 and the unlocking of the first and second pins 3016, 3020 from the openings 3102 of the seat base 2802 via the pulley 2906. Thus, the example seat 2800 provides for adjustment of the recline angle of the seat back 2804 relative to the seat base 2802 with minimal interference when the seat is coupled to the stroller frame with other seats and/or accessories.

Figure 32:
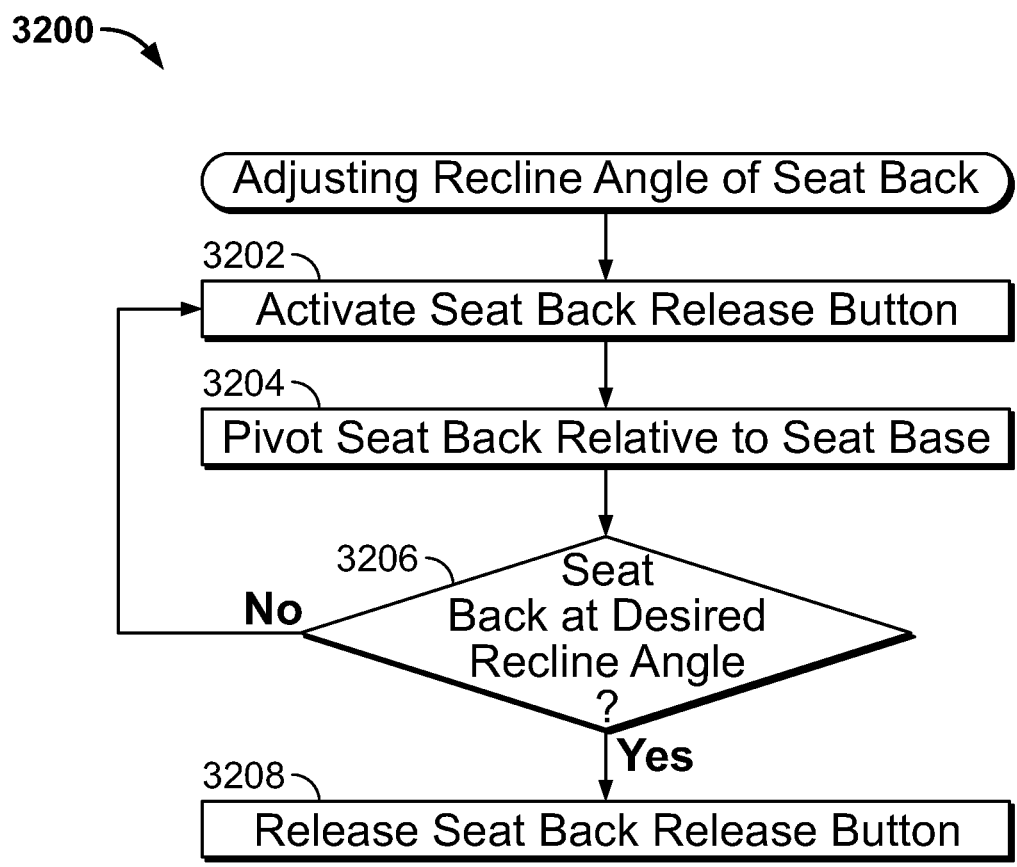
FIG. 32 is a flowchart representative of an example method disclosed herein for adjusting a seat back relative to a seat base.

FIG. 32 is a flowchart illustrating an example process 3200 for selectively adjusting a recline angle of a seat back (e.g., the seat back 2804 of FIG. 28) relative to a seat base (e.g., the seat base 2802) of a stroller seat (e.g., the stroller seat 2800). Although the example process 3200 is disclosed with respect to the flowchart illustrated in FIG. 32, many other methods of operating the example seat 2800 may alternatively be used. For example, the order of execution of the blocks may be changed, and/or some of the blocks described may be changed, eliminated, or combined. Also, in some examples, the example process 3200 for adjusting the recline angle of the example seat 2800 can be performed in conjunction with the example process 2700 of FIG. 27 for removably coupling the seat 2800 to a stroller frame. For example, the example process 3200 for adjusting the recline angle of the example seat 2800 can be implemented after the seat 2800 has been coupled to the stroller frame as disclosed above with respect to blocks 2702 and 2704 of the example process 2700.

The example process 3200 for adjusting a recline angle of a seat back includes activating a seat back release button of the seat (block 3202). In the example process 3200, activation of the seat back release button unlocks the seat back from the seat base to enable a user such as a child caregiver to pivot the seat back relative to the seat base to adjust a sitting position of a child in the seat. For example, the user can press one of the first or second release buttons 2816, 2818 on the second surface 2814 of the seat back 2804 of the example seat 2800. The pressing of the first or second release button 2816, 2818 activates the pulley 2906, which causes the first and second pins 3016, 3020 to disengage from the openings 3102 of the first and second positioners 3100, 3104 of the seat base 2802 via the cable coupling between the pulley 2906 and the first and second recline adjusters 2912, 2914. As result of the disengagement of the first and second pins 3016, 3020 from the seat base openings 3102, the example seat back 2804 can be rotated about the axle 2806.

The example process 3200 includes pivoting the seat back relative to the seat base (block 3204). For example, when the first and second pins 3016, 3020 are removed from the openings 3102 of the seat base 2802, the seat back 2804 can be rotated about the axle 2806. To rotate the seat back 2804 about the axle 2806, the user can grasp the recline handle 2820 or pull/push on the side of the seat back 2804. The rotation of the seat back 2804 about the axle 2806 adjusts the angle of the seat back 2804 relative to the seat base 2802. In some examples, the range of motion of the seat back 2804 is controlled by the stoppers 2811 disposed in the slots 2810 of the seat base 2802, which define a degree to which the seat back 2804 can rotate relative to the seat base 2802.

The example process 3200 includes a decision by the user whether the seat back is at a desired recline angle relative to the seat back (block 3206). For example, if a child sitting the seat is awake, the user may position the seat back in a substantially upright position (e.g., the seat back is at an angle of approximately 90° relative to the seat base) to allow the child to see the outside environment. If the child is asleep in the seat, the user may position the seat back in reclined position (e.g., the seat back is at an angle greater than 90° relative to the seat base) to increase the comfort of the child while sleeping. The angle at which the user can position the seat back can be limited by predefined positions for locking the seat back to the seat base. For example, the openings 3102 of the first and second positioners 3100, 3104 of the seat base define positions at which the seat back 2804 can be locked to the seat base 2802 based on the number of openings 3102, the positions of the openings 3102, etc.

If the seat back is not at the desired recline angle, the user continues to pivot the seat back until the seat back is at the desired recline angle. When the seat back is at the desired recline angle, the example process 3200 includes the user releasing the seat back release button. In the example process 3200, when the user releases the seat back release button, the seat back is locked to the seat base at the desired recline angle. For example, when the user releases the first or second release button 2816, 2818, the pulley 2906 and the cables 2908, 2916 are released such that the first and second pins 3016, 3020 of the first and second recline adjusters 2912, 2914 engage with respective openings 3102 of the first and second positioners 3100, 3104 of the seat base 2802. When the first and second pins 3016, 3020 are disposed in the openings 3102, the seat back 2804 is locked to the seat base 2802 at the recline position defined by the openings 3102 and selected by the user.

From the foregoing, it will be appreciated that methods and apparatus have been disclosed to provide for removable coupling of one or more seats or accessories to a stroller frame. Disclosed example stroller frames provide for attachment of the one or more seats and/or accessories to the frame in different combinations with respect to type of seat (e.g., upright seat, bassinet), placement of the seat relative to the stroller frame (e.g., left, middle, or right side), and orientation (e.g., forward- or rearward-facing or sideways) without requiring the user to adjust the stroller frame or consider factors such as stability of the frame. Rather, the user attaches the one or more seats or accessories to the frame without modifying the frame and/or the seats or accessories, which provides for flexibility in coupling different seats and/or accessories to the stroller frame. When the stroller is not in use, the frame efficiently folds via a folding mechanism activated by a handle of the stroller frame to substantially simultaneously collapse rear and front portions of the frame.

In disclosed examples, a seat mount of a seat or accessory is inserted into a receiver on the frame to couple the seat or accessory to the frame. In disclosed examples, the seat mount includes locks that are automatically activated upon engagement of the seat mount with a surface the receiver. In some examples, the locks are operated by a communicative relationship between, for example, a plunger, a turntable, and handles of the seat mount. Such examples translate vertical movement of the plunger into rotational movement of the turntable to extend and retract the locks to securely and removably couple the seat to the frame via the extension and retraction of the handles. In other examples, the locks are operated via the pivoting of scissor links that causes the locks to extend and retract to removably secure coupling of the seat to the frame via the extension and retraction of the handles. In other examples, the locks are operated via rotation of an actuator activated by release of a handle and extension or retraction of the handle. In such examples, the rotation of the actuator causes the locks to extend and retract to mount the seat to the frame. The control of the locks via the handles of the seat mount increases user control over the coupling of the seat to the stroller frame and reduces the number of movable parts on the stroller frame, thereby simplifying the attachment of the seat and the frame while providing for secure coupling of the seat to the frame.

Further, when a seat is coupled to the stroller frame with one or more other seats or accessories, a recline angle of a seat back can be readily adjusted without interference from the other seats or accessories. Activation of a release button of the seat enables the user to unlock the seat back for rotation relative to a base of the seat while the seat is coupled to the stroller frame. The release button can be easily accessed by the user when the seat is in different positions relative to the stroller frame and/or coupled to the stroller frame with other seats or accessories.

Although certain example methods and apparatus have been described herein, the scope of coverage of this patent is not limited thereto. On the contrary, this patent covers all methods, apparatus and articles of manufacture fairly falling within the scope of this disclosure.

What is claimed is:

1. A stroller comprising:
a frame including:
   a handle arm;
   a first leg supporting a first wheel;
   a second leg supporting a second wheel;
   a joint coupling the first leg and the second leg; and
   a mount bar including a first receiver and a second receiver;
a first seat removably couplable to the first receiver via a movable lock carried by the first seat, the first seat including a handle, the lock of the first seat to move in response to movement of the handle; and
a second seat removably couplable to the second receiver via a movable lock carried by the second seat, the first seat and the second seat disposed adjacent to each other relative to a longitudinal axis passing through the mount bar when the first seat is coupled to the first receiver and the second seat is coupled to the second receiver.

2. The stroller of claim 1, wherein the handle arm is to rotate toward the joint during folding of the frame.

3. The stroller of claim 1, wherein the first leg is rotatable about the joint in response to rotation of the handle arm.

4. The stroller of claim 1, wherein the mount bar is disposed proximate to the joint.

5. The stroller of claim 1, wherein the first seat includes a first base having a frustoconical shape, the first receiver to receive the first base.

6. The stroller of claim 5, wherein the second seat includes a second base having a frustoconical shape, the second receiver to receive the second base.

7. The stroller of claim 5, wherein the lock of the first seat extends through an opening defined in the first receiver when the first seat is coupled to the first receiver.

8. The stroller of claim 1, wherein the first seat further includes an actuator operatively coupled to the handle, the actuator to drive movement of the lock of the first seat.

9. A stroller comprising:
a frame having a first side and a second side, a width of the frame defined between the first side and the second side;
a mount bar carried by the frame, the mount bar including two or more receivers disposed adjacent one another along the width of the frame;
a first seat including a first handle, the first seat removably couplable to a first one of the receivers, the first seat moveable between a locked state and an unlocked state relative to the first one of the receivers in response to movement of the first handle; and
a second seat including a second handle, the second seat removably couplable to a second one of the receivers, the second seat moveable between a locked state and an unlocked state relative to the second one of the receivers in response to movement of the second handle.

10. The stroller of claim 9, wherein the first seat includes spring-loaded locks, the locks to move in response to movement of the first handle to move the first seat between the locked state and the unlocked state.

11. The stroller of claim 9, wherein the first seat includes a first base and the second seat includes a second base,
each of the first base and the second base having a first shape, and
the first one of the receivers and the second one of the receivers each having a second shape, the second shape complementary to the first shape to enable the first base to be received in the first one of the receivers and the second base to be received in the second one of the receivers.

12. The stroller of claim 11, wherein the first handle is disposed proximate to the first base and the second handle is disposed proximate to the second base.

13. The stroller of claim 11, wherein the first handle is slidable outward relative to the first base.

14. The stroller of claim 9, wherein the frame includes a handle arm, the handle arm to rotate toward the mount bar during folding of the stroller.

15. A stroller comprising:
a wheeled frame;
a first receiver supported by the wheeled frame;
a second receiver supported by the wheeled frame;
a first seat frame removably couplable to one of the first receiver or the second receiver, the first seat frame including:

a handle;

a mount defining a first aperture therein; and a lock, the lock to extend through the first aperture and a second aperture defined in the one of the first receiver or the second receiver to lock the first seat frame to the one of the first receiver or the second receiver, the lock to retract from the first aperture and the second aperture to unlock the first seat frame from the one of the first receiver or the second receiver in response to movement of the handle from a first position to a second position; and a second seat frame removably couplable to the other one of the first receiver or the second receiver.

16. The stroller of claim 15, wherein the first receiver and the second receiver are disposed adjacent each other between a first side of the wheeled frame and a second side of the wheeled frame.

17. A stroller comprising:

a wheeled frame;

a first receiver supported by the wheeled frame;

a second receiver supported by the wheeled frame;

a first seat frame removably couplable to one of the first receiver or the second receiver, the first seat frame including:

a mount defining a first aperture therein;

a first lock, the first lock to extend through the first aperture and a second aperture defined in the one of the first receiver or the second receiver to lock the first seat frame to the one of the first receiver or the second receiver, the first lock to retract from the first aperture and the second aperture to unlock the first seat frame from the one of the first receiver or the second receiver; and a second lock, the second lock to extend through a third aperture defined in the mount and a fourth aperture defined in the one of the first receiver or the second receiver when the first lock extends through the first aperture and the second aperture; and a second seat frame removably couplable to the other one of the first receiver or the second receiver.

18. A stroller comprising:

a wheeled frame;

a first receiver supported by the wheeled frame;

a second receiver supported by the wheeled frame;

a first seat frame removably couplable to one of the first receiver or the second receiver, the first seat frame including:

a mount defining a first aperture therein;

a lock, the lock to extend through the first aperture and a second aperture defined in the one of the first receiver or the second receiver to lock the first seat frame to the one of the first receiver or the second receiver, the lock to retract from the first aperture and the second aperture to unlock the first seat frame from the one of the first receiver or the second receiver, the lock including teeth; and an actuator, the actuator to engage the teeth of the lock to cause the lock to one of extend through or retract from the first aperture and the second aperture; and a second seat frame removably couplable to the other one of the first receiver or the second receiver.

\* \* \* \* \*